US012263870B2

(12) United States Patent
Ren et al.

(10) Patent No.: US 12,263,870 B2
(45) Date of Patent: Apr. 1, 2025

(54) BOGIE, RAIL VEHICLE HAVING SAME, AND RAIL TRANSPORT SYSTEM

(71) Applicant: BYD COMPANY LIMITED, Shenzhen (CN)

(72) Inventors: Lin Ren, Shenzhen (CN); Hao Zeng, Shenzhen (CN); Junjie Liu, Shenzhen (CN); Fanghong Peng, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 782 days.

(21) Appl. No.: 17/509,835

(22) Filed: Oct. 25, 2021

(65) Prior Publication Data

US 2022/0048541 A1  Feb. 17, 2022

Related U.S. Application Data

(63) Continuation of application No. 16/334,790, filed on Mar. 20, 2019, now Pat. No. 11,155,278, which is a
(Continued)

(30) Foreign Application Priority Data

Sep. 21, 2016  (CN) .......................... 201610840621.X

(51) Int. Cl.
*B61C 9/50* (2006.01)
*B60L 5/39* (2006.01)
(Continued)

(52) U.S. Cl.
CPC  *B61C 9/50* (2013.01); *B60L 5/39* (2013.01); *B61C 3/02* (2013.01); *B61D 19/023* (2013.01);
(Continued)

(58) Field of Classification Search
CPC ...... B61F 5/52; B61F 3/00; B61F 9/00; B61F 5/02; B61F 13/00; B61B 5/02;
(Continued)

(56) References Cited

U.S. PATENT DOCUMENTS 4,061,089 A * 12/1977 Sawyer .................. H02K 41/02
 104/294
4,587,906 A *  5/1986 Coester .................. B61C 11/06
 104/156
(Continued)

FOREIGN PATENT DOCUMENTS

BR  102012002851 A2 * 10/2013
CN      201296254 Y     8/2009
(Continued)

OTHER PUBLICATIONS

The World Intellectual Property Organization (WIPO) International Search Report for PCT/CN2017/075222 Jun. 2, 2017 7 Pages.

*Primary Examiner* — Jason C Smith
(74) *Attorney, Agent, or Firm* — Wenye Tan

(57) ABSTRACT

A bogie includes a bogie frame, a first running wheel and a second running wheel, at least one driving device, a first horizontal wheel, a second horizontal wheel, a first horizontal safety wheel connected to the first horizontal wheel and moving in synchronization with the first horizontal wheel, and a second horizontal safety wheel connected to the second horizontal wheel and moving in synchronization with the second horizontal wheel. The bogie frame has a straddle recess suitable for straddling a rail. The first running wheel and the second running wheel are pivotably mounted onto the bogie frame respectively and are coaxially spaced apart. The at least one driving device is mounted onto the bogie frame and located between the first running wheel and
(Continued)

the second running wheel to drive the first running wheel and the second running wheel.

14 Claims, 39 Drawing Sheets

Related U.S. Application Data continuation of application No. PCT/CN2017/075222, filed on Feb. 28, 2017.

(51) Int. Cl.
| | | |
|---|---|---|
| *B61C 3/02* | (2006.01) | |
| *B61D 19/02* | (2006.01) | |
| *B61D 23/00* | (2006.01) | |
| *B61F 5/02* | (2006.01) | |
| *B61F 5/52* | (2006.01) | |
| *B61F 9/00* | (2006.01) | |
| *B61F 13/00* | (2006.01) | |
| *E01B 25/10* | (2006.01) | |

(52) U.S. Cl.
CPC ............... *B61F 5/02* (2013.01); *B61F 5/52* (2013.01); *B61F 9/00* (2013.01); *B61F 13/00* (2013.01); *E01B 25/10* (2013.01); *B60L 2200/26* (2013.01); *B61D 23/00* (2013.01); *E01B 2204/15* (2013.01); *Y02T 30/00* (2013.01)

(58) Field of Classification Search
CPC ....... B61B 13/04; B61B 13/06; B61D 19/023; E01B 25/10; E01B 2204/15; B61C 9/50; B61C 3/02; B60L 5/39; B60L 2200/26
See application file for complete search history.

(56) References Cited

U.S. PATENT DOCUMENTS

| | | | | |
|---|---|---|---|---|
| 4,658,732 | A * | 4/1987 | Coester | B61B 13/122 |
| | | | | 104/156 |
| 4,823,704 | A * | 4/1989 | Fujita | B61B 5/02 |
| | | | | 104/247 |
| 5,174,219 | A * | 12/1992 | Streiff | B61F 9/00 |
| | | | | 104/247 |
| 5,445,080 | A * | 8/1995 | Austin | B65G 17/38 |
| | | | | 105/241.1 |
| 5,845,582 | A * | 12/1998 | Coester | B61B 13/122 |
| | | | | 104/156 |
| 6,076,469 | A * | 6/2000 | Coester | B61B 13/122 |
| | | | | 104/138.1 |
| 6,763,766 | B1 * | 7/2004 | Cornellier | E01B 25/00 |
| | | | | 104/18 |
| 8,448,577 | B2 * | 5/2013 | Coester | E01B 25/10 |
| | | | | 104/155 |
| 9,738,291 | B2 * | 8/2017 | Diebel | B60L 13/00 |
| 11,155,278 | B2 * | 10/2021 | Ren | B61C 3/02 |
| 11,173,930 | B2 * | 11/2021 | Ren | B61F 5/52 |
| 11,267,493 | B2 * | 3/2022 | Ren | B61B 13/04 |
| 11,279,381 | B2 * | 3/2022 | Zhao | B60L 5/39 |
| 2001/0037747 | A1 * | 11/2001 | Svensson | B60L 13/06 |
| | | | | 104/243 |
| 2002/0162478 | A1 * | 11/2002 | Henderson | E01B 25/10 |
| | | | | 104/124 |
| 2009/0266268 | A1 | 10/2009 | Timan et al. | |
| 2009/0293758 | A1 * | 12/2009 | Timan | B61G 5/02 |
| | | | | 105/141 |
| 2010/0186620 | A1 * | 7/2010 | Rodet | B61F 5/325 |
| | | | | 105/182.1 |
| 2011/0056405 | A1 * | 3/2011 | Coester | E01B 25/10 |
| | | | | 104/124 |
| 2014/0158013 | A1 * | 6/2014 | Diebel | B60L 13/00 |
| | | | | 104/118 |
| 2018/0208218 | A1 * | 7/2018 | Gao | B61F 9/00 |
| 2019/0225243 | A1 * | 7/2019 | Ren | B61F 3/00 |
| 2019/0249372 | A1 * | 8/2019 | Ren | B61F 5/52 |
| 2019/0276052 | A1 * | 9/2019 | Zhao | B61C 3/02 |
| 2019/0276053 | A1 * | 9/2019 | Zhao | B61F 5/52 |
| 2019/0300023 | A1 * | 10/2019 | Ren | B61F 5/04 |
| 2022/0048541 | A1 * | 2/2022 | Ren | B61D 19/023 |

FOREIGN PATENT DOCUMENTS

| | | | |
|---|---|---|---|
| CN | 102358293 A | 2/2012 | |
| CN | 103625493 A | 3/2014 | |
| CN | 204279635 U | 4/2015 | |
| CN | 204432660 U | 7/2015 | |
| CN | 105035098 A | 11/2015 | |
| CN | 204915705 U | 12/2015 | |
| CN | 204978684 U | 1/2016 | |
| CN | 105438211 A | 3/2016 | |
| CN | 105905120 A | 8/2016 | |
| EP | 3501935 B1 * | 5/2022 | ............... B60L 5/39 |
| JP | H09169265 A | 6/1997 | |
| JP | 10258735 A | 9/1998 | |
| JP | 2007069751 A | 3/2007 | |
| JP | 2016049840 A | 4/2016 | |
| KR | 20110017369 A | 2/2011 | |
| KR | 1020120059292 A | 6/2012 | |
| KR | 20130099469 A | 9/2013 | |

\* cited by examiner

BOGIE, RAIL VEHICLE HAVING SAME, AND RAIL TRANSPORT SYSTEM

CROSS-REFERENCE TO RELATED APPLICATIONS

This application is a continuation of U.S. application Ser. No. 16/334,790, filed on Mar. 20, 2019, which is a national phase entry under 35 U.S.C. § 371 of International Application No. PCT/CN2017/075222, filed on Feb. 28, 2017, which claims priority to Chinese Patent Application No. 201610840621.X filed by the BYD Co., Ltd. on Sep. 21, 2016, and entitled BOGIE, RAIL VEHICLE HAVING SAME, AND RAIL TRANSPORT SYSTEM, the contents of all of which are incorporated herein by reference in their entirety.

FIELD

The present disclosure relates to the field of transport technologies and, specifically, to a bogie, a rail vehicle having the bogie, and a rail transport system having the rail vehicle.

BACKGROUND

A rail transport system such as a straddle-type monorail train is emergently parked inevitably because of a fault or another factor during actual travelling. To facilitate evacuation of passengers in an emergency, the straddle-type monorail train in the related art is provided with an independent escape passage. Specifically, by additionally providing a frame on a rail, the frame is usually connected to a side of the rail and protrudes outward, and then a floor is laid on the frame to form a passage for evacuating passengers.

The inventors of this application have found through a large quantity of researches and experiments that disadvantages such as high costs, large occupied space, and a hidden danger in stability existing in the straddle-type monorail train provided with an escape passage in the related art are just caused by the structure of the foregoing escape passage. Specific reasons are as follows:

Since the frame and the floor laid on the frame are both additional added structures independent of the rail, and a specific location of a rail vehicle in an emergency during travelling is unpredictable, the escape passage of this structure needs to be additionally disposed in the entire length direction of the rail (except a platform). The amount of work is enormous, which greatly increases the costs. Moreover, the frame and the floor are located at the side of the rail, which is equivalent to a portion additionally extending in the width direction of the rail, which takes up a lot of space. In addition, the frame and the floor have a certain weight. Regardless of whether the rail vehicle is in an emergency, the frame and the floor are both erected on the rail, that is, even if the rail vehicle is travelling normally, the rail still needs to bear the weight of the frame and the floor, thereby increasing the weight borne by the rail, which has an adverse effect on the stability of the rail.

SUMMARY

An objective of the present disclosure is to at least resolve one of the foregoing technical problems in the related art to some extent. For this purpose, the present disclosure provides a bogie.

The present disclosure further provides a rail vehicle having the bogie.

The present disclosure further provides a rail transport system having the rail vehicle.

According to an embodiment of a first aspect of the present disclosure, a bogie is provided. The bogie includes: a bogie frame, where the bogie frame has a straddle recess suitable for straddling a rail; a first running wheel and a second running wheel, where the first running wheel and the second running wheel are pivotably mounted onto the bogie frame respectively and are coaxially spaced apart; a third running wheel and a fourth running wheel, where the third running wheel and the fourth running wheel are pivotably mounted onto the bogie frame respectively and are coaxially spaced apart, the third running wheel and the first running wheel are spaced apart in the length direction of the rail, and the fourth running wheel and the second running wheel are spaced apart in the length direction of the rail; and a driving device, where the driving device is mounted onto the bogie frame, where the driving device is located between the first running wheel and the second running wheel, and the first running wheel and the second running wheel are driven by the driving device; and/or the driving device is located between the third running wheel and the fourth running wheel, and the third running wheel and the fourth running wheel are driven by the driving device.

The bogie according to this embodiment of the present disclosure facilitates optimization of the structure of an escape passage, and has advantages such as high space utilization, high stability, and strong weight bearing capability.

Additionally, the bogie according to this embodiment of the present disclosure may further have the following additional technical characteristics:

According to an embodiment of the present disclosure, the driving device is a motor, the motor has a first motor shaft and a second motor shaft operating synchronously, the first motor shaft is in transmission connection to the first running wheel or the third running wheel, and the second motor shaft is in transmission connection to the second running wheel or the fourth running wheel.

According to an embodiment of the present disclosure, the first motor shaft and the second motor shaft are coaxially disposed and are one integrally-formed piece.

According to an embodiment of the present disclosure, the first running wheel and the second running wheel are connected by using a first connection shaft and/or the third running wheel and the fourth running wheel are connected by using a second connection shaft; and the driving device is in transmission connection to the first connection shaft and/or the second connection shaft.

According to an embodiment of the present disclosure, the driving device includes a first driving device and a second driving device, where the first driving device is located between the first running wheel and the second running wheel, and the first running wheel and the second running wheel are driven by the first driving device; the second driving device is located between the third running wheel and the fourth running wheel, and the third running wheel and the fourth running wheel are driven by the second driving device; and the first driving device is closer to the first running wheel than the second running wheel, and/or the second driving device is closer to the fourth running wheel than the third running wheel.

According to an embodiment of the present disclosure, the bogie further includes: a first horizontal wheel, where the first horizontal wheel is pivotably mounted onto the bogie frame and is suitable for fitting in on a first side of the rail; and a second horizontal wheel, where the second horizontal wheel is pivotably mounted onto the bogie frame and is suitable for fitting in on a second side of the rail.

According to an embodiment of the present disclosure, the bogie further includes: a first horizontal safety wheel connected to the first horizontal wheel and moving in synchronization with the first horizontal wheel, and a second horizontal safety wheel connected to the second horizontal wheel and moving in synchronization with the second horizontal wheel, where the outer diameter of the first horizontal safety wheel is less than the outer diameter of the first horizontal wheel, and the outer diameter of the second horizontal safety wheel is less than the outer diameter of the second horizontal wheel.

According to an embodiment of the present disclosure, there are two first horizontal wheels spaced apart along the length direction of the rail, there are two second horizontal wheels spaced apart along the length direction of the rail, the central axes of the two first horizontal wheels and the central axes of the two second horizontal wheels are respectively located at four corners of a rectangle in the horizontal plane, and the rectangle is symmetrical about the center of the bogie frame.

According to an embodiment of the present disclosure, there are one first horizontal wheel and one second horizontal wheel respectively, and the first horizontal wheel and the second horizontal wheel deviate from the center of the bogie frame along a travelling direction of a vehicle body.

According to an embodiment of the present disclosure, the bogie further includes: a first collector shoe, where the first collector shoe is disposed on the bogie frame and is suitable for fitting in with a conductive rail on the first side of the rail; and a second collector shoe, where the second collector shoe is disposed on the bogie frame and is suitable for fitting in with a conductive rail on the second side of the rail.

According to an embodiment of the present disclosure, the bogie further includes: a first support suspension device, where the first support suspension device is mounted onto the bogie frame and is suitable for supporting a first side of the vehicle body; and a second support suspension device, where the second support suspension device is mounted onto the bogie frame and is suitable for supporting a second side of the vehicle body.

According to an embodiment of the present disclosure, the outer diameter of the first running wheel, the outer diameter of the second running wheel, the outer diameter of the third running wheel, and the outer diameter of the fourth running wheel are the same and are 900 to 1100 millimeters.

According to an embodiment of a second aspect of the present disclosure, a rail vehicle is provided. The rail vehicle includes: a vehicle body; and a bogie, where the bogie is the bogie according to the embodiment of the first aspect of the present disclosure, and the bogie is mounted on the bottom of the vehicle body.

The rail vehicle according to this embodiment of the present disclosure has, by using the bogie according to the embodiment of the first aspect of the present disclosure, advantages such as facilitation of optimization of the structure of an escape passage, high space utilization, high stability, and large passenger capacity.

According to an embodiment of a third aspect of the present disclosure, a rail transport system is provided. The rail transport system includes: a rail; and a rail vehicle, where the rail vehicle is the rail vehicle according to the embodiment of the second aspect of the present disclosure.

The rail transport system according to this embodiment of the present disclosure has, by using the rail vehicle according to the embodiment of the second aspect of the present disclosure, advantages such as facilitation of optimization of the structure of an escape passage, high space utilization, high stability, and large passenger capacity.

Figure 1:
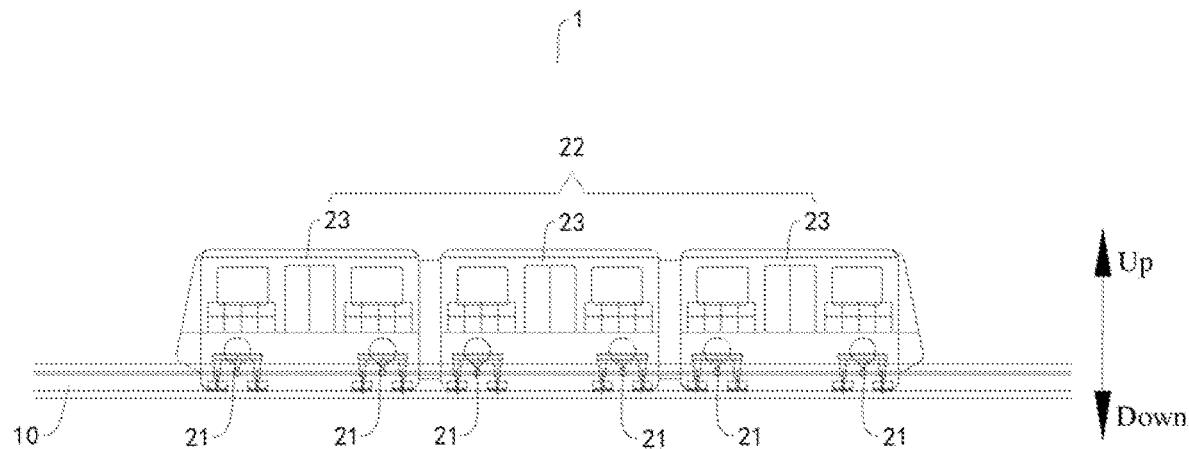
FIG. 1 is a schematic structural diagram of a rail transport system according to an embodiment of the present disclosure.
Figure 2:
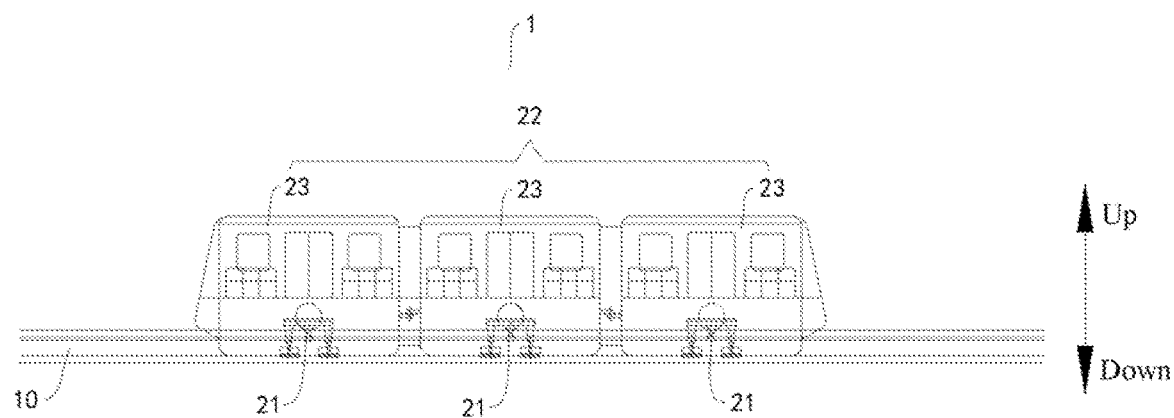
FIG. 2 is a schematic structural diagram of a rail transport system according to another embodiment of the present disclosure.
Figure 3:
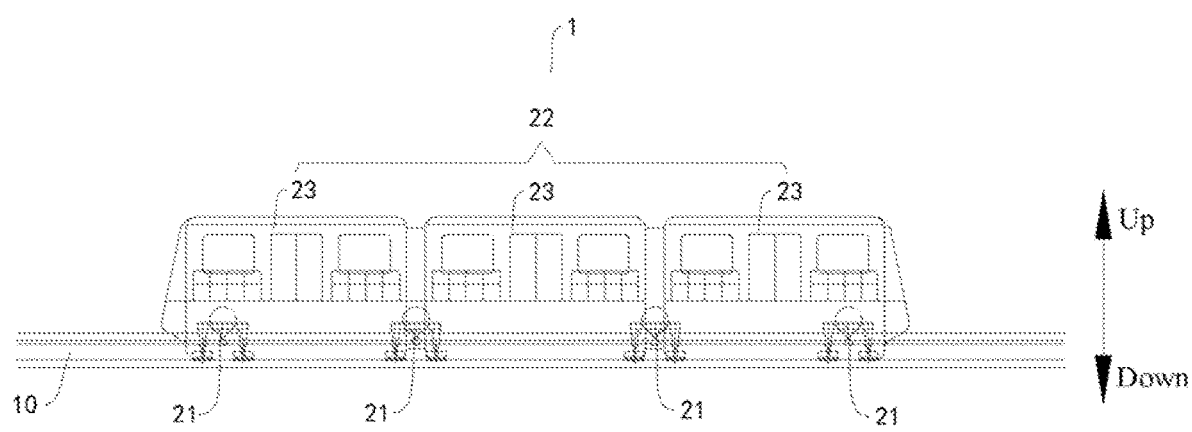
FIG. 3 is a schematic structural diagram of a rail transport system according to another embodiment of the present disclosure.

Reference numerals of the accompanying drawing: rail transport system 1; rail 10, escape passage 11, first rail beam 12, second rail beam 13, weight bearing floor 14, connection beam 15, support frame 16, support plate 17, anti-dropping edge 18; rail vehicle 20, bogie 21, vehicle body 22, compartment 23, escape door 24, escape port 25, escape cover plate 26, escape ladder 27, power battery 28, first end 31 of the escape door 24, second end 32 of the escape door 24; bogie frame 100, second recess 110; first running wheel 210, second running wheel 220, third running wheel 230, fourth running wheel 240, first connection shaft 250, second connection shaft 260; driving device 300, first driving device 310, second driving device 320; first horizontal wheel 710, second horizontal wheel 720, first horizontal safety wheel 711, second horizontal safety wheel 721; first collector shoe 810, second collector shoe 820, first conductive rail 830, second conductive rail 840; first support suspension device 910, second support suspension device 920, third support suspension device 930, and fourth support suspension device 940.

DETAILED DESCRIPTION

The following describes embodiments of the disclosure in detail. Examples of the embodiments are shown in the accompanying drawings. The same or similar elements and the elements having same or similar functions are denoted by like reference numerals throughout the descriptions. The embodiments described below with reference to the accompanying drawings are exemplary, aim to explain the disclosure, but cannot be understood as a limitation on the disclosure.

The present disclosure provides a rail transport system 1 has advantages such as facilitation of evacuation of passengers in an emergency, low costs, small occupied space, small rail weight bearing, and high stability.

The rail transport system 1 according to an embodiment of the present disclosure is described below with reference to accompanying drawings.

Figure 70:
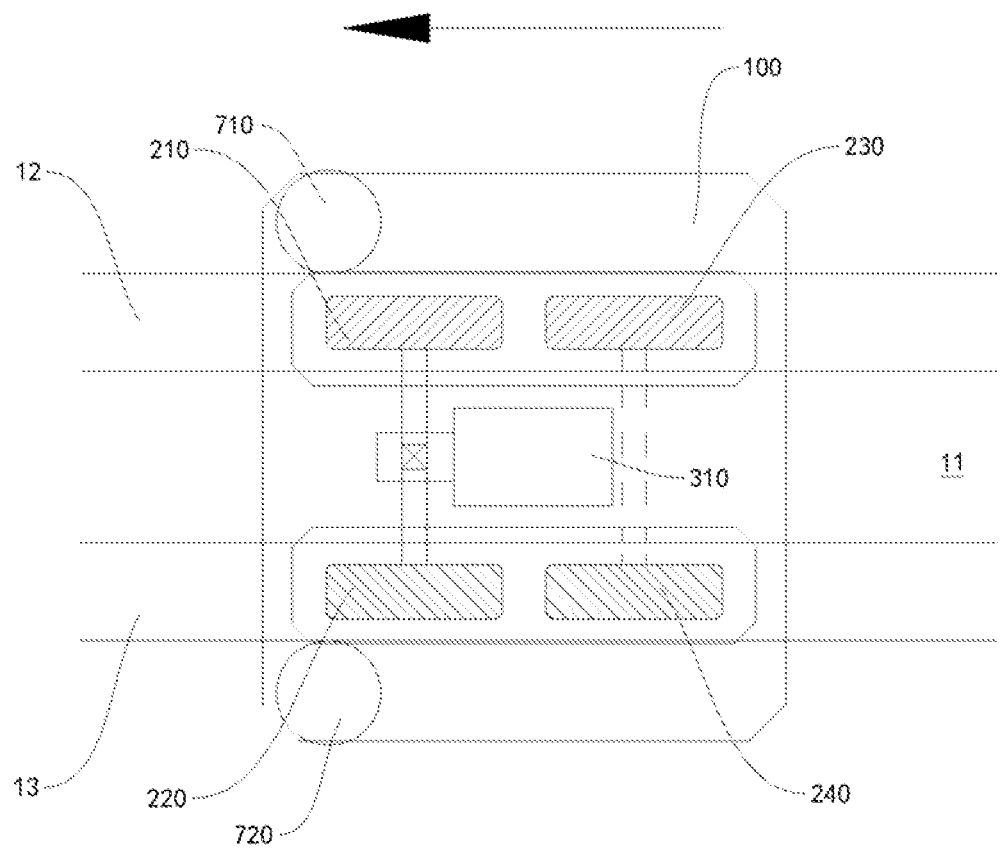
FIG. 70 is a schematic structural diagram of a bogie of a rail vehicle according to another embodiment of the present disclosure.

As shown in FIG. 1 to FIG. 70, the rail transport system 1 according to this embodiment of the present disclosure includes a rail 10 and a rail vehicle 20.

A first recess as an escape passage 11 is constructed on the rail 10. The rail vehicle 20 includes a bogie 21 and a vehicle body 22, and the bogie 21 has a second recess 110 suitable for straddling the rail. The second recess 110 is a straddle recess. The bogie 21 movably straddles the rail 10, and the vehicle body 22 is connected to the bogie 21 and pulled by the bogie 21 to travel along the rail 10. In an embodiment, in a left and right direction, a minimum distance between two ends of the second recess 110 is greater than or equal to a minimum width of the rail.

Herein, a person skilled in the art needs to understand that, the rail 10 is provided with the escape passage 11 means that, the escape passage 11 is disposed on the rail 10 itself but not disposed on another additional component on the rail 10. That is, compared with the structure of the escape passage in the related art, in the rail transport system 1 according to this embodiment of the present disclosure, the rail 10 does not need to be provided with other components such as a frame and a floor, and the escape passage 11 is formed on the rail 10 itself.

In the rail transport system 1 according to this embodiment of the present disclosure, the escape passage 11 is disposed on the rail 10, and when an emergency occurs, passengers can be evacuated in time by using the escape passage 11. Moreover, because the escape passage 11 is disposed on the rail 10 itself, no other additional structure needs to be added to the rail 10, and only the escape passage 11 needs to be disposed on the rail 10 itself along the length direction of the rail 10. Therefore, the amount of work of the rail transport system 1 may be greatly reduced. On one hand, costs are reduced, and on the other hand, occupied space is reduced. Moreover, the weight borne by the rail 10 does not need to be increased, which is favorable to stability of the rail 10. Therefore, the rail transport system 1 according to this embodiment of the present disclosure has advantages such as facilitation of evacuation of passengers in an emergency, low costs, small occupied space, small rail weight bearing, and high stability.

In some embodiments of the present disclosure, as shown in FIG. 1 to FIG. 5, a vehicle body 22 includes a plurality of compartments 23 hinged sequentially along a length direction of a rail 10, and in the length direction of the rail 10, a surface that is of a compartment 23 at at least one end of the vehicle body 22 and that faces away from an adjacent compartment 23 is provided with an escape door 24 that can be opened and closed. That is, each end of the vehicle body 22 has a compartment 23, the compartment 23 of at least one end of the vehicle body 22 has an escape door 24 on the compartment's surface facing away from an adjacent compartment 23, and the escape door 24 can be opened and closed. In other words, the escape door 24 is disposed on the compartment 23 at least one end of the vehicle body 22 in the length direction of the rail 10. In an embodiment, the escape door 24 is disposed on a first end surface of the compartment 23 at the at least one end, and the first end surface is a surface away from the adjacent compartment. In other words, the escape door 24 is disposed on an end surface of at least one of two compartments 23 located at two ends of the vehicle body 22. The escape door 24 has a first end 31 and a second end 32, and the first end 31 of the escape door 24 is flippably mounted onto the corresponding compartment 23. When opened, the escape door 24 is slant relative to a horizontal plane, and the second end 32 of the escape door 24 tilts downward and stretches into an escape passage 11. In this way, when an emergency occurs, a rail vehicle 20 is actively or passively parked, the escape door 24 is opened, and a lower end stretches into the escape passage 11. Passengers in the compartment 23 can slide downward to the escape passage 11 through the escape door 24, and then be evacuated from the escape passage 11.

In an embodiment, the first end 31 of the escape door 24 is disposed adjacent to the bottom of the vehicle, and the second end 32 of the escape door 24 is disposed adjacent to the vehicle top when the escape door 24 is closed. In other words, when the escape door 24 is closed, the second end 32 of the escape door 24 is located above the first end 31 of the escape door 24; and when the escape door 24 is opened, the second end 32 of the escape door 24 is located below the first end 31 of the escape door 24. Therefore, the emergency door 24 turns downwards to switch from a closed state to an open state. A turnable or flippable structure is used for the escape door 24, and a passenger in the vehicle can quickly open the escape door 24 in need of only a simple operation, to effectively improve escape efficiency.

Further, an inner surface of the escape door 24 is provided with a slide rail to help a passenger slide on the slide rail to the escape passage 11. It may be understood herein that, the inner surface of the escape door 24 is a surface facing the inside of the vehicle when the escape door 24 is closed.

Figure 67:
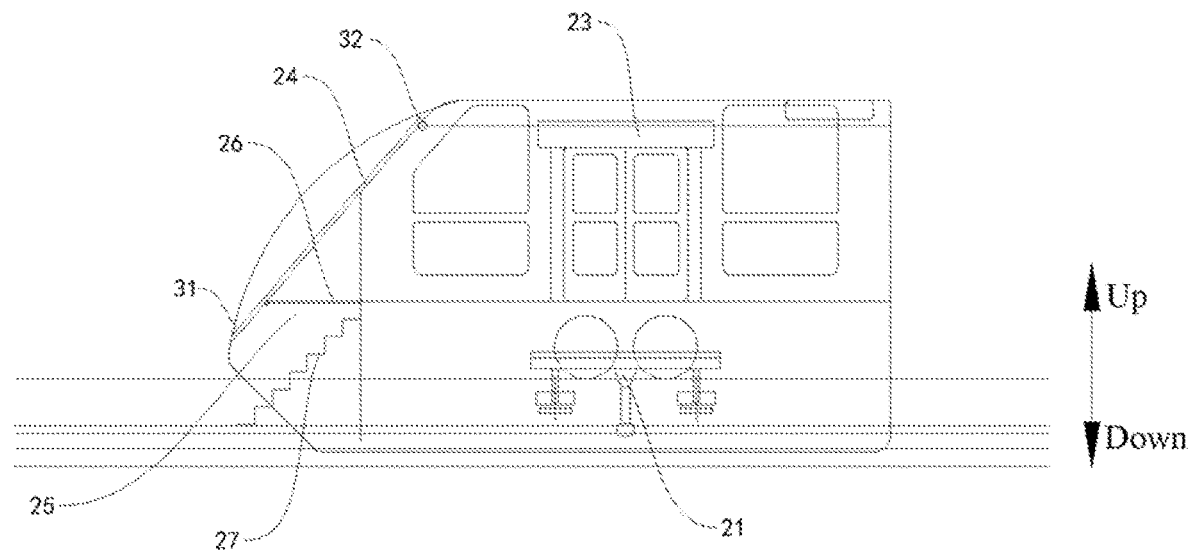
FIG. 67 is a partial schematic structural diagram of a rail transport system according to another embodiment of the present disclosure, where an escape door is in a closed state.
Figure 68:
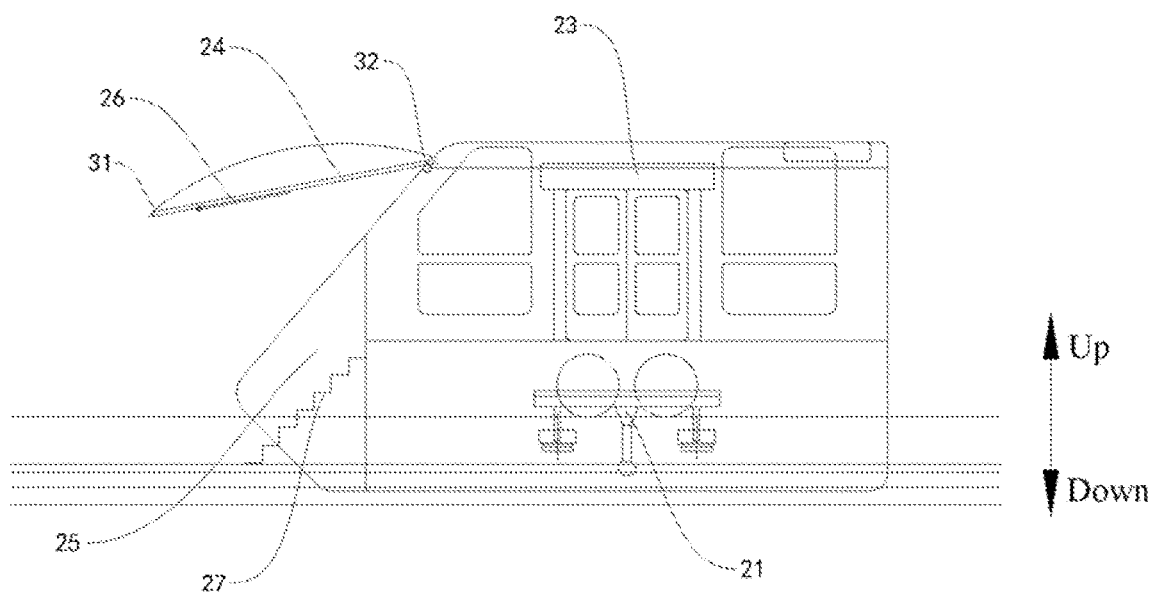
FIG. 68 is a partial schematic structural diagram of a rail transport system according to another embodiment of the present disclosure, where an escape door is in an opened state.

In some other embodiments of the present disclosure, as shown in FIG. 67 and FIG. 68, a vehicle body 22 includes a plurality of compartments 23 hinged sequentially along a length direction of a rail 10, and in the length direction of the rail 10, a surface that is of a compartment 23 at at least one end of the vehicle body 22 and that faces away from an adjacent compartment 23 is provided with an escape door 24 that can be opened and closed. Moreover, an escape port 25 and an escape cover plate 26 are disposed on an inner floor of the compartment 23 at the at least one end of the vehicle body 22, that is, the escape port 25 and the escape cover plate 26 are disposed on the inner floor of the compartment 23 provided with the escape door 24. The escape cover plate 26 collaborates with the escape door 24 and is used to open and close the escape port 25. When a rail vehicle 20 is normally running, the escape door 24 is closed and the escape cover plate 26 closes the escape port 25 (as shown in FIG. 67). When an emergency occurs, the rail vehicle 20 is actively or passively parked, the escape door 24 is opened and the escape cover plate 26 opens the escape port 25 (as shown in FIG. 68), and passengers in the compartment 23 can enter the escape passage 11 through the escape port 25, and then be evacuated from the escape passage 11. Moreover, even if the rail vehicle 20 is forcedly parked at a bend of the rail 10, because the escape door 24, when opened, does not need to fit in with the rail 10, the escape door 24 does not collide with the rail 10, to facilitate evacuation of the passengers at the bend of the rail 10.

Further, in the length direction of the rail 10, each of two end surfaces of two compartments 23 located at two ends of the vehicle body 22 is provided with an escape door 24, and the end surface is a surface of a current compartment away from an adjacent compartment. In an emergency, the escape doors 24 are simultaneously opened at the two ends of the vehicle body 22, and a wide air convection passage can be formed, so that toxic gases such as smog in the vehicle body 22 can be quickly dissipated. Moreover, a turnable or flippable structure is used for the escape door 24, and the passenger in the vehicle can quickly open the escape door 24 in need of only a simple operation, to effectively improve escape efficiency.

In an embodiment, the escape door 24 has a first end 31 and a second end 32, and the second end 32 of the escape door 24 is flippably mounted onto the corresponding compartment 23, where the second end 32 of the escape door 24 is disposed adjacent to the vehicle top, and the first end 31 of the escape door 24 is disposed adjacent to the vehicle bottom when the escape door 24 is closed. In other words, when the escape door 24 is closed, the first end 31 of the escape door 24 is located below the second end 32 of the escape door 24; and when the escape door 24 is opened, the first end 31 of the escape door 24 may be located below the second end 32 of the escape door 24, or may be located above the second end 32 of the escape door 24. Therefore, the emergency door 24 turns upwards to switch from a closed state to an open state. A turnable or flippable structure is used for the escape door 24, and the passenger in the vehicle can quickly open the escape door 24 in need of only a simple operation, to effectively improve escape efficiency, and facilitate collaboration between the escape door 24 and the escape cover plate 26.

Optionally, collaboration between the escape cover plate 26 and the escape door 24, may be dominated by the escape door 24, or may be dominated by the escape cover plate 26. Specifically, when passengers need to be evacuated, the escape door 24 may be actively opened, and the escape door 24 drives the escape cover plate 26 to open the escape port 25; or the escape cover plate 26 may be actively opened, and the escape cover plate 26 drives the escape door 24 to be opened. Further, the foregoing collaboration is dominated by the escape cover plate 26, that is, the escape cover plate 26 is opened to drive the escape door 24 to be opened. In this way, when the escape cover plate 26 is opened, an article or a passenger above the escape cover plate 26 can be prevented from falling.

Further, as shown in FIG. 67 and FIG. 68, an escape ladder 27 leading to the escape passage 11 is disposed in the escape port 25, and after the escape port 25 is opened, a passenger in the vehicle may be transferred to the escape passage 11 through the escape ladder 27.

Optionally, the escape ladder 27 may be in a fixed state and is always suspending in the escape port 25, and a lower end of the escape ladder 27 and an inner bottom surface of the escape passage 11 are spaced apart, so as to avoid affecting travelling of the rail vehicle 20.

The escape ladder 27 may alternatively have two states, namely, a retraction state and a stretching state, and the vehicle body further includes a stretching/retraction driving device used to drive stretching/retraction of the escape ladder 27. After the escape port 25 is opened, the escape ladder 27 may be manually controlled to stretch into the escape passage 11, or the escape ladder 27 may automatically stretch into the escape passage 11 through collaboration. In this embodiment, after stretching, the escape ladder 27 may be directly placed on the inner bottom surface of the escape passage 11, or the escape ladder 27 and the inner bottom surface of the escape passage 11 may be spaced apart.

Further, the escape cover plate 26 may be pivotably mounted onto the escape door 24. After the escape door 24 is flipped upward and is opened, the escape cover plate 26 rotates collaboratively to be laminated onto the inner surface of the escape door 24, thereby saving space, and preventing the escape cover plate 26 from affecting evacuation of passengers.

Figure 6:
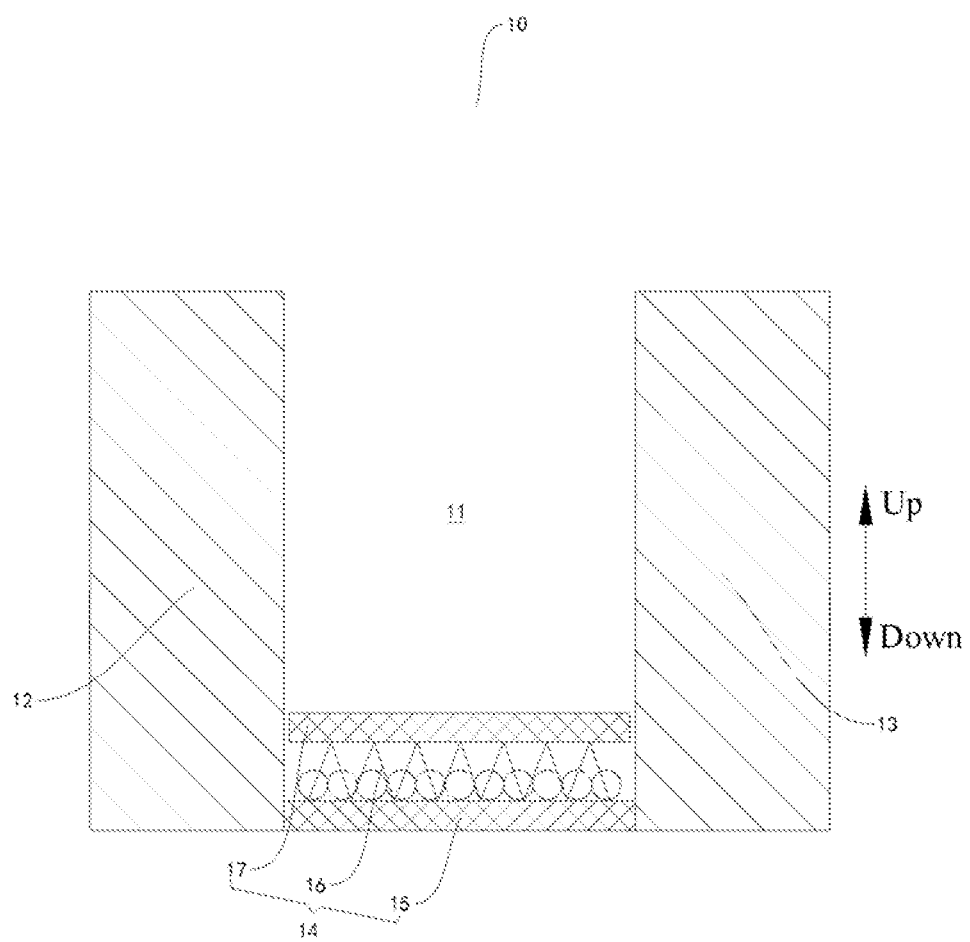
FIG. 6 is a schematic structural diagram of a rail of a rail transport system according to an embodiment of the present disclosure.

In some embodiment of the present disclosure, as shown in FIG. 6, a rail 10 includes a first rail beam 12, a second rail beam 13, and a weight bearing floor 14.

The first rail beam 12 and the second rail beam 13 are disposed in parallel and at an interval, and a bogie 21 straddles the first rail beam 12 and the second rail beam 13. The weight bearing floor 14 is disposed between the first rail beam 12 and the second rail beam 13, the weight bearing floor 14 is connected to the first rail beam 12 and the second rail beam 13, and an escape passage 11 is defined among the first rail beam 12, the second rail beam 13, and the weight bearing floor 14. Therefore, the rail 10 may be provided with the escape passage 11 by using the structure of the rail 10, and no additional component needs to be disposed. Therefore, costs are low, occupied space is small, and it is favorable to reduction in the weight borne by the rail 10. Moreover, the dimension of the rail beam is relatively small, the occupied space area is small, the weight is relatively light, the energy efficiency is high, and the economic performance is good.

As shown in FIG. 6, the weight bearing floor 14 includes a connection beam 15, a support frame 16, and a support plate 17. The connection beam 15 extends along an interval direction of the first rail beam 12 and the second rail beam 13, and two ends of the connection beam 15 are respectively connected to a lower portion of the first rail beam 12 and a lower portion of the second rail beam 13. The support frame 16 is mounted onto the connection beam 15. The support plate 17 is connected to the support frame 16 and supported by the support frame 16, and the support plate 17 forms a bottom surface of the escape passage 11. The rail 10 usually needs to be erected overhead by using piers, and there is a predetermined distance between the piers. Therefore, by using the structure of the foregoing weight bearing floor 14, the escape passage 11 extending along the length direction of the rail 10 may be formed between the piers, material consumption is small, and costs are low.

Further, as shown in FIG. 6, the support plate 17 and at least one of the first rail beam 12 and the second rail beam 13 are spaced apart in a horizontal direction. In other words, the support plate 17 and the first rail beam 12 are spaced apart in the horizontal direction, or the support plate 17 and the second rail beam 13 are spaced apart in the horizontal direction, or the support plate 17 and each of the first rail beam 12 and the second rail beam 13 are spaced apart in the horizontal direction. In this way, it may be convenient to insert a tool into a gap between the support frame 16 and a rail beam, thereby levering the support plate 17 to facilitate repair.

Optionally, there is a plurality of connection beams 15 that is spaced apart along the length direction of the rail 10, and there is a plurality of support plates 17 that is sequentially connected along the length direction of the rail 10. On one hand, a single connection beam 15 and a single support plate 17 better facilitate machining, and on the other hand, facilitate entire construction of the rail 10.

A person skilled in the art needs to understand that, sequential connection between the plurality of support plates 17 includes direct connection or indirect connection, and is Further direct connection. When the plurality of support plates 17 is indirectly connected, a gap between neighboring support plates 17 needs to ensure that passengers can smoothly stride, that is, does not affect evacuation of the passengers.

Further, the rail 10 further includes an anti-dropping edge 18. In an embodiment, the anti-dropping edge 18 is disposed at at least one of an upper end and a lower end of at least one of the first rail beam 12 and the second rail beam 13, and the anti-dropping edge 18 extends outward along the horizontal direction and is used to prevent the bogie 21 from being disengaged from the rail 10. In an embodiment, the anti-dropping edge 18 may be disposed on the top and/or the bottom of the first rail beam 12, and may be disposed on an outer side surface and/or an inner side surface of the first rail beam 12; or the anti-dropping edge 18 may be disposed on the top and/or the bottom of the second rail beam 13, and may be disposed on an outer side surface and/or an inner side surface of the second rail beam 13. Herein, a person skilled in the art needs to understand that, the anti-dropping edge 18 is disposed to prevent the bogie 21 from being disengaged from the rail 10, thereby ensuring stability of the rail vehicle 20 in a travelling situation such as bending, and therefore, a partial structure of the bogie 21 needs to be placed right below the anti-dropping edge 18 on the top and/or right above the anti-dropping edge 18 on the bottom.

Figure 8:
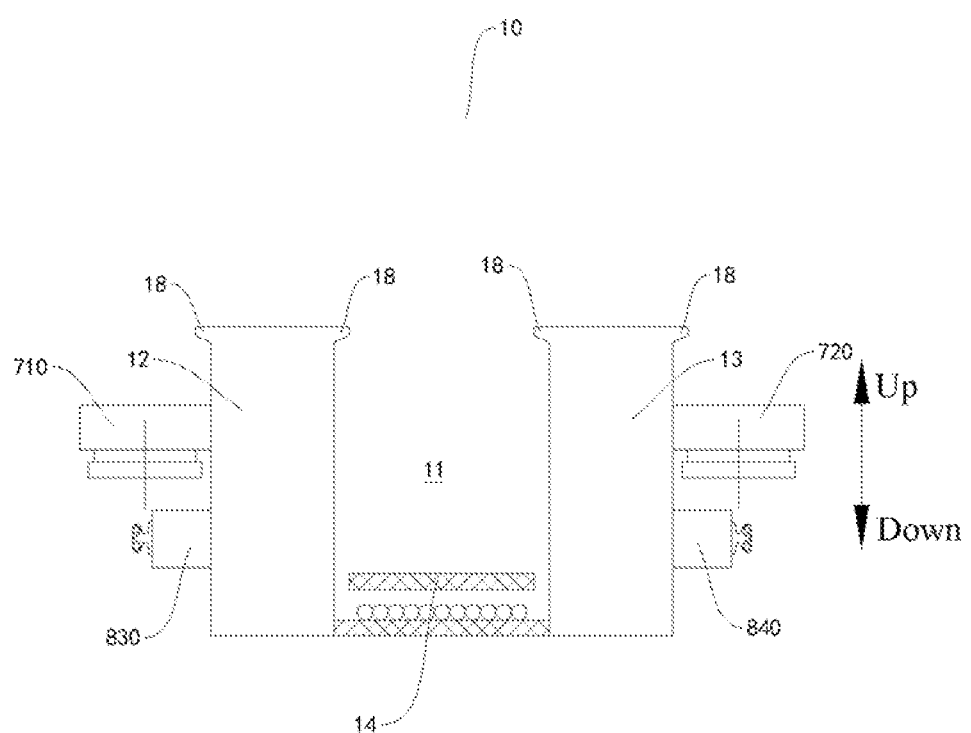
FIG. 8 is a schematic structural diagram of a rail of a rail transport system according to another embodiment of the present disclosure.

For example, as shown in FIG. 8, the first rail beam 12 and the second rail beam 13 are formed by bonding reinforcing steel bars and concrete. Each of the inner side surface and the outer side surface of the top of the first rail beam 12 is provided with an anti-dropping edge 18, and each of the inner side surface and the outer side surface of the top of the second rail beam 13 is provided with an anti-dropping edge 18. A first horizontal wheel 710 of the bogie 21 fits in on the outer side surface of the first rail beam 12 and is located below the anti-dropping edge 18 on the outer side surface of the top of the first rail beam 12, and a second horizontal wheel 720 of the bogie 21 fits in on the outer side surface of the second rail beam 13 and is located below the anti-dropping edge 18 on the outer side surface of the top of the second rail beam 13. In this way, the anti-dropping edges 18 may stop the horizontal wheels from moving upward, thereby playing an anti-dropping role.

Figure 9:
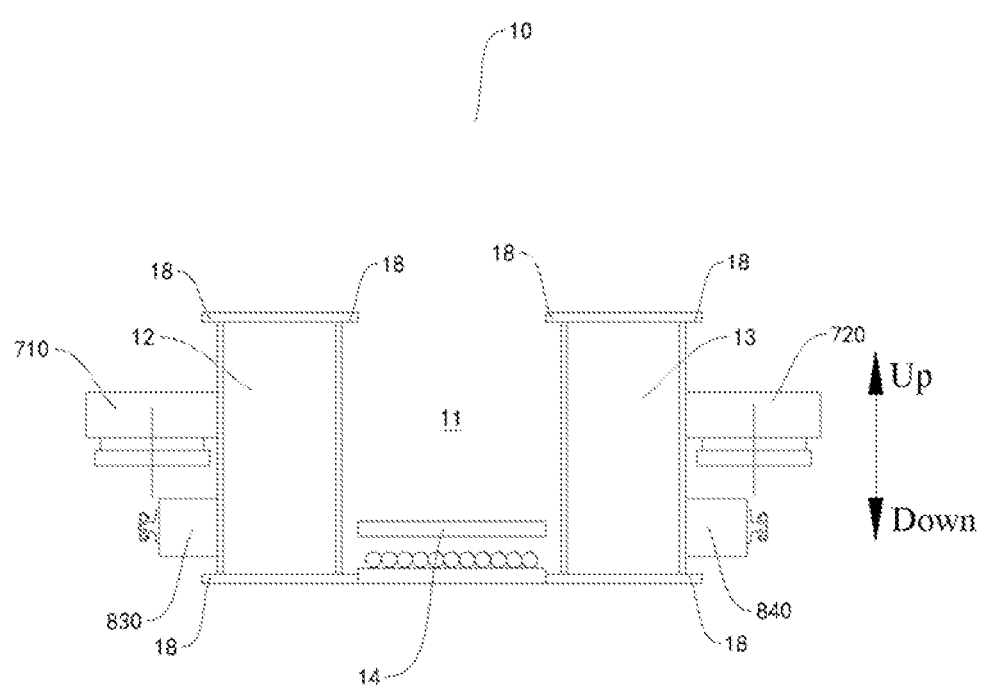
FIG. 9 is a schematic structural diagram of a rail of a rail transport system according to another embodiment of the present disclosure.

As shown in FIG. 9, the first rail beam 12 and the second rail beam 13 are formed by splicing steel plates. Each of the inner side surface and the outer side surface of the top of the first rail beam 12 is provided with an anti-dropping edge 18, each of the inner side surface and the outer side surface of the bottom of the first rail beam 12 is provided with an anti-dropping edge 18, each of the inner side surface and the outer side surface of the top of the second rail beam 13 is provided with an anti-dropping edge 18, and each of the inner side surface and the outer side surface of the bottom of the second rail beam 13 is provided with an anti-dropping edge 18. A first horizontal wheel 710 of the bogie 21 fits in on the outer side surface of the first rail beam 12 and is located between the anti-dropping edge 18 on the outer side surface of the top of the first rail beam 12 and the anti-dropping edge 18 on the outer side surface of the bottom, and a second horizontal wheel 720 of the bogie 21 fits in on the outer side surface of the second rail beam 13 and is located between the anti-dropping edge 18 on the outer side surface of the top of the second rail beam 13 and the anti-dropping edge 18 on the outer side surface of the bottom. In this way, the anti-dropping edges 18 may stop the horizontal wheels from moving upward and downward to prevent the first horizontal wheel 710 from being separated from the first rail beam 12 and prevent the second horizontal wheel 720 from being separated from the second rail beam 13, thereby playing an anti-dropping role.

Figure 10:
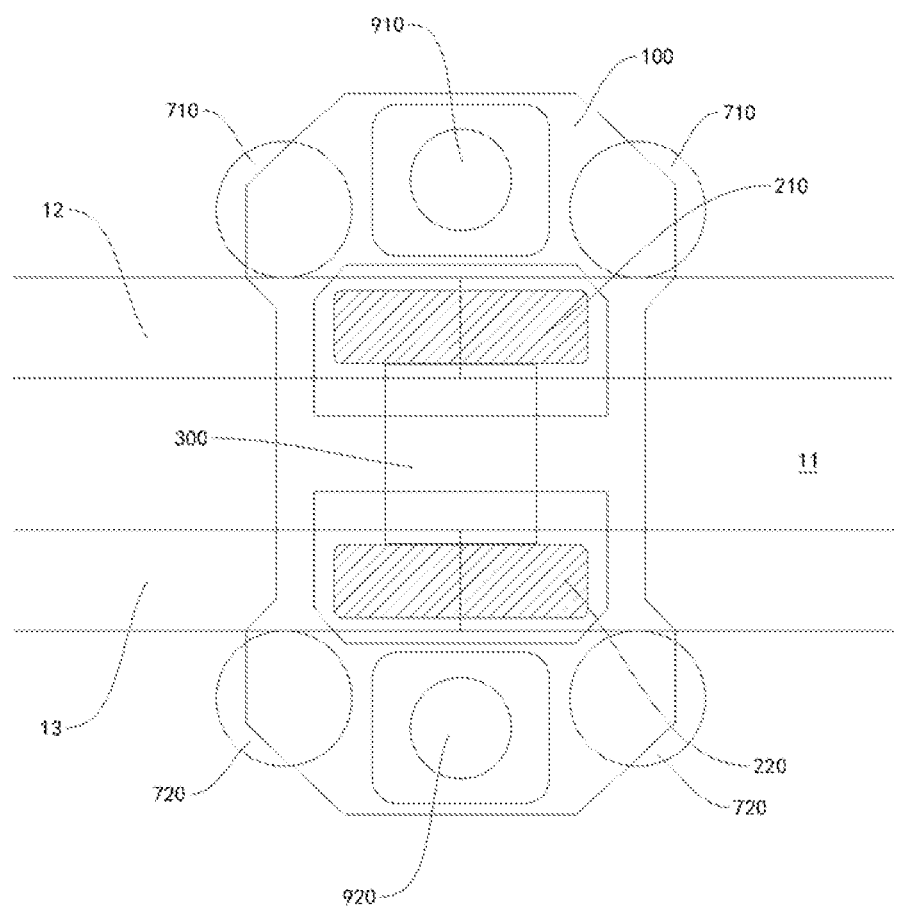
FIG. 10 is a schematic structural diagram of a bogie of a rail vehicle according to an embodiment of the present disclosure.

In some embodiments of the present disclosure, as shown in FIG. 10, the bogie 21 includes a bogie frame 100, a first running wheel 210, a second running wheel 220, and a driving device 300.

The bogie frame 100 has a second recess 110 suitable for straddling the rail 10, that is, the second recess 110 is disposed in the bogie frame 100. The second recess 110 is a straddle recess. In an embodiment, the second recess 110 is formed by a hollow portion jointly defined by the bottom of the bogie frame 100, a first horizontal wheel 710, and a second horizontal wheel 720, and the innermost sides of the first horizontal wheel 710 and the second horizontal wheel 720 is in contact with the outer side of the rail 10. The first running wheel 210 and the second running wheel 220 are pivotably mounted onto the bogie frame 100 respectively and are coaxially spaced apart. The first running wheel 210 fits in on an upper surface of the first rail beam 12, and the second running wheel 220 fits in on an upper surface of the second rail beam 13. The driving device 300 is mounted onto the bogie frame 100, and the driving device 300 is located between the first running wheel 210 and the second running wheel 220. The first running wheel 210 and the second running wheel 220 are driven by the driving device 300, and under driving of the driving device 300, the first running wheel 210 and the second running wheel 220 drives the bogie 21 to run along the rail 10, thereby pulling the vehicle body 22 to travel. Therefore, the driving device 300 may be mounted by using the gap between the first running wheel 210 and the second running wheel 220, so as to save space, improve space utilization, and facilitate distribution of the center of gravity of the vehicle body 22, and moreover a center distance of a tyre may be increased, to improve uniform stability of driving of the driving device 300 for the first running wheel 210 and the second running wheel 220, thereby improving stability and comfort of the rail transport system 1.

Optionally, the driving device 300 may be a motor, the motor has a first motor shaft and a second motor shaft operating synchronously, the first motor shaft is in transmission connection to the first running wheel 210, and the second motor shaft is in transmission connection to the second running wheel 220. Therefore, the driving device 300 drives the first running wheel 210 by using the first motor shaft and drives the second running wheel 220 by using the second motor shaft, and makes the first running wheel 210 and the second running wheel 220 operate synchronously.

Further, the first motor shaft and the second motor shaft are coaxially disposed and are one integrally-formed piece. In this way, not only coaxiality of the first motor shaft and the second motor shaft can be ensured, but also the first running wheel 210 and the second running wheel 220 can be driven by the driving device 300 to operate synchronously.

In some other embodiments of the present disclosure, as shown in FIG. 46 to FIG. 49, the bogie 21 includes a bogie frame 100, a first running wheel 210, a second running wheel 220, a third running wheel 230, a fourth running wheel 240, and at least one driving device.

The bogie frame 100 has a second recess 110 suitable for straddling the rail 10, that is, the second recess 110 is disposed in the bogie frame 100. The first running wheel 210 and the second running wheel 220 are pivotably mounted onto the bogie frame 100 respectively and are coaxially spaced apart. The first running wheel 210 fits in on an upper surface of the first rail beam 12, and the second running wheel 220 fits in on an upper surface of the second rail beam 13. The third running wheel 230 and the fourth running wheel 240 are pivotably mounted onto the bogie frame 100 respectively and are coaxially spaced apart. The third running wheel 230 fits in on the upper surface of the first rail beam 12 and is spaced apart from the first running wheel 210 in a length direction of the first rail beam 12, and the fourth running wheel 240 fits in on the upper surface of the second rail beam 13 and is spaced apart from the second running wheel 220 in a length direction of the second rail beam 13. The at least one driving device is mounted onto the bogie frame 100, one of the at least one driving device is located between the first running wheel 210 and the second running wheel 220 and/or one of the at least one driving device is located between the third running wheel 230 and the fourth running wheel 240, and the first running wheel 210 and the second running wheel 220 are driven by one driving device and/or the third running wheel 230 and the fourth running wheel 240 are driven by another driving device. In this way, a requirement of bearing a relatively large weight can be satisfied, and the four running wheels can bear a larger weight, which is a favorable improvement in each of the quantity of passengers in the rail vehicle 20 and the dimension of the vehicle body. Moreover, space use efficiency of the bogie 21 can be effectively improved, thereby reducing the occupied space area of the entire vehicle.

Optionally, the at least one driving device may be a motor, the motor has a first motor shaft and a second motor shaft operating synchronously, the first motor shaft is in transmission connection to the first running wheel 210 or the third running wheel 230, and the second motor shaft is in transmission connection to the second running wheel 220 or the fourth running wheel 240. Therefore, the at least one driving device drives the first running wheel 210 or the third running wheel 230 by using the first motor shaft and drives the second running wheel 220 or the fourth running wheel 240 by using the second motor shaft, and makes the first running wheel 210 and the second running wheel 220 operate synchronously and the third running wheel 230 and the fourth running wheel 240 operate synchronously.

Further, the first motor shaft and the second motor shaft are coaxially disposed and are one integrally-formed piece. In this way, not only coaxiality of the first motor shaft and the second motor shaft can be ensured, but also the first running wheel 210 and the second running wheel 220 can be driven by the at least one driving device to operate synchronously and the third running wheel 230 and the fourth running wheel 240 can be driven by the at least one driving device to operate synchronously.

Figure 46:
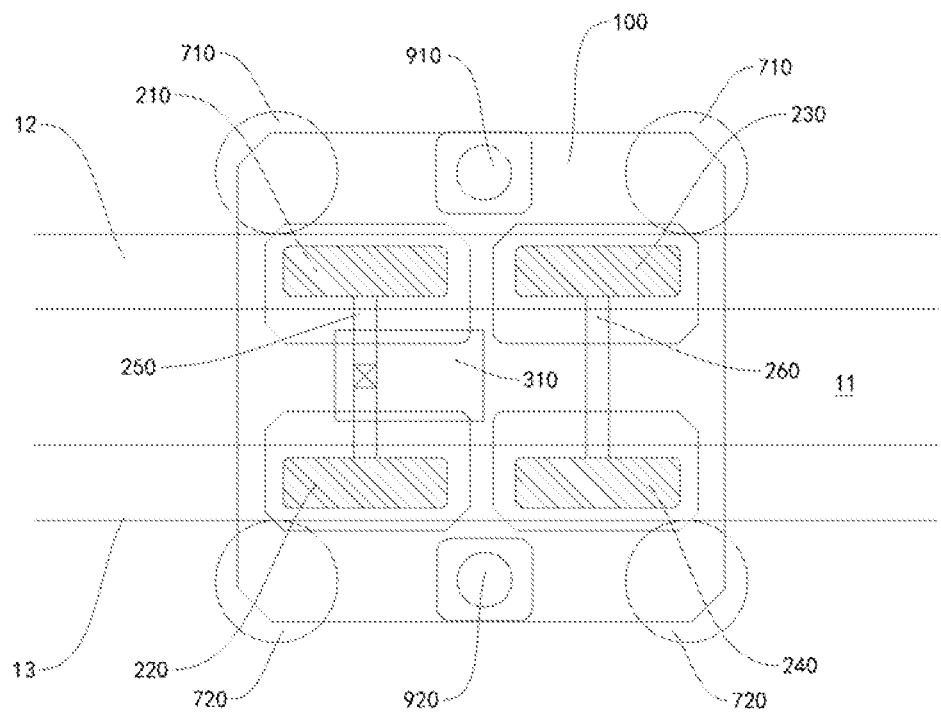
FIG. 46 is a schematic structural diagram of a bogie of a rail vehicle according to another embodiment of the present disclosure.

For example, as shown in FIG. 46, the at least one driving device includes a first driving device 310, the first driving device 310 is disposed between the first running wheel 210 and the second running wheel 220, and the first running wheel 210 and the second running wheel 220 are driven by the first driving device 310.

Figure 47:
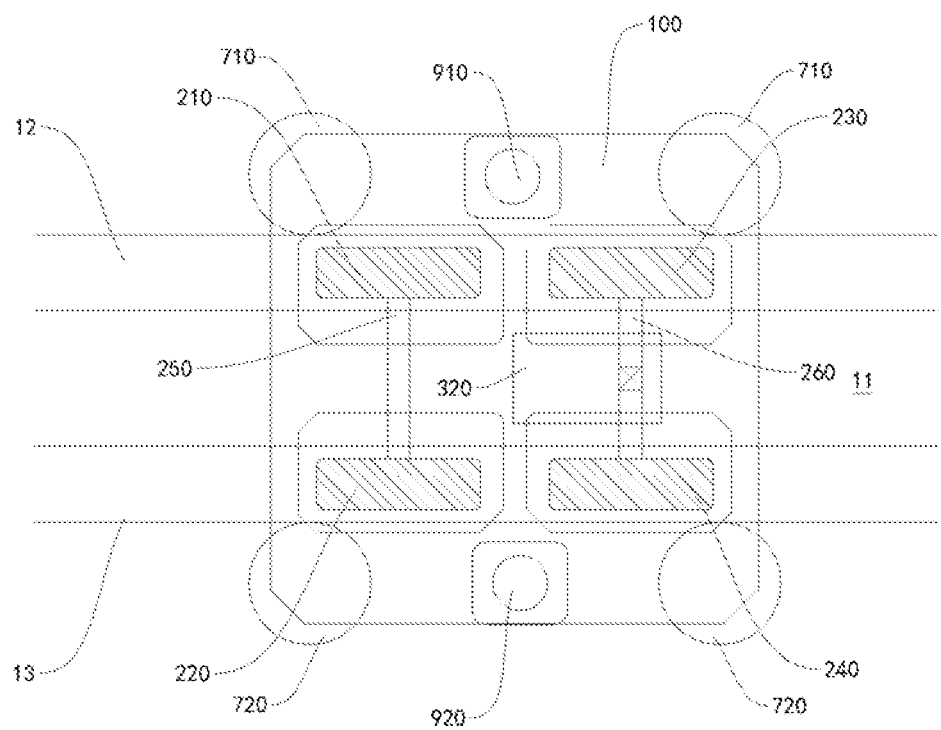
FIG. 47 is a schematic structural diagram of a bogie of a rail vehicle according to another embodiment of the present disclosure.

As shown in FIG. 47, the at least one driving device includes a second driving device 320, the second driving device 320 is disposed between the third running wheel 230 and the fourth running wheel 240, and the third running wheel 230 and the fourth running wheel 240 are driven by the second driving device 320.

Figure 48:
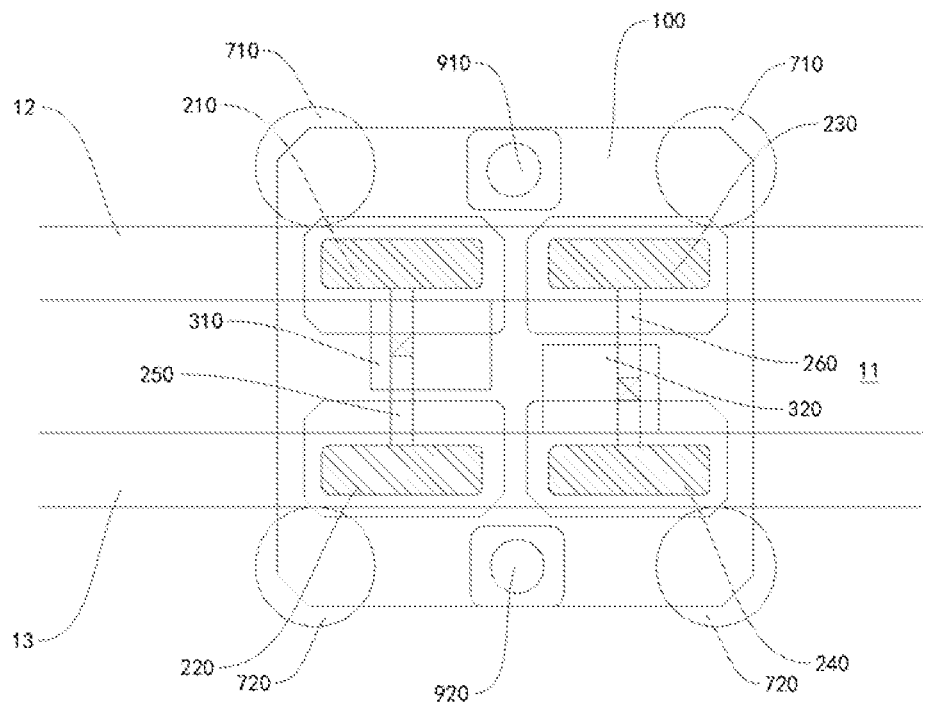
FIG. 48 is a schematic structural diagram of a bogie of a rail vehicle according to another embodiment of the present disclosure.

As shown in FIG. 48, the at least one driving devices includes a first driving device 310 and a second driving device 320 respectively. The first driving device 310 is disposed between the first running wheel 210 and the second running wheel 220, and the first running wheel 210 and the second running wheel 220 are driven by the first driving device 310. The second driving device 320 is disposed between the third running wheel 230 and the fourth running wheel 240, and the third running wheel 230 and the fourth running wheel 240 are driven by the second driving device 320. The first driving device 310 is closer to the first running wheel 210 than the second running wheel 220, and/or the second driving device 320 is closer to the fourth running wheel 240 than the third running wheel 230. Further, the first driving device 310 is closer to the first running wheel 210 than the second running wheel 220, and the second driving device 320 is closer to the fourth running wheel 240 than the third running wheel 230. To be specific, the first driving device 310 and the second driving device 320 are diagonally disposed. Therefore, the bogie 21 is balanced in a width direction of the rail 10, and a differential may be saved, thereby reducing costs.

Optionally, the first running wheel 210 and the second running wheel 220 are connected by using a first connection shaft 250 and/or the third running wheel 230 and the fourth running wheel 240 are connected by using a second connection shaft 260. The at least one driving device is in transmission connection to the first connection shaft 250 and/or the second connection shaft 260.

Figure 49:
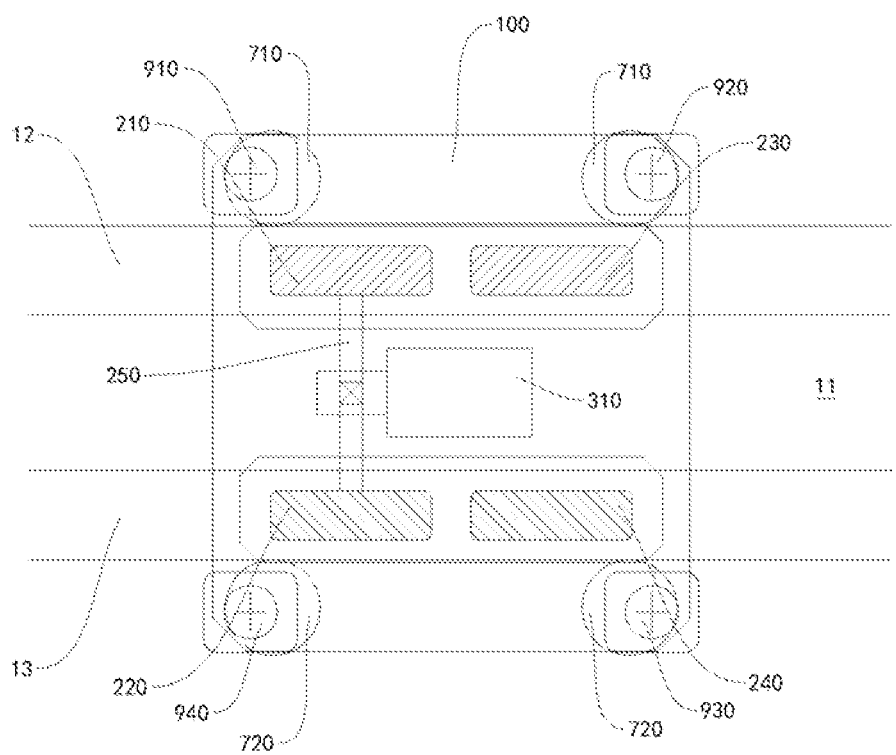
FIG. 49 is a schematic structural diagram of a bogie of a rail vehicle according to another embodiment of the present disclosure.

For example, as shown in FIG. 49, the first running wheel 210 and the second running wheel 220 are connected by using a first connection shaft 250, the third running wheel 230 and the fourth running wheel 240 are connected without a connection shaft and are follower wheels, there is one driving device defined as a first driving device 310, and the first driving device 310 is in transmission connection to the first connection shaft 250.

In other words, FIG. 10 shows the bogie 21 having two running wheels, FIG. 46 to FIG. 49 show the bogie 21 having four running wheels, and the bogie having four running wheels may have a single connection shaft, or may have two connection shafts. The structure of two connection shafts may be used, and stability performance and safety performance of the system can be greatly improved.

Figure 4:
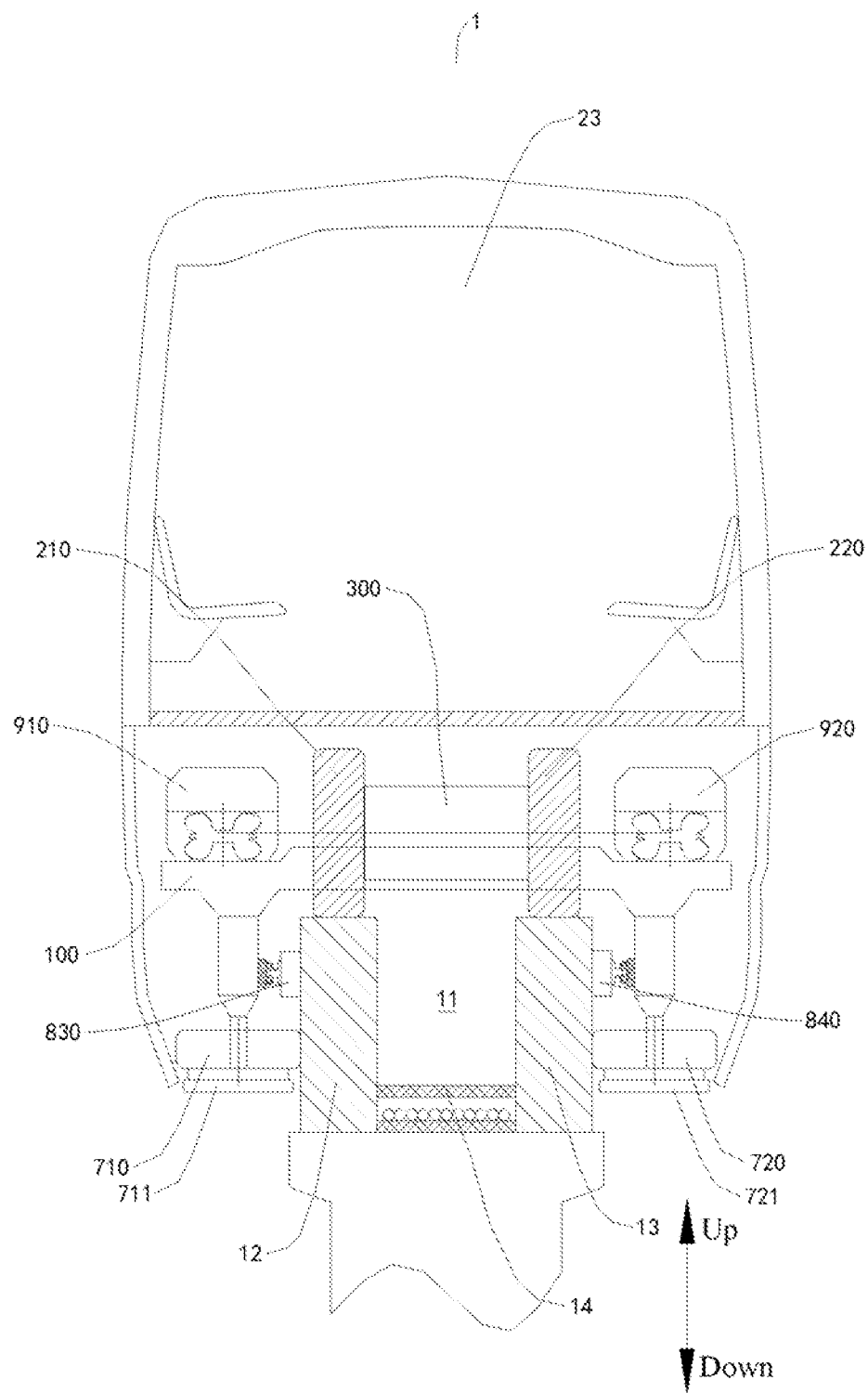
FIG. 4 is a sectional view of a rail transport system according to an embodiment of the present disclosure.
Figure 66:
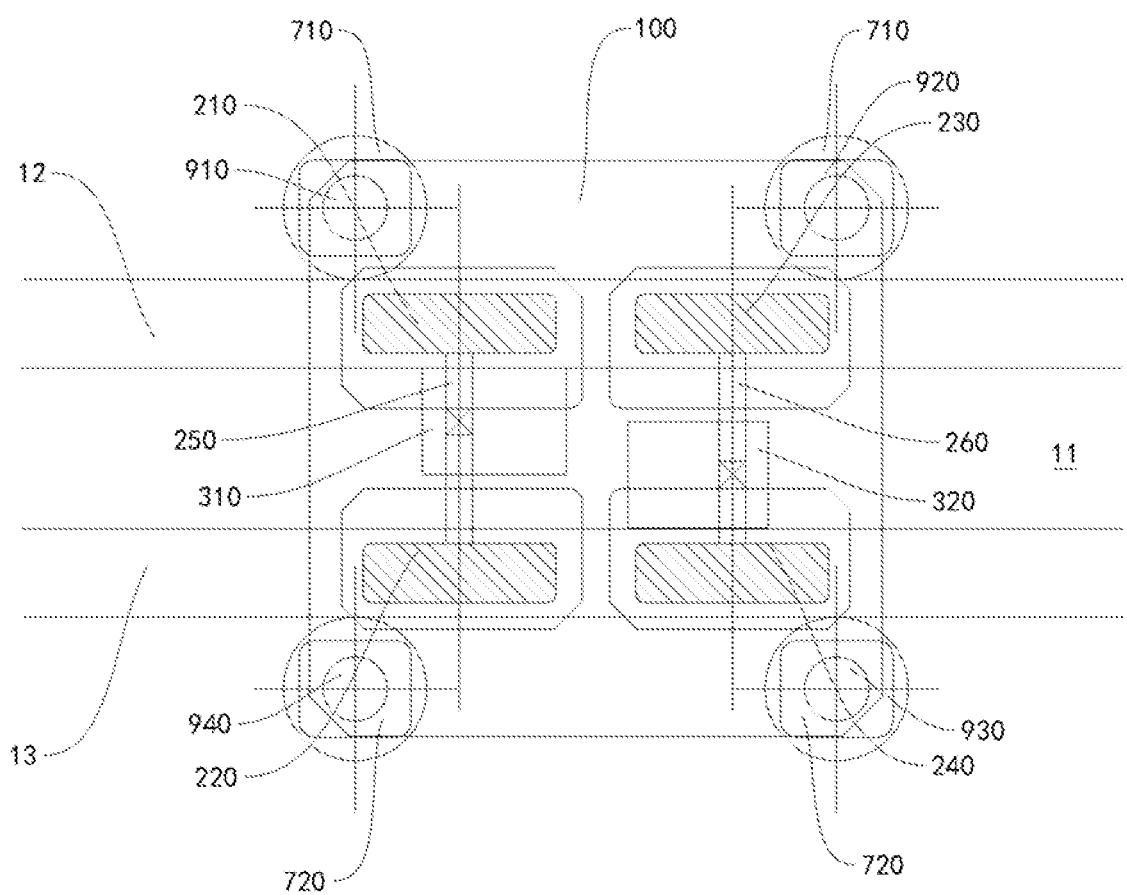
FIG. 66 is a schematic structural diagram of a bogie of a rail vehicle according to another embodiment of the present disclosure.

In some embodiments of the present disclosure, as shown in FIG. 4 to FIG. 66, the bogie 21 further includes a first horizontal wheel 710 and a second horizontal wheel 720, where there may be one or more first horizontal wheels 710 and one or more second horizontal wheels 720 respectively.

The first horizontal wheel 710 is pivotably mounted onto the bogie frame 100 and is suitable for fitting in on the first side of the rail 10, and the second horizontal wheel 720 is pivotably mounted onto the bogie frame 100 and is suitable for fitting in on the second side of the rail 10. In an embodiment, The first horizontal wheel 710 fits in on a side surface of the first rail beam 12, and the second horizontal wheel 720 fits in on a side surface of the second rail beam 13. On one hand, when the rail 10 is steered, the first horizontal wheel 710 and the second horizontal wheel 720 fit in on a side surface of the rail 10, thereby being passively steered along the rail 10, and then driving the rail vehicle 20 to be steered. On the other hand, stability of the rail vehicle 20 during travelling may be improved.

Figure 5:
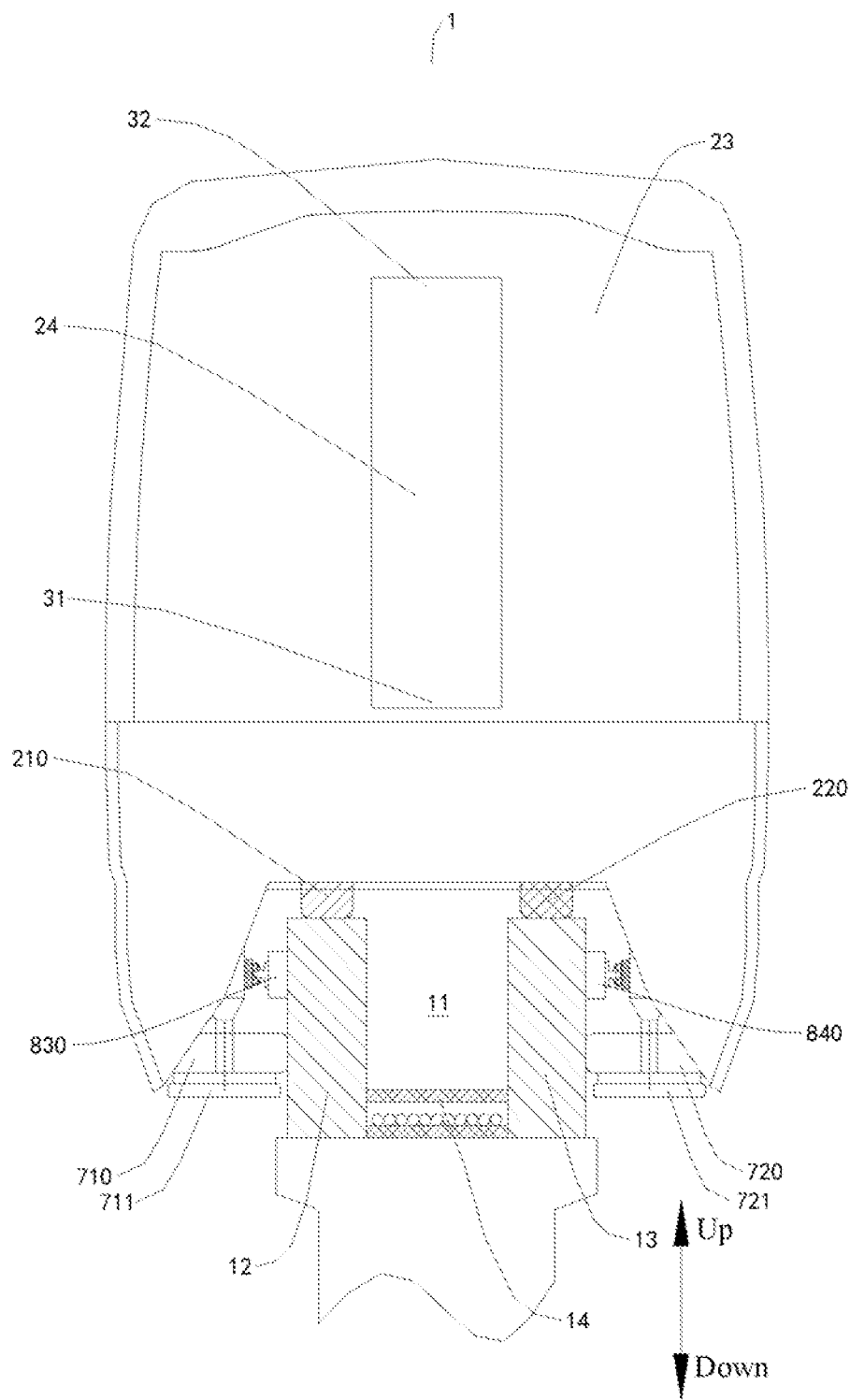
FIG. 5 is a sectional view of a rail transport system according to another embodiment of the present disclosure.
Figure 7:
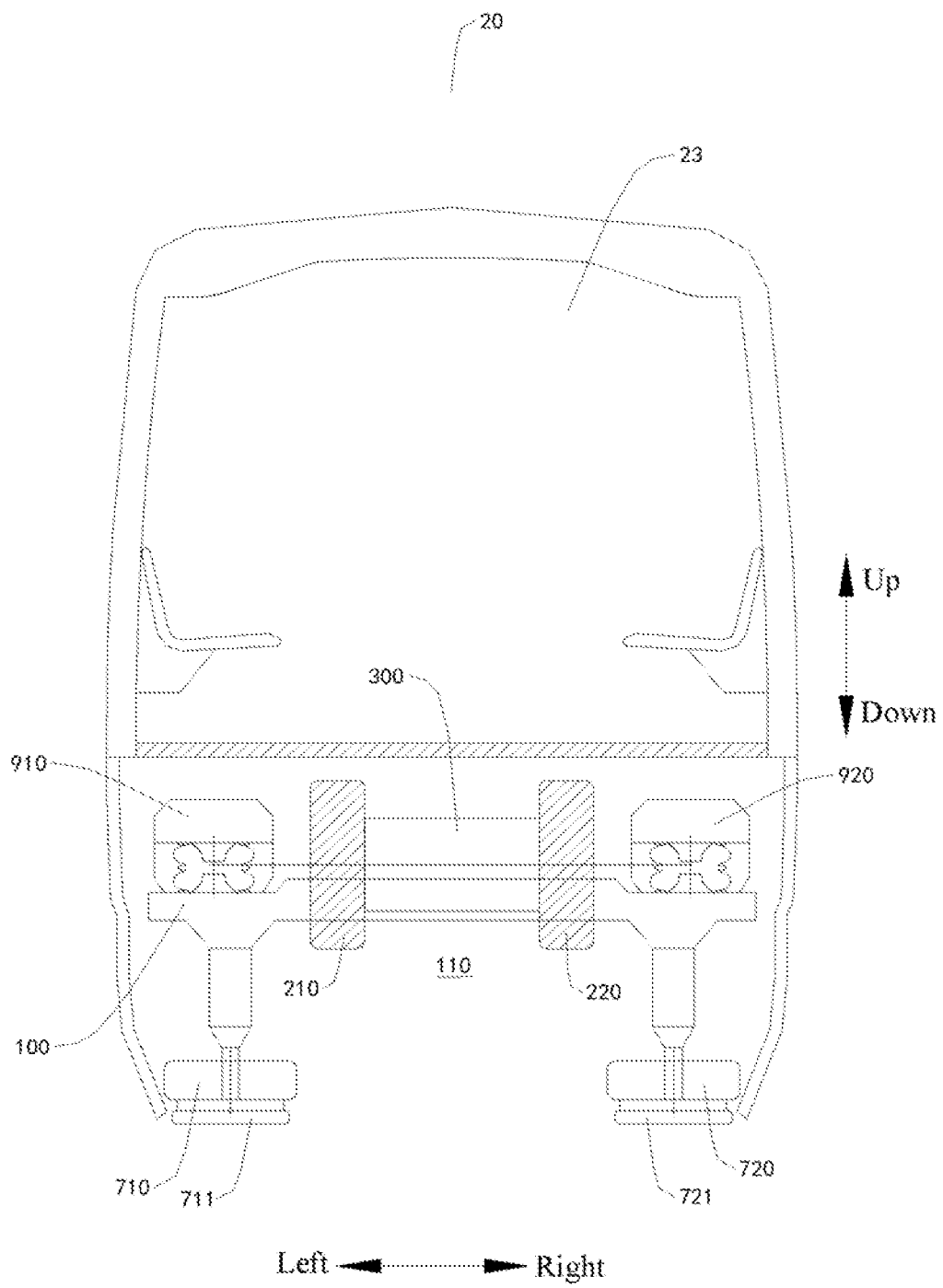
FIG. 7 is a schematic structural diagram of a rail vehicle according to an embodiment of the present disclosure.

Further, the bogie 21 further includes a first horizontal safety wheel 711 connected to the first horizontal wheel 710 and moving in synchronization with the first horizontal wheel 710, and a second horizontal safety wheel 721 connected to the second horizontal wheel 720 and moving in synchronization with the second horizontal wheel 720, the outer diameter of the first horizontal safety wheel 711 is less than the outer diameter of the first horizontal wheel 710, and the outer diameter of the second horizontal safety wheel 721 is less than the outer diameter of the second horizontal wheel 720. As shown in FIG. 4, FIG. 5, and FIG. 7, the bottom of the first horizontal wheel 710 is connected to a first horizontal safety wheel 711 moving in synchronization with the first horizontal wheel 710, and the outer diameter of the first horizontal safety wheel 711 is less than the outer diameter of the first horizontal wheel 710. The bottom of the second horizontal wheel 720 is connected to a second horizontal safety wheel 721 moving in synchronization with the second horizontal wheel 720, and the outer diameter of the second horizontal safety wheel 721 is less than the outer diameter of the second horizontal wheel 720. Normally, the first horizontal safety wheel 711 and the second horizontal safety wheel 721 are not in contact with a rail beam. When a tyre of a horizontal wheel is flat, a horizontal safety wheel in place of the horizontal wheel is in contact with the rail beam, to ensure stability of the rail vehicle 20 during travelling. For example, when the first horizontal wheel 710 is normal, the first horizontal safety wheel 711 is not in contact with the first rail beam 12. When a tyre of the first horizontal wheel 710 is flat, the first horizontal safety wheel 711 is in contact with a side surface of the first rail beam 12, thereby replacing the first horizontal wheel 710.

Figure 11:
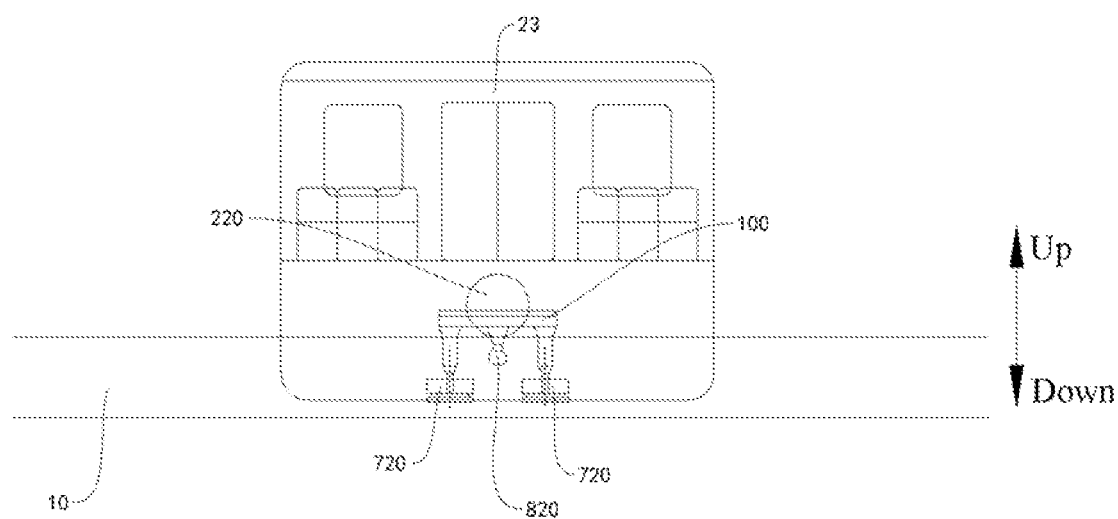
FIG. 11 is a partial schematic structural diagram of a rail transport system according to an embodiment of the present disclosure.
Figure 50:
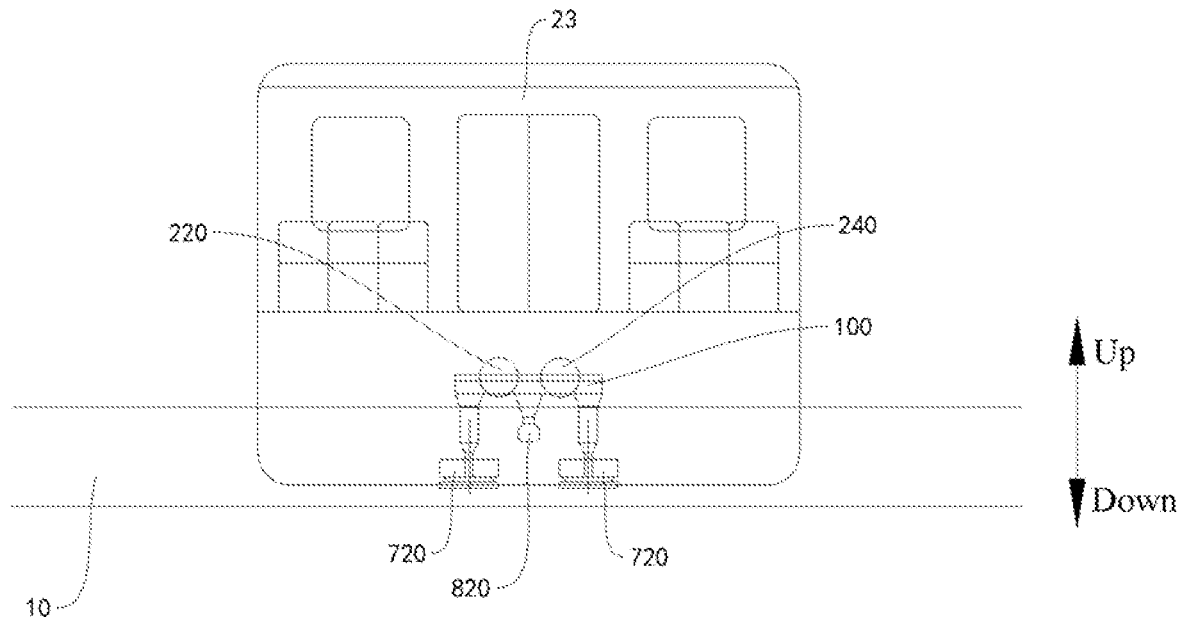
FIG. 50 is a partial schematic structural diagram of a rail transport system according to another embodiment of the present disclosure.

In some embodiment of the present disclosure, as shown in FIG. 11 and FIG. 50, there is a plurality of first horizontal wheels 710 located at a same height in an up and down direction and there is a plurality of second horizontal wheels 720 located at a same height in the up and down direction. FIG. 11 shows an example in which a second horizontal wheel 720 and another second horizontal wheel 720 of a bogie 21 having two running wheels are located at a same height, and FIG. 50 shows an example in which a second horizontal wheel 710 and another second horizontal wheel 720 of a bogie 21 having four running wheels are located at a same height. Therefore, balance of entire steering performance of the rail vehicle 20 may be facilitated, and a force applied during forward movement or backward movement is uniform, thereby facilitating improvement in bend performance of the rail vehicle 20.

Figure 12:
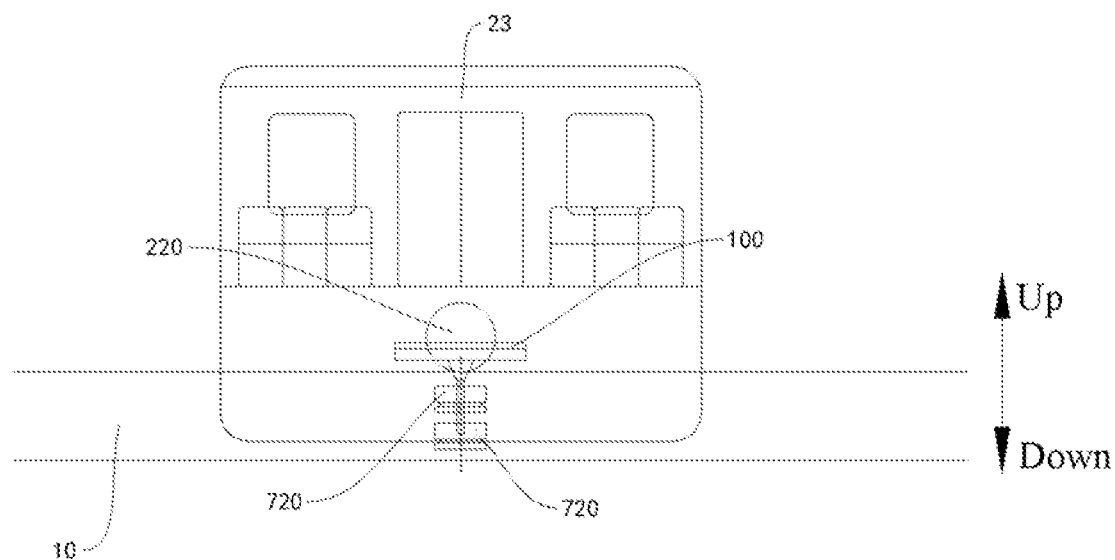
FIG. 12 is a partial schematic structural diagram of a rail transport system according to another embodiment of the present disclosure.
Figure 51:
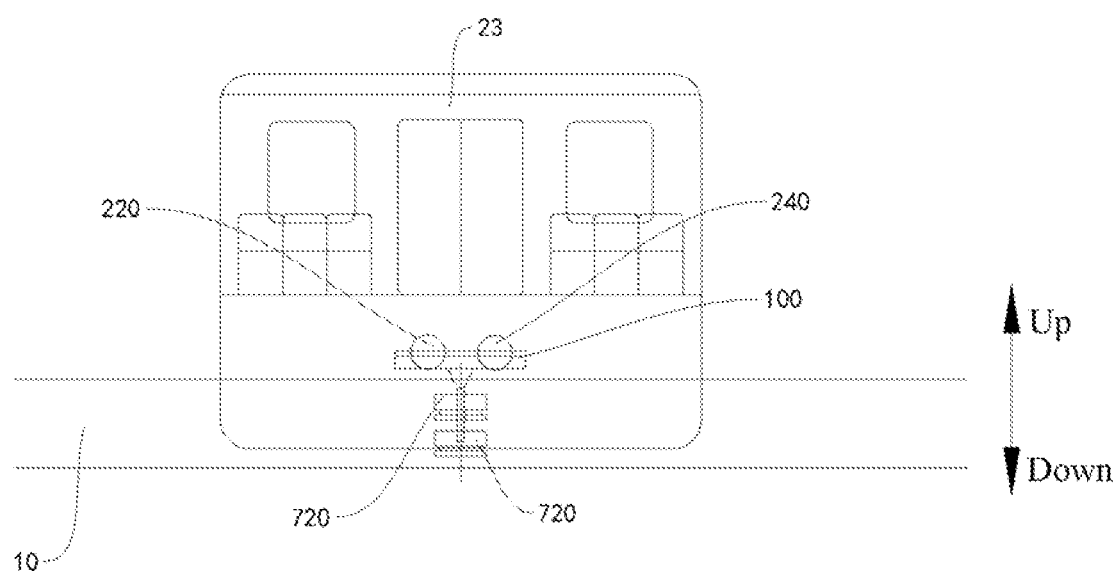
FIG. 51 is a partial schematic structural diagram of a rail transport system according to another embodiment of the present disclosure.

In some specific examples of the present disclosure, as shown in FIG. 12 and FIG. 51, there is a plurality of first horizontal wheels 710 spaced apart and coaxially disposed along an up and down direction and there is a plurality of second horizontal wheels 720 spaced apart and coaxially disposed along the up and down direction. FIG. 12 shows an example in which a plurality of first horizontal wheels 710 of a bogie 21 having two running wheels is coaxially disposed vertically and a plurality of second horizontal wheels 720 is coaxially disposed vertically, and FIG. 51 shows an example in which a plurality of first horizontal wheels 710 of a bogie 21 having four running wheels is coaxially disposed vertically and a plurality of second horizontal wheels 720 is coaxially disposed vertically. In this way, stability performance of the entire vehicle can be improved, and the horizontal wheel on the bottom plays a role of stabilization, thereby reducing an overturn risk of the rail vehicle 20 during bend or high-speed travelling.

Figure 13:
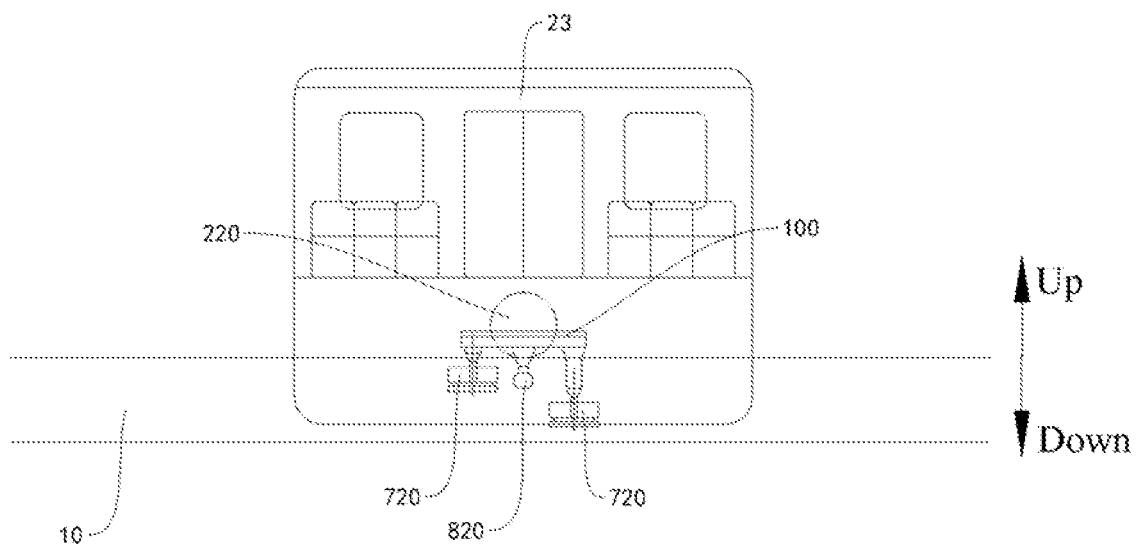
FIG. 13 is a partial schematic structural diagram of a rail transport system according to another embodiment of the present disclosure.
Figure 14:
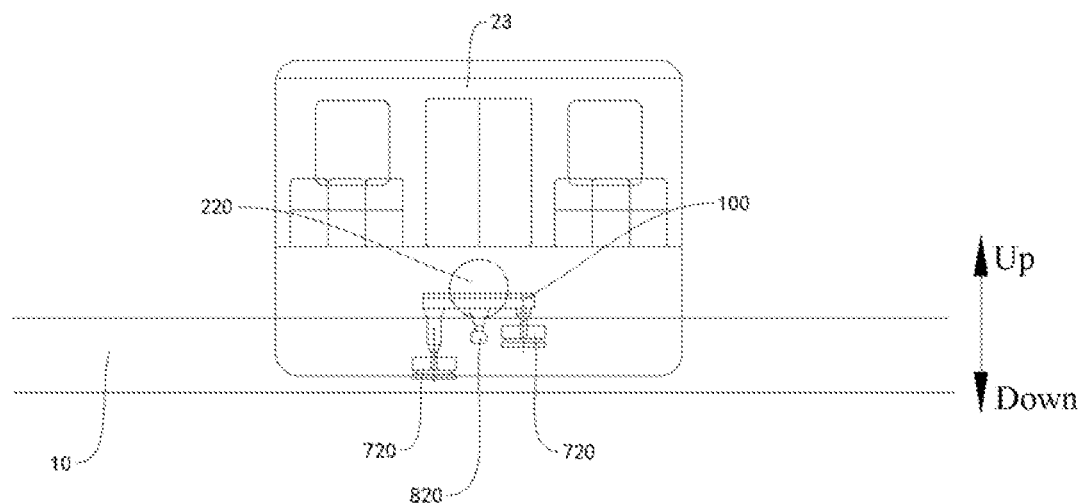
FIG. 14 is a partial schematic structural diagram of a rail transport system according to another embodiment of the present disclosure.
Figure 52:
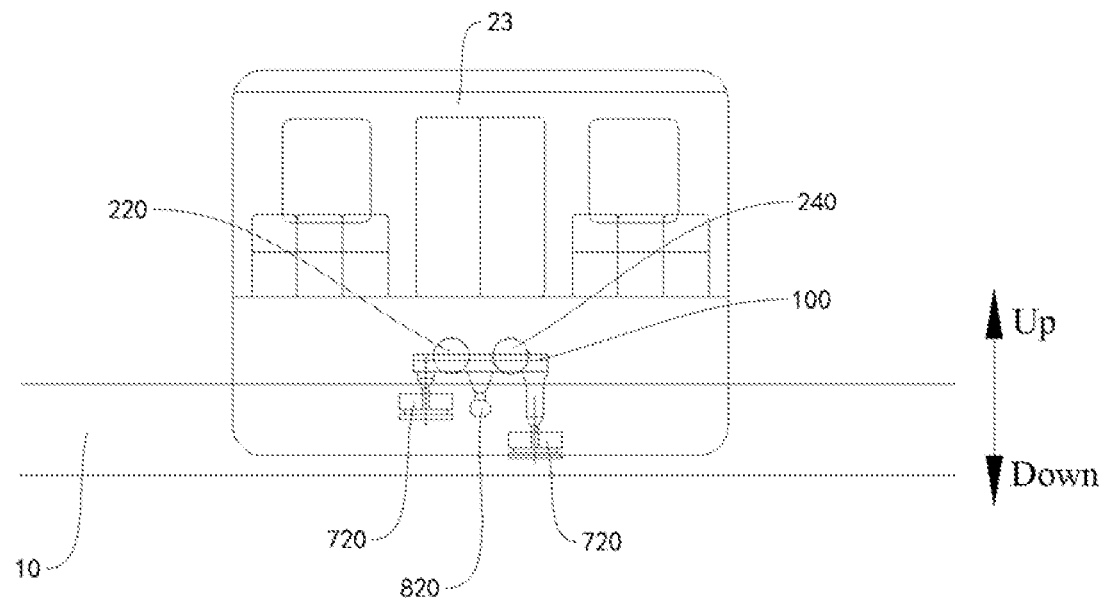
FIG. 52 is a partial schematic structural diagram of a rail transport system according to another embodiment of the present disclosure.
Figure 53:
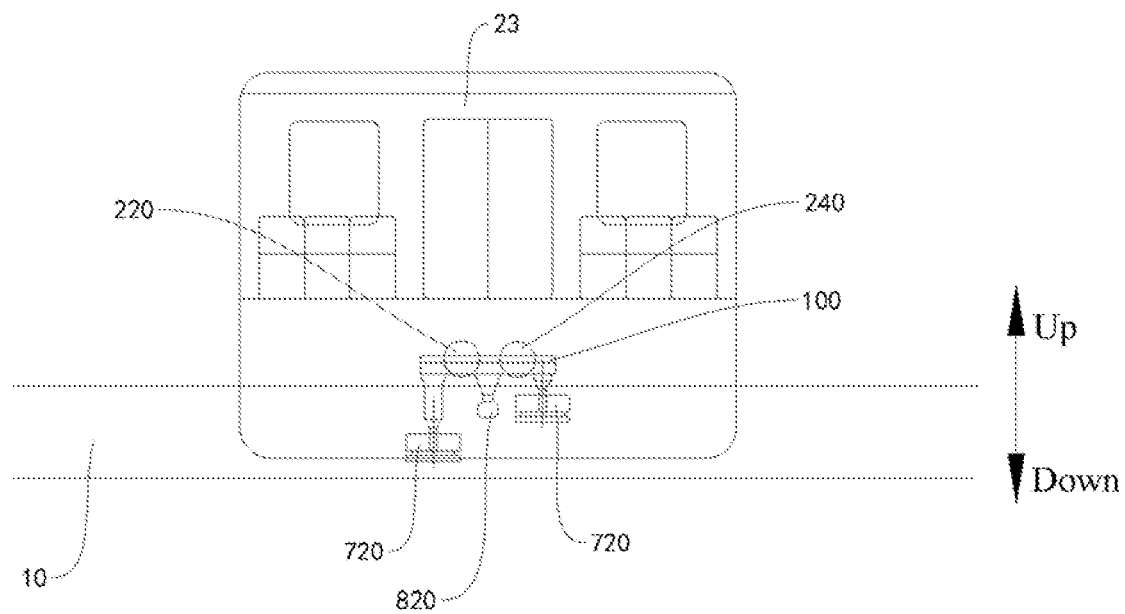
FIG. 53 is a partial schematic structural diagram of a rail transport system according to another embodiment of the present disclosure.
Figure 54:
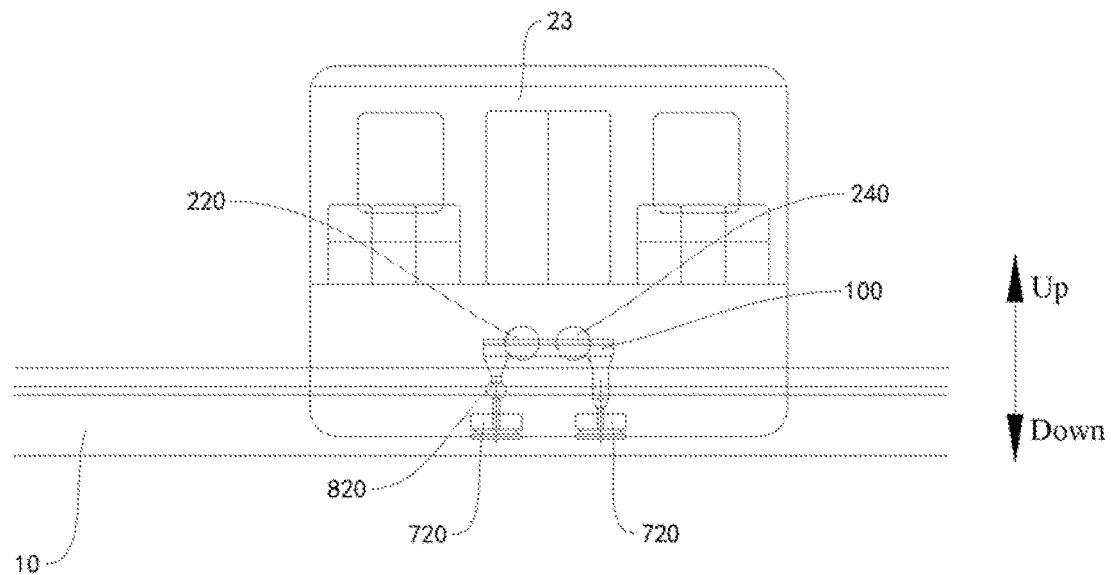
FIG. 54 is a partial schematic structural diagram of a rail transport system according to another embodiment of the present disclosure.
Figure 55:
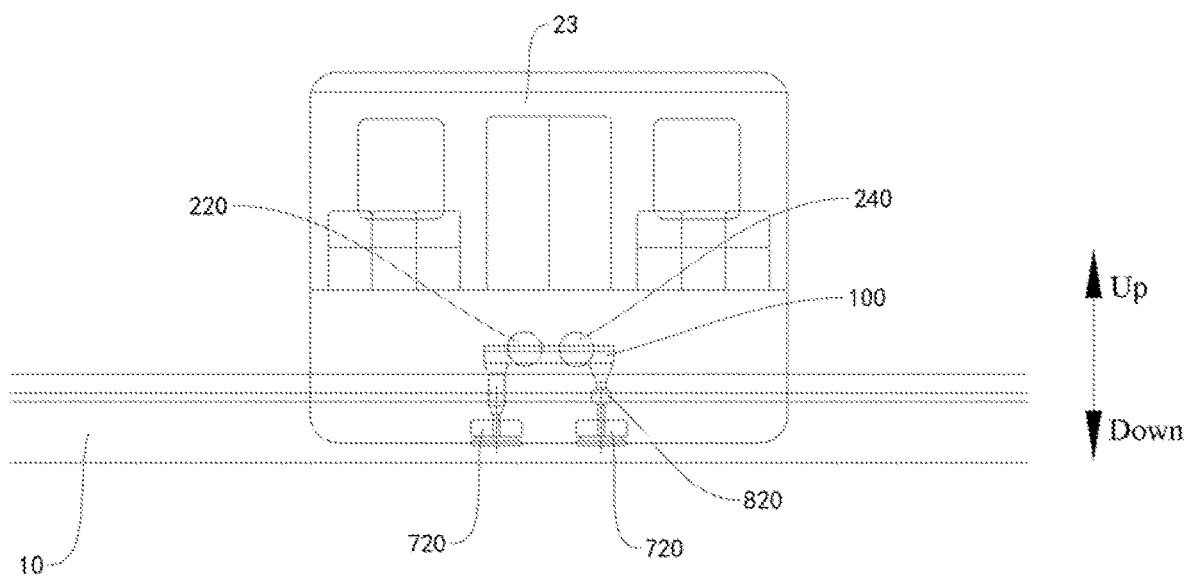
FIG. 55 is a partial schematic structural diagram of a rail transport system according to another embodiment of the present disclosure.
Figure 56:
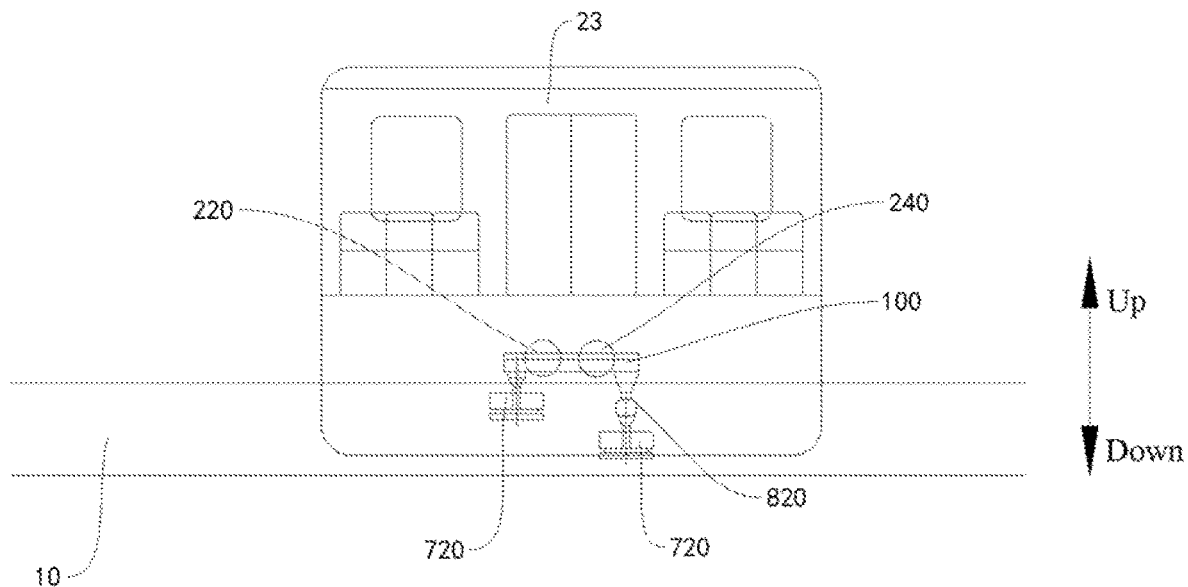
FIG. 56 is a partial schematic structural diagram of a rail transport system according to another embodiment of the present disclosure.
Figure 57:
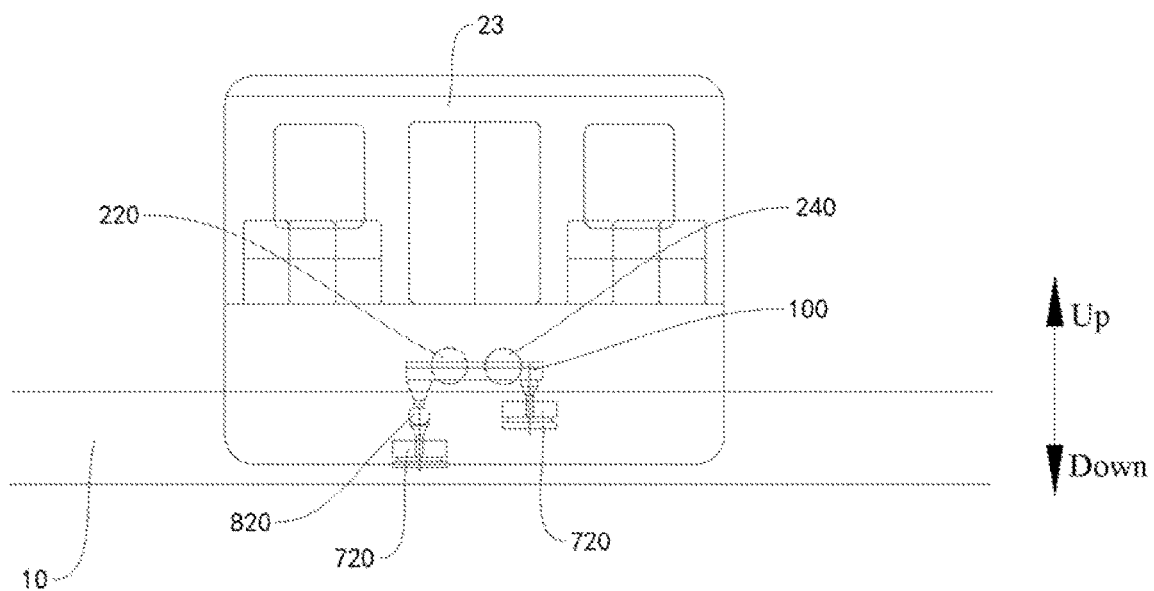
FIG. 57 is a partial schematic structural diagram of a rail transport system according to another embodiment of the present disclosure.

In some examples of the present disclosure, as shown in FIG. 13, FIG. 14, FIG. 52, and FIG. 53, there is a plurality of first horizontal wheels 710 spaced apart along the up and down direction and the length direction of the first rail beam 12 respectively, and there is a plurality of second horizontal wheels 720 spaced apart along the up and down direction and the length direction of the second rail beam 13 respectively. To be specific, the first horizontal wheels 710 are staggered vertically, and the second horizontal wheels 720 are staggered vertically. To be specific, an $n^{th}$ first horizontal wheel 710 may be located above or below an $(n+1)^{th}$ first horizontal wheel 720, and an $(n+2)^{th}$ first horizontal wheel 720 may be located above or below the $(n+1)^{th}$ first horizontal wheel 720. In an embodiment, the $n^{th}$ first horizontal wheel 710 and the $(n+2)^{th}$ first horizontal wheel 720 are located at a same height, where n is an integer greater than or equal to 1. The first horizontal wheel 710 may be located above the second horizontal wheel 720, or may be located below the second horizontal wheel 720. FIG. 13 and FIG. 14 show an example in which first horizontal wheels 710 of a bogie 21 having two running wheels are staggered vertically and second horizontal wheels 720 are staggered vertically, and FIG. 52 and FIG. 53 show an example in which first horizontal wheels 710 of a bogie 21 having four running wheels are staggered vertically and second horizontal wheels 720 are staggered vertically. In this way, the horizontal wheel on the top can play a role of guiding during corresponding travelling, and the horizontal wheel on the bottom is relatively far away from the vehicle body 22, and can play a role of stabilization and overturn prevention.

Figure 15:
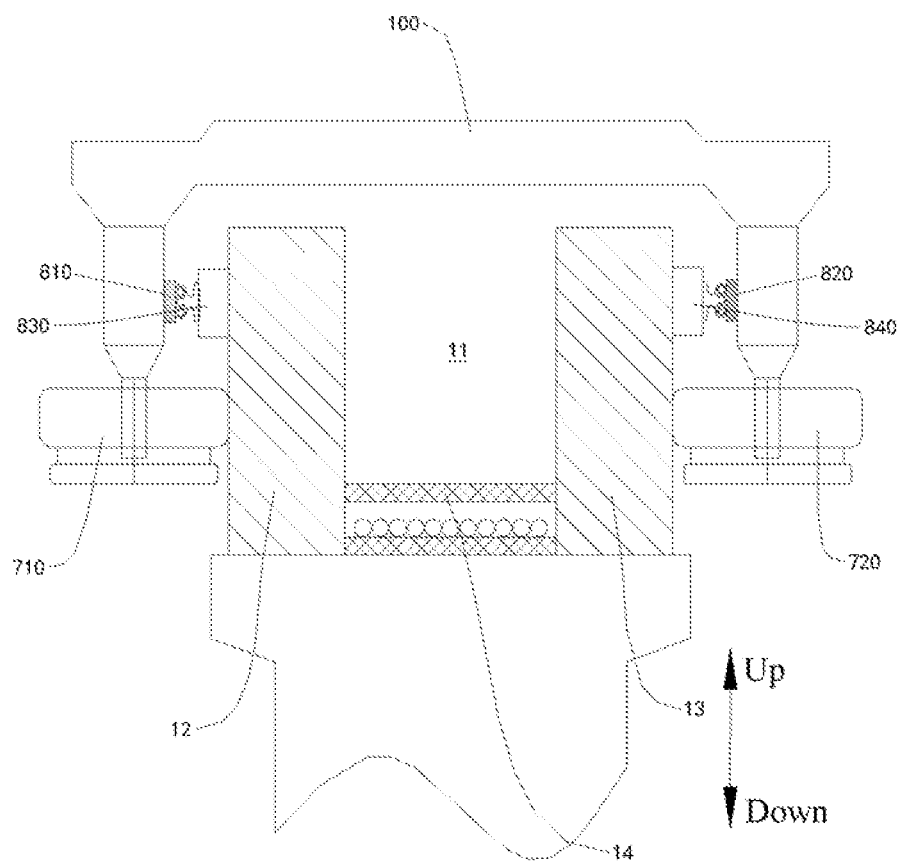
FIG. 15 is a schematic structural diagram of a bogie and a rail of a rail vehicle according to an embodiment of the present disclosure.

In some embodiments of the present disclosure, as shown in FIG. 15, the first horizontal wheel 710 fits in on the outer side surface of the first rail beam 12, and the second horizontal wheel 720 fits in on the outer side surface of the second rail beam 13, that is, both of the horizontal wheels fit in on the outer side surface of the rail 10. Therefore, a center distance between the two horizontal wheels is designed as a possible maximum distance, which can improve stability performance of the system, and also facilitate gravity center distribution of the bogie 21 and the entire vehicle.

Figure 16:
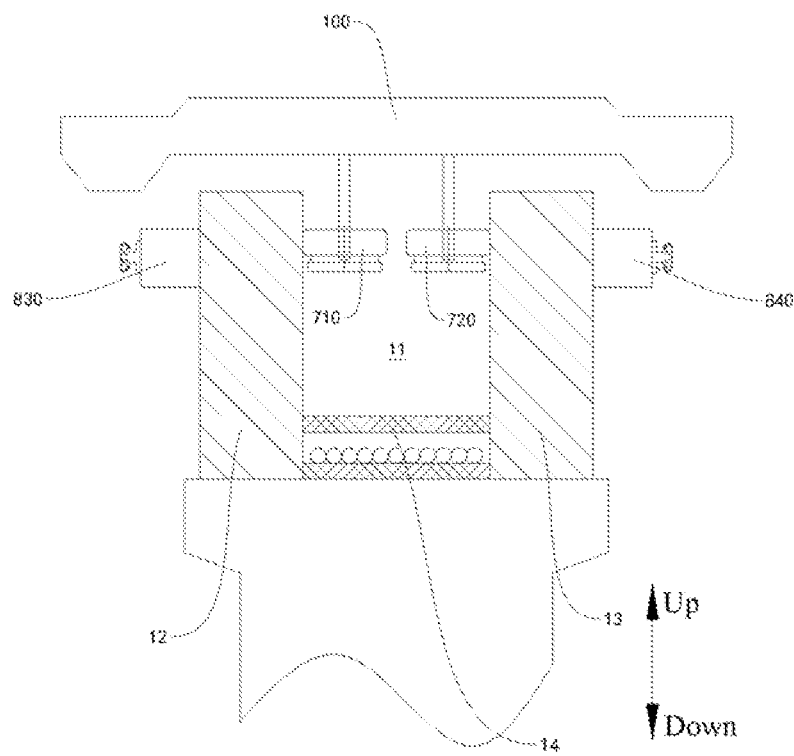
FIG. 16 is a schematic structural diagram of a bogie and a rail of a rail vehicle according to another embodiment of the present disclosure.

In some embodiments of the present disclosure, as shown in FIG. 16, the first horizontal wheel 710 fits in on the inner side surface of the first rail beam 12, and the second horizontal wheel 720 fits in on the inner side surface of the second rail beam 13, that is, both of the horizontal wheels fit in on the inner side surface of the rail 10. In this way, space inside the rail 10 can be effectively used, to improve space utilization of the entire vehicle, and a horizontal wheel and a conductive rail are respectively located on two sides of a rail beam, which can effectively reduce space on the bottom of the vehicle body 22 and reduce the height of the entire vehicle.

Figure 17:
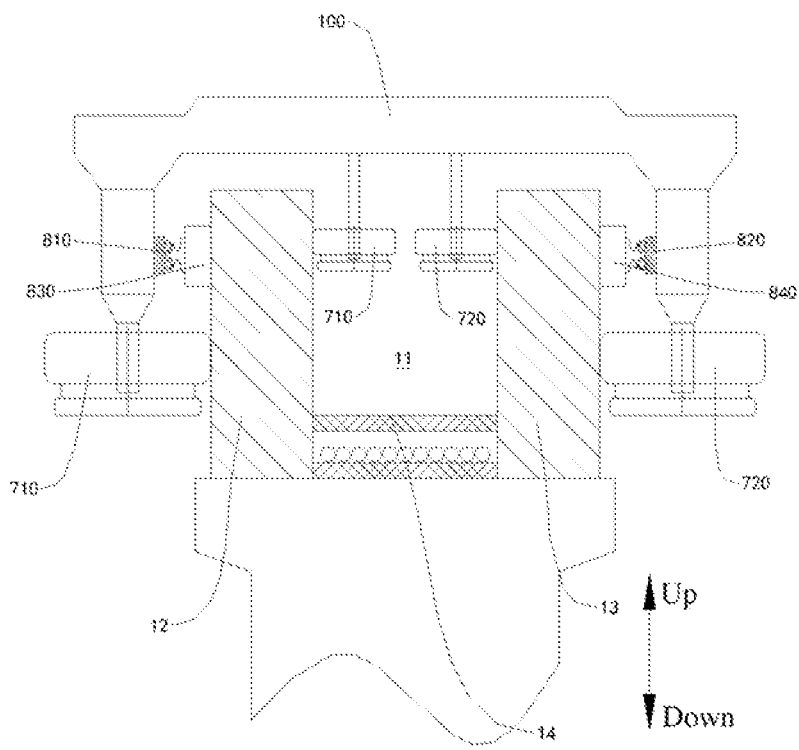
FIG. 17 is a schematic structural diagram of a bogie and a rail of a rail vehicle according to another embodiment of the present disclosure.
Figure 18:
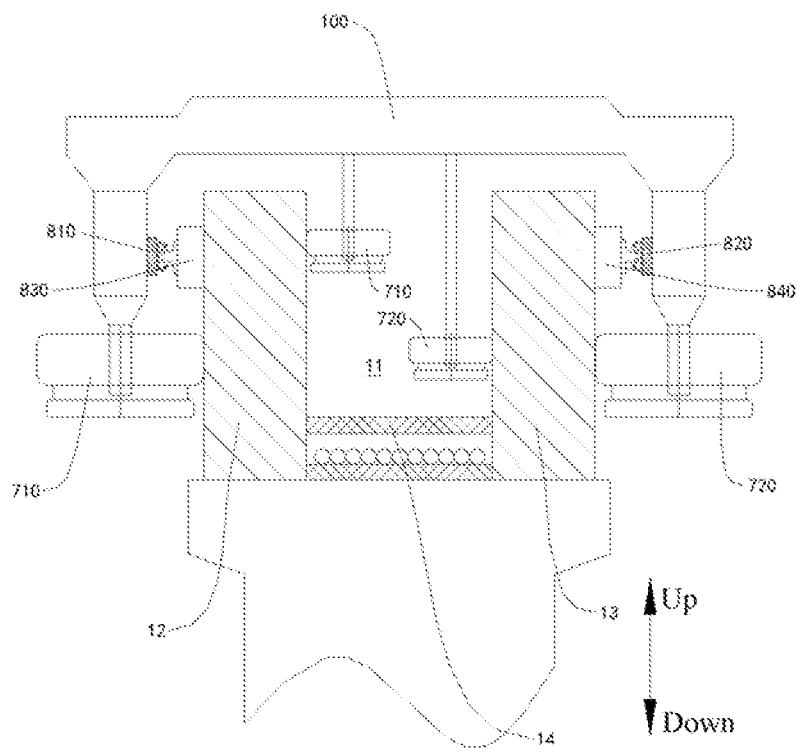
FIG. 18 is a schematic structural diagram of a bogie and a rail of a rail vehicle according to another embodiment of the present disclosure.
Figure 19:
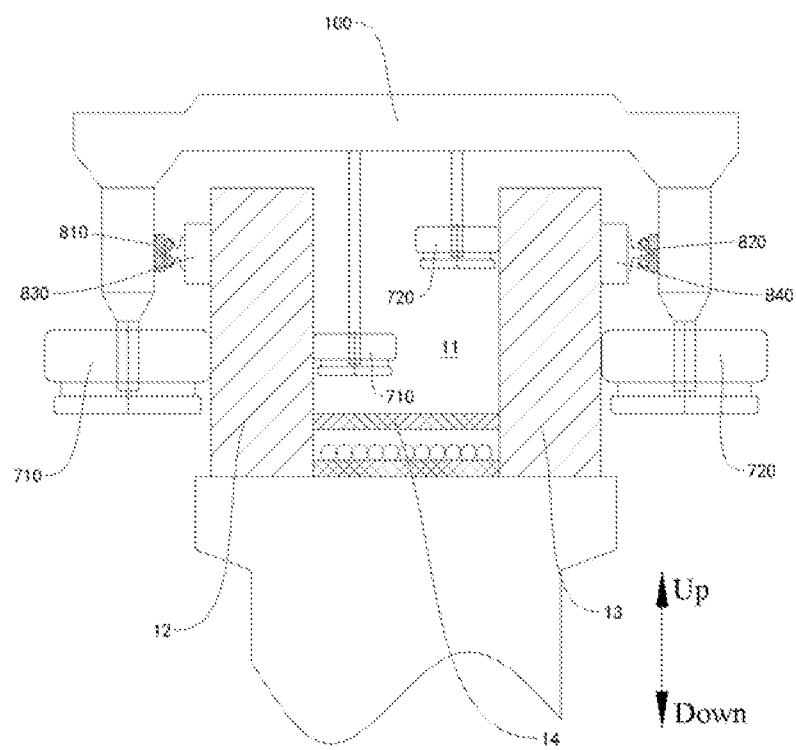
FIG. 19 is a schematic structural diagram of a bogie and a rail of a rail vehicle according to another embodiment of the present disclosure.
Figure 20:
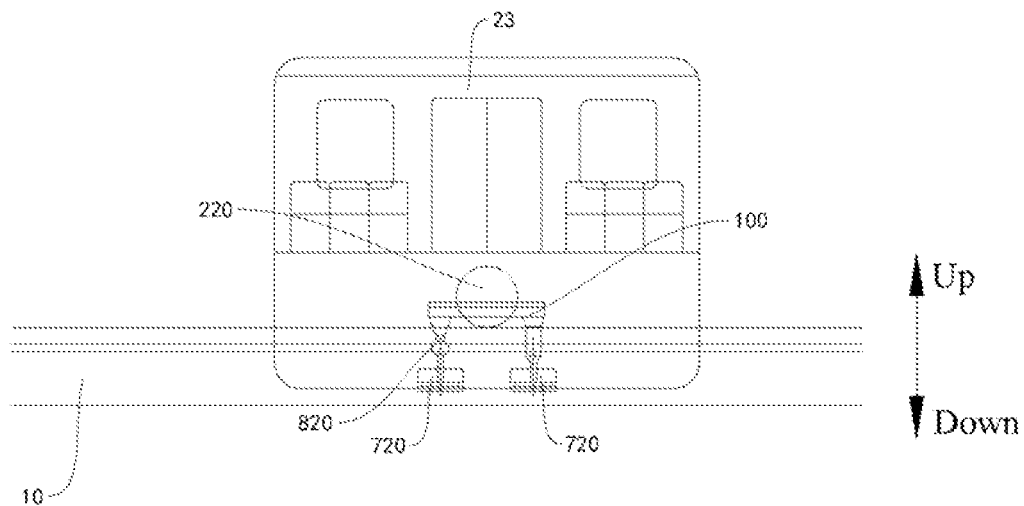
FIG. 20 is a partial schematic structural diagram of a rail transport system according to another embodiment of the present disclosure.
Figure 21:
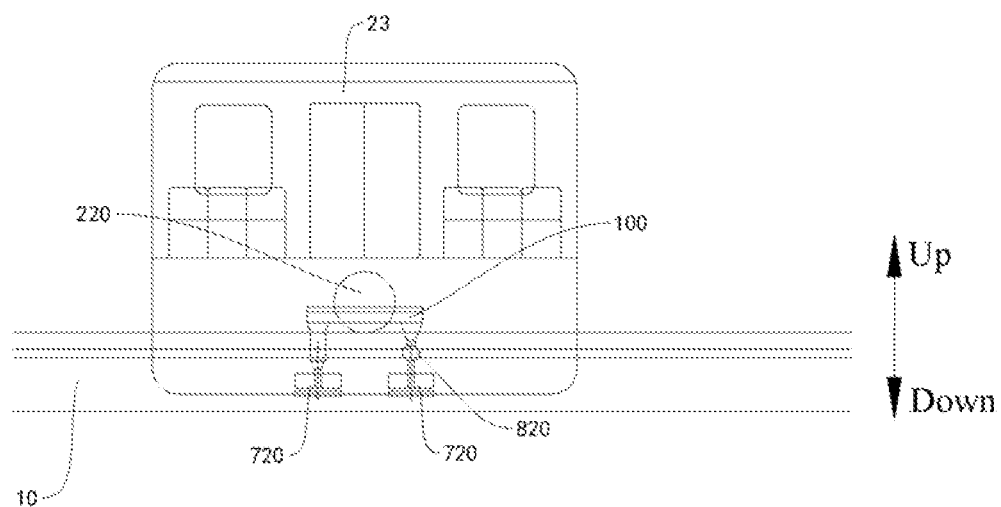
FIG. 21 is a partial schematic structural diagram of a rail transport system according to another embodiment of the present disclosure.
Figure 22:
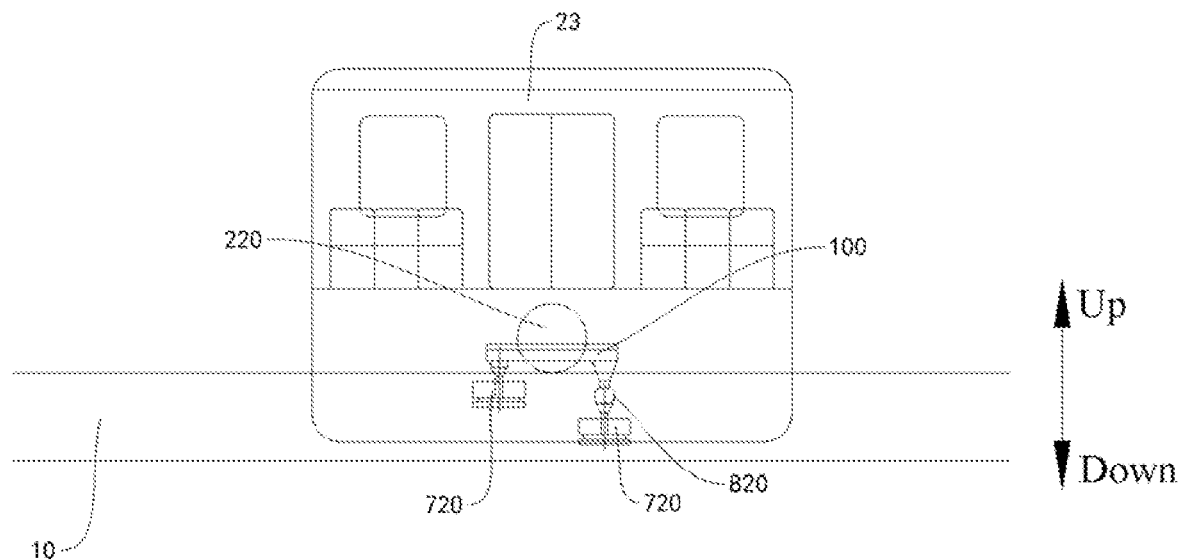
FIG. 22 is a partial schematic structural diagram of a rail transport system according to another embodiment of the present disclosure.
Figure 23:
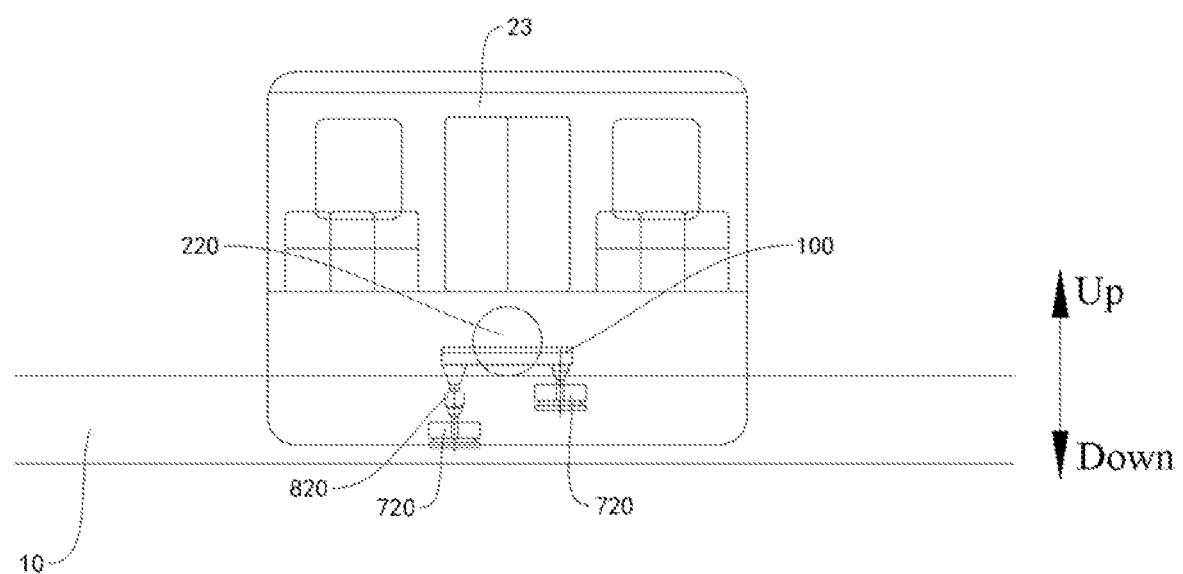
FIG. 23 is a partial schematic structural diagram of a rail transport system according to another embodiment of the present disclosure.

In some other embodiments of the present disclosure, as shown in FIG. 17 to FIG. 19, there is a plurality of first horizontal wheels 710 respectively fitting in on the outer side surface and the inner side surface of the first rail beam 12, and there is a plurality of second horizontal wheels 720 respectively fitting in on the outer side surface and the inner side surface of the second rail beam 13. To be specific, horizontal wheels are fitting in on both the outer side surface and the inner side surface of the rail 10. The horizontal wheels are simultaneously arranged on the inner side and the outer side, the horizontal wheel on the inner side plays a role of stabilization and overturn prevention, and stability performance and safety performance of the rail vehicle 20 can be greatly improved.

Optionally, as shown in FIG. 17, the first horizontal wheel 710 fitting in on the inner side surface of the first rail beam 12 and the second horizontal wheel 720 fitting in on the inner side surface of the second rail beam 13 are located at a same height in the up and down direction. As shown in FIG. 18 and FIG. 19, the first horizontal wheel 710 fitting in on the inner side surface of the first rail beam 12 and the second horizontal wheel 720 fitting in on the inner side surface of the second rail beam 13 are located at different heights in the up and down direction. For example, as shown in FIG. 18, the first horizontal wheel 710 fitting in on the inner side surface of the first rail beam 12 is higher than the second horizontal wheel 720 fitting in on the inner side surface of the second rail beam 13. For another example, as shown in FIG. 19, the first horizontal wheel 710 fitting in on the inner side surface of the first rail beam 12 is lower than the second horizontal wheel 720 fitting in on the inner side surface of the second rail beam 13.

During specific implementation, the first horizontal wheel 710 fitting in on the inner side surface of the first rail beam 12 and the second horizontal wheel 720 fitting in on the inner side surface of the second rail beam 13 may be located at a same height or located at different heights, and the first horizontal wheel 710 fitting in on the outer side surface of the first rail beam 12 and the second horizontal wheel 720 fitting in on the outer side surface of the second rail beam 13 may also be located at a same height or located at different heights.

In some examples of the present disclosure, as shown in FIG. 11 to FIG. 41 and FIG. 50 to FIG. 57, the bogie 21 further includes a first collector shoe 810 and a second collector shoe 820.

The first collector shoe 810 is disposed on the bogie frame 100 and is suitable for fitting in with the first conductive rail on the first side of the rail 10, and the second collector shoe 820 is disposed on the bogie frame 100 and is suitable for fitting in with the second conductive rail on the second side of the rail 10. In an embodiment, a first conductive rail 830 extending along the length direction of the first rail beam 12 is disposed on the outer side surface of the first rail beam 12, and a second conductive rail 840 extending along the length direction of the second rail beam 13 is disposed on the outer side surface of the second rail beam 13. The first collector shoe 810 fits in with the first conductive rail 830, and the second collector shoe 820 fits in with the second conductive rail 840. The first collector shoe 810 is powered by using the first conductive rail 830, and the second collector shoe 820 is powered by using the second conductive rail 840, so as to be used by the rail vehicle 20.

In some examples of the present disclosure, as shown in FIG. 11, FIG. 13, FIG. 14, FIG. 50, FIG. 52, and FIG. 53, there is a plurality of first horizontal wheels 710 spaced apart along the length direction of the first rail beam 12, and the first collector shoe 810 is located between neighboring first horizontal wheels 710 in the length direction of the first rail beam 12; and there is a plurality of second horizontal wheels 720 spaced apart along the length direction of the second rail beam 13, and the second collector shoe 820 is located between neighboring second horizontal wheels 720 in the length direction of the second rail beam 13. Therefore, a force applied to the first horizontal wheel 710 does not affect the first collector shoe 810 and a force applied to the second horizontal wheel 720 does not affect the second collector shoe 820. Moreover, space utilization can be improved, and the structure of the bogie 21 can be simplified.

For example, FIG. 11, FIG. 13, and FIG. 14 show an example in which the first collector shoe 810 of the bogie 21 having two running wheels is located between neighboring first horizontal wheels 710 in the length direction of the first rail beam 12 and the second collector shoe 820 is located between neighboring second horizontal wheels 720 in the length direction of the second rail beam 13. The plurality of first horizontal wheels 710 may be located at a same height and the plurality of second horizontal wheels 720 may be located at a same height; or the plurality of first horizontal wheels 710 may be staggered vertically and the plurality of second horizontal wheels 720 may be staggered vertically.

FIG. 50, FIG. 52, and FIG. 53 show an example in which the first collector shoe 810 of the bogie 21 having four running wheels is located between neighboring first horizontal wheels 710 in the length direction of the first rail beam 12 and the second collector shoe 820 is located between neighboring second horizontal wheels 720 in the length direction of the second rail beam 13. The plurality of first horizontal wheels 710 may be located at a same height and the plurality of second horizontal wheels 720 may be located at a same height; or the plurality of first horizontal wheels 710 may be staggered vertically and the plurality of second horizontal wheels 720 may be staggered vertically.

In some examples of the present disclosure, as shown in FIG. 20 to FIG. 23 and FIG. 54 to FIG. 57, there is a plurality of first horizontal wheels 710 spaced apart along the length direction of the first rail beam 12, and the first collector shoe 810 and one of the first horizontal wheels 710 are disposed facing each other in the up and down direction. For example, the central axis of the first collector shoe 810 coincides with the central axis of one of the first horizontal wheels 710. There is a plurality of second horizontal wheels 720 spaced apart along the length direction of the second rail beam 13, and the second collector shoe 820 and one of the second horizontal wheels 720 are disposed facing each other in the up and down direction. For example, the central axis of the second collector shoe 820 coincides with the central axis of one of the second horizontal wheels 720. There is a plurality of second horizontal wheels 720 spaced apart along the length direction of the second rail beam 13, and the second collector shoe 820 and one of the second horizontal wheels 720 are disposed facing each other in the up and down direction. For example, the central axis of the second collector shoe 820 coincides with the central axis of one of the second horizontal wheels 720. In other words, the collector shoes are disposed in front or disposed behind. Therefore, mounting space of the horizontal wheels can be fully used, and no mounting mechanism needs to be additional disposed, to facilitate structure simplification and weight reduction of the bogie 21.

For example, FIG. 20 to FIG. 23 show an example in which collector shoes of the bogie 21 having two running wheels are disposed in front or disposed behind. The plurality of first horizontal wheels 710 may be located at a same height and the plurality of second horizontal wheels 720 may be located at a same height; or the plurality of first horizontal wheels 710 may be located at different heights and the plurality of second horizontal wheels 720 may be located at different heights.

FIG. 54 to FIG. 57 show an example in which collector shoes of the bogie 21 having four running wheels are disposed in front or disposed behind. The plurality of first horizontal wheels 710 may be located at a same height and the plurality of second horizontal wheels 720 may be located at a same height; or the plurality of first horizontal wheels 710 may be located at different heights and the plurality of second horizontal wheels 720 may be located at different heights.

In some embodiments of the present disclosure, as shown in FIG. 24 to FIG. 28, a first collector shoe 810 is located above each first horizontal wheel 710, and a second collector shoe 820 is located above each second horizontal wheel 720. Reduction in a distance between a collector shoe and the driving device 300 facilitates energy transfer and improvement in space utilization.

Figure 24:
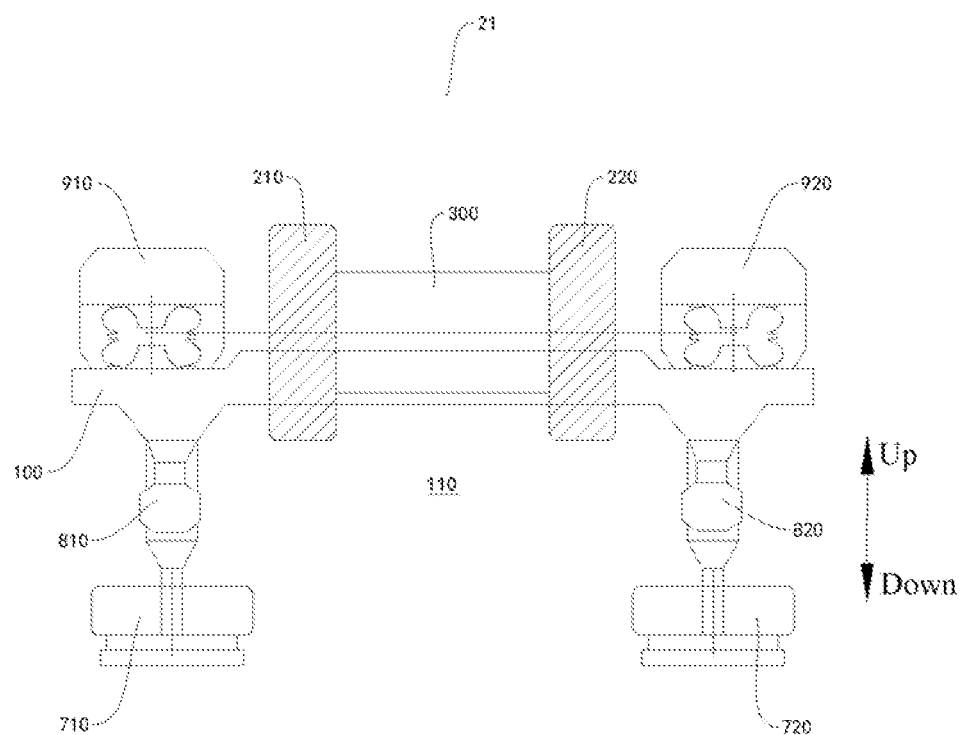
FIG. 24 is a sectional view of a bogie of a rail vehicle according to an embodiment of the present disclosure.
Figure 25:
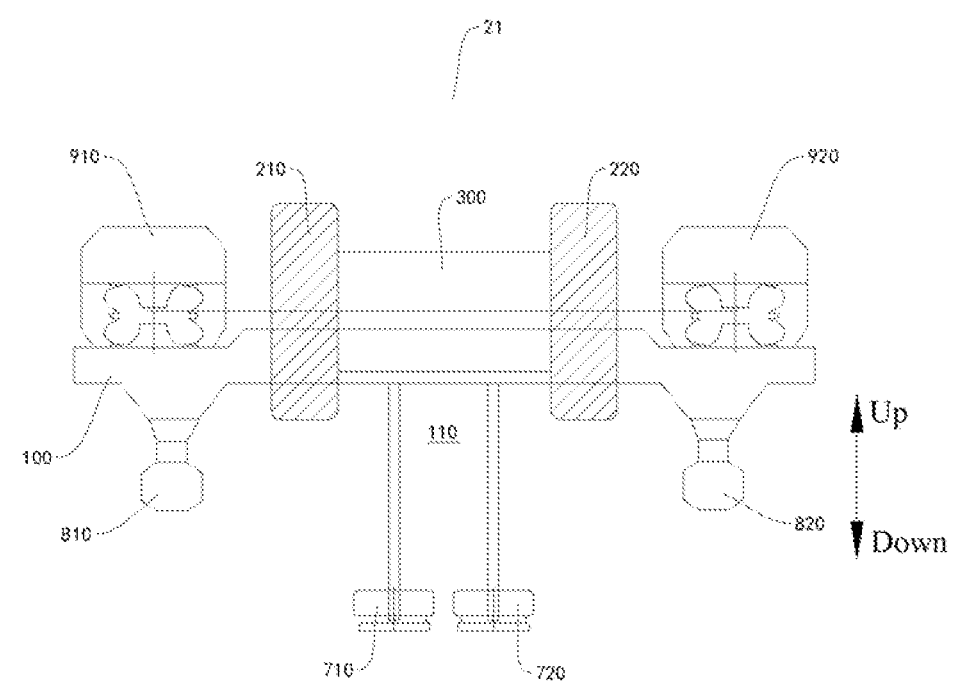
FIG. 25 is a sectional view of a bogie of a rail vehicle according to another embodiment of the present disclosure.
Figure 26:
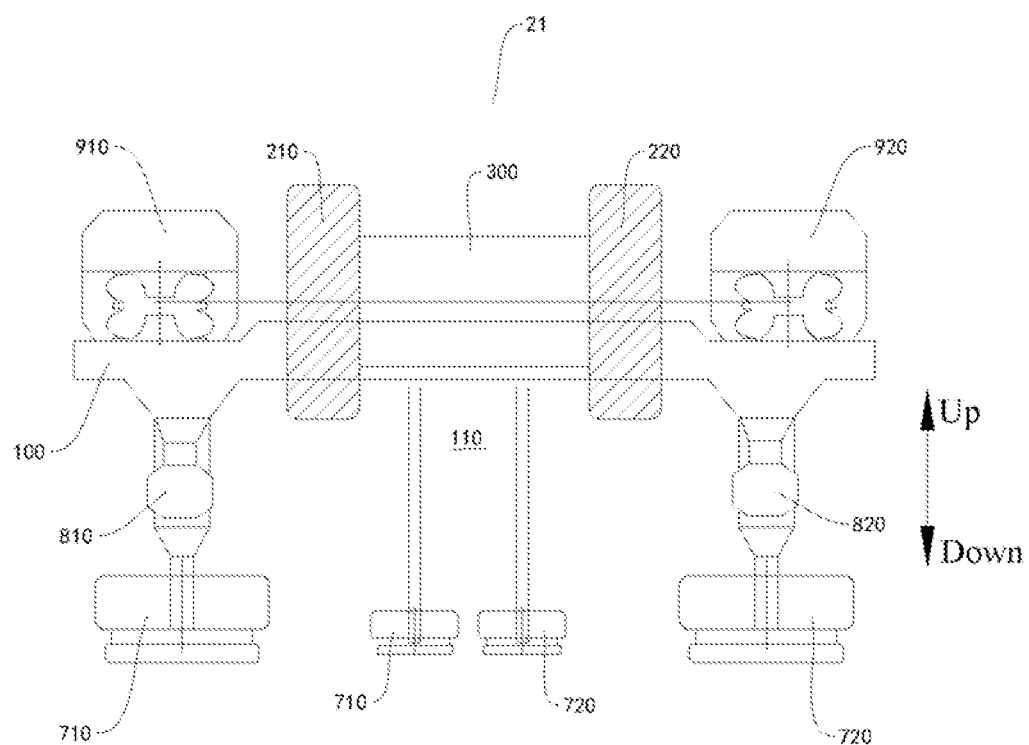
FIG. 26 is a sectional view of a bogie of a rail vehicle according to another embodiment of the present disclosure.
Figure 27:
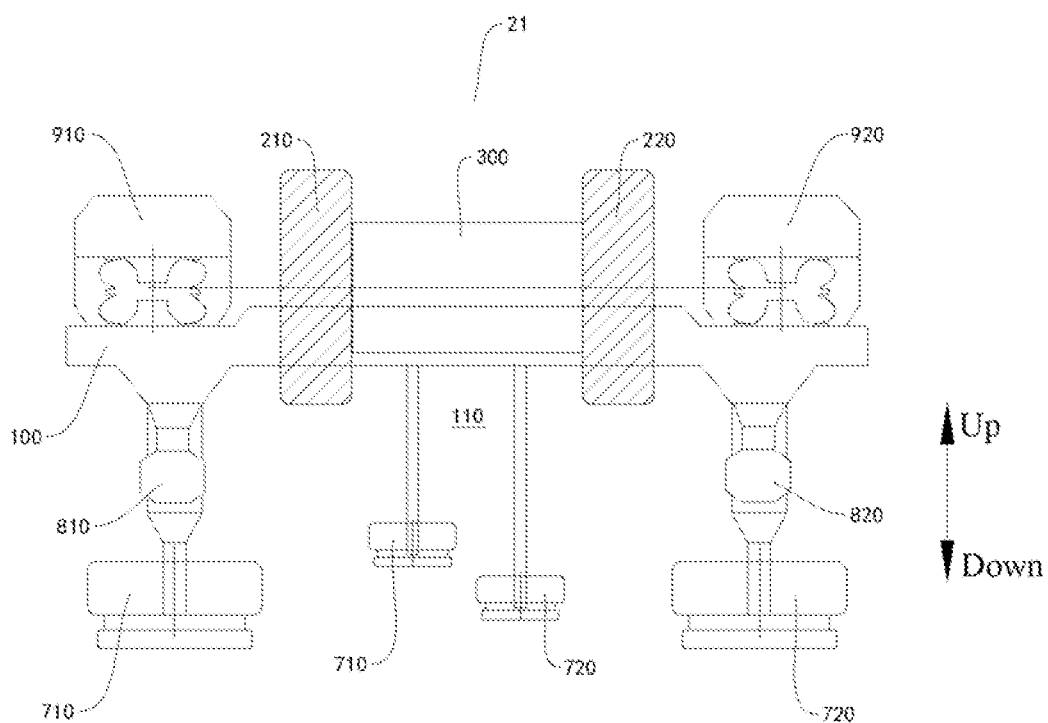
FIG. 27 is a sectional view of a bogie of a rail vehicle according to another embodiment of the present disclosure.
Figure 28:
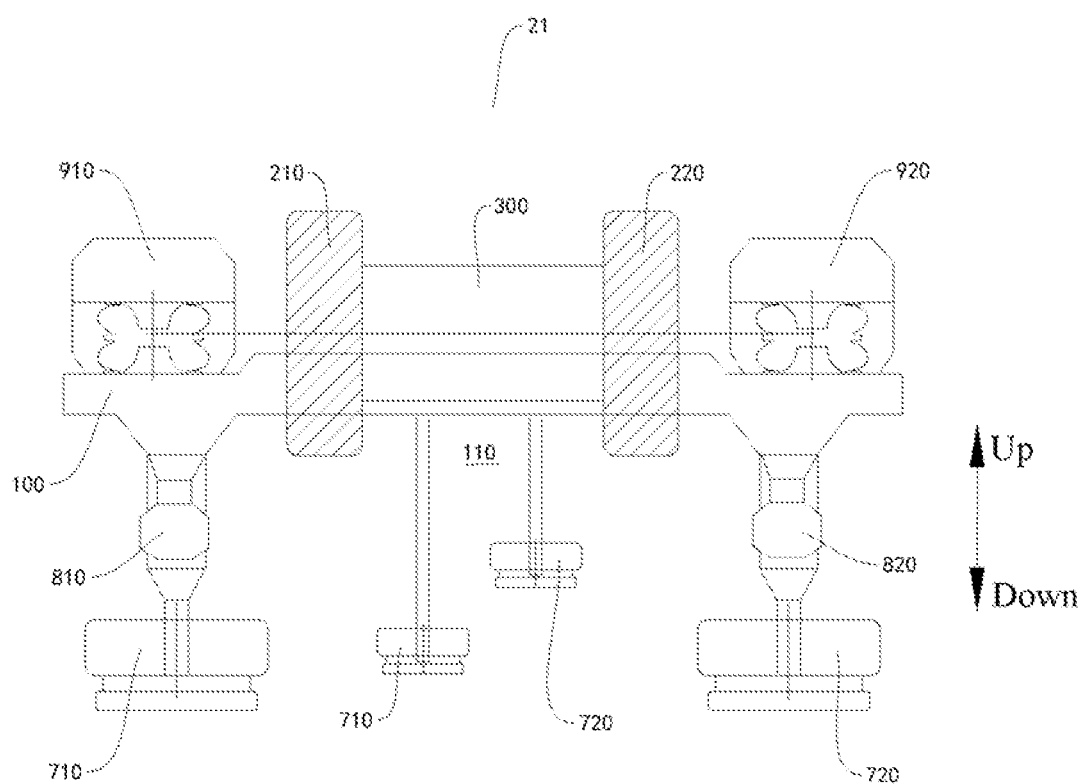
FIG. 28 is a sectional view of a bogie of a rail vehicle according to another embodiment of the present disclosure.

For example, the first horizontal wheel 710 may fit in on the outer side surface of the first rail beam 12 and the second horizontal wheel 720 may fit in on the outer side surface of the second rail beam 13 (as shown in FIG. 24). Alternatively, the first horizontal wheel 710 may fit in on the inner side surface of the first rail beam 12 and the second horizontal wheel 720 may fit in on the inner side surface of the second rail beam 13 (as shown in FIG. 25). A plurality of first horizontal wheels 710 may further fit in on the inner side surface and the outer side surface of the first rail beam 12 respectively and a plurality of second horizontal wheels 720 may further fit in on the inner side surface and the outer side surface of the second rail beam 13 respectively (as shown in FIG. 26 to FIG. 28). The first horizontal wheel 710 fitting in on the inner side surface of the first rail beam 12 and the second horizontal wheel 720 fitting in on the inner side surface of the second rail beam 13 are located at a same height or located at different heights.

In some embodiments of the present disclosure, as shown in FIG. 29 to FIG. 33, a first collector shoe 810 is located below each first horizontal wheel 710, and a second collector shoe 820 is located below each second horizontal wheel 720. Therefore, a horizontal wheel is arranged at a location close to an upper portion of a rail beam to facilitate travelling stability of the rail vehicle 20.

Figure 29:
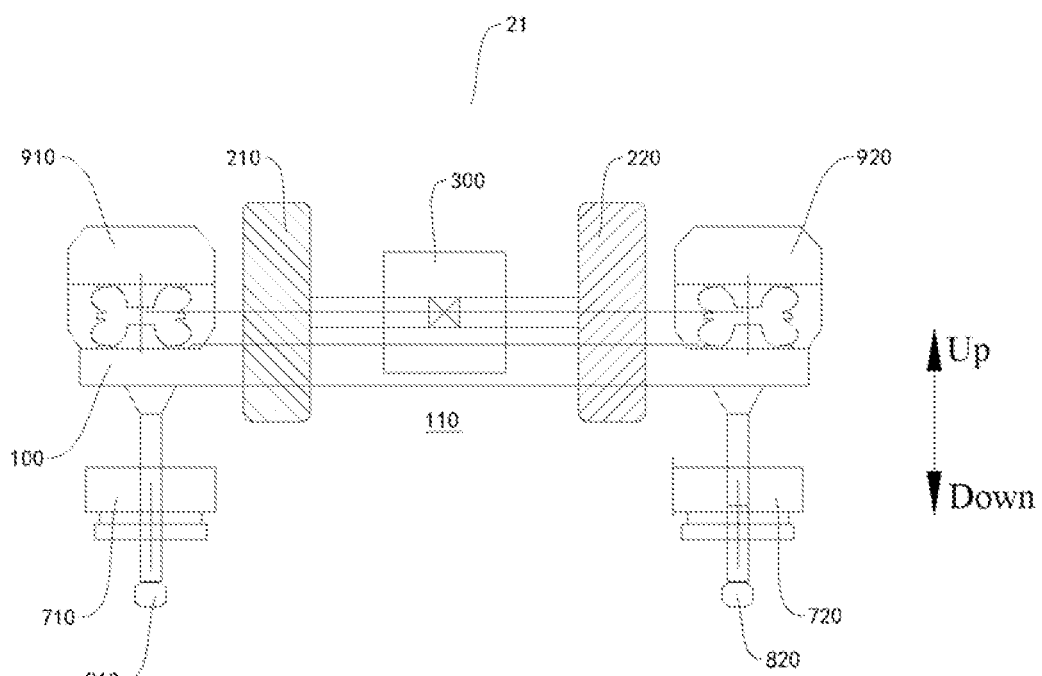
FIG. 29 is a sectional view of a bogie of a rail vehicle according to another embodiment of the present disclosure.
Figure 30:
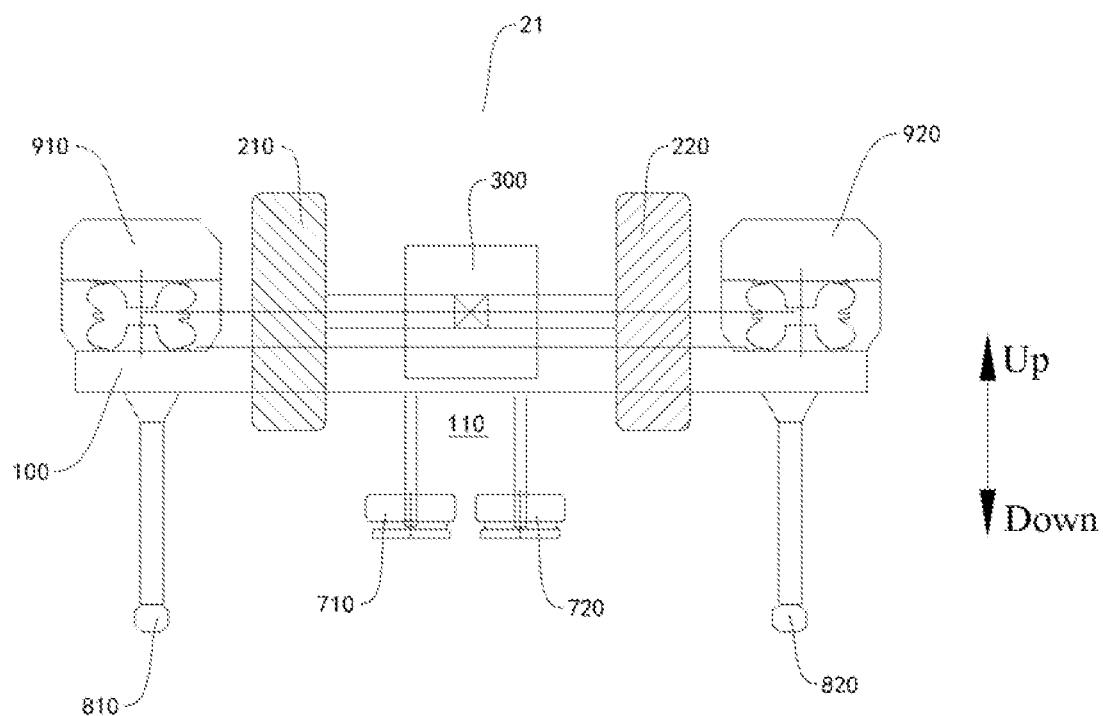
FIG. 30 is a sectional view of a bogie of a rail vehicle according to another embodiment of the present disclosure.
Figure 31:
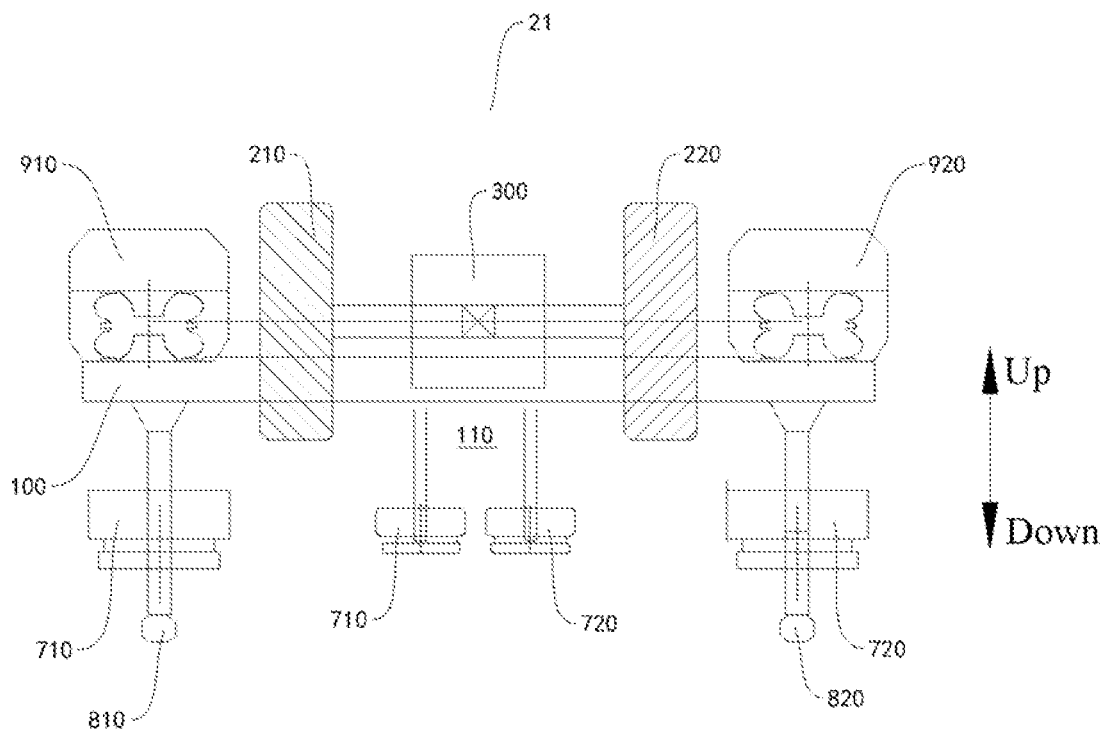
FIG. 31 is a sectional view of a bogie of a rail vehicle according to another embodiment of the present disclosure.
Figure 32:
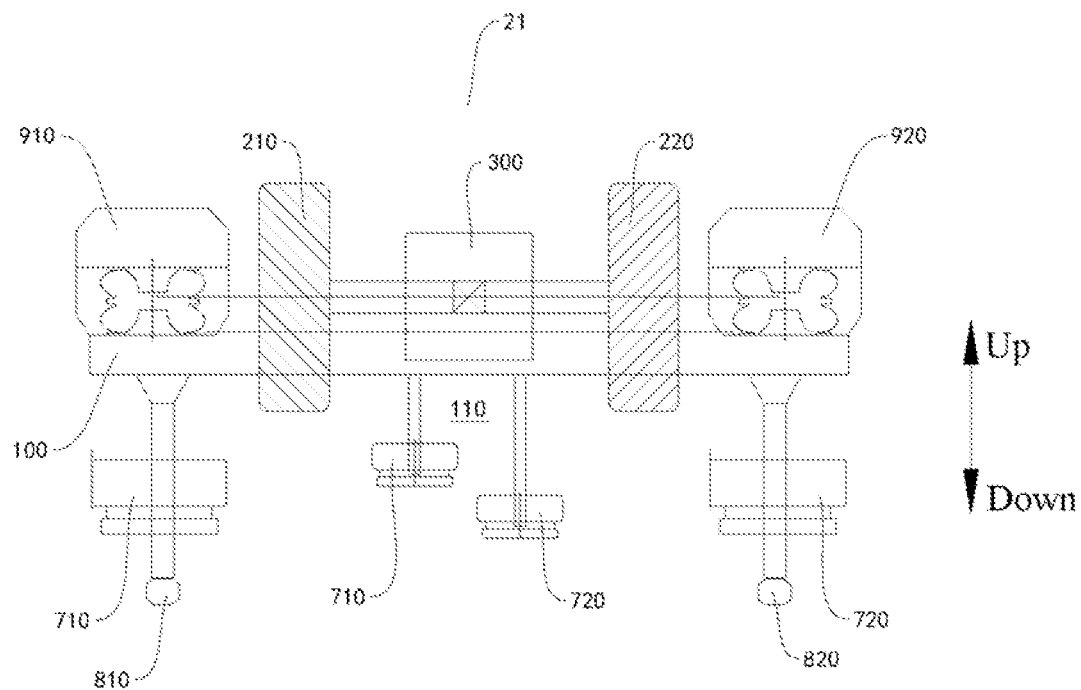
FIG. 32 is a sectional view of a bogie of a rail vehicle according to another embodiment of the present disclosure.
Figure 33:
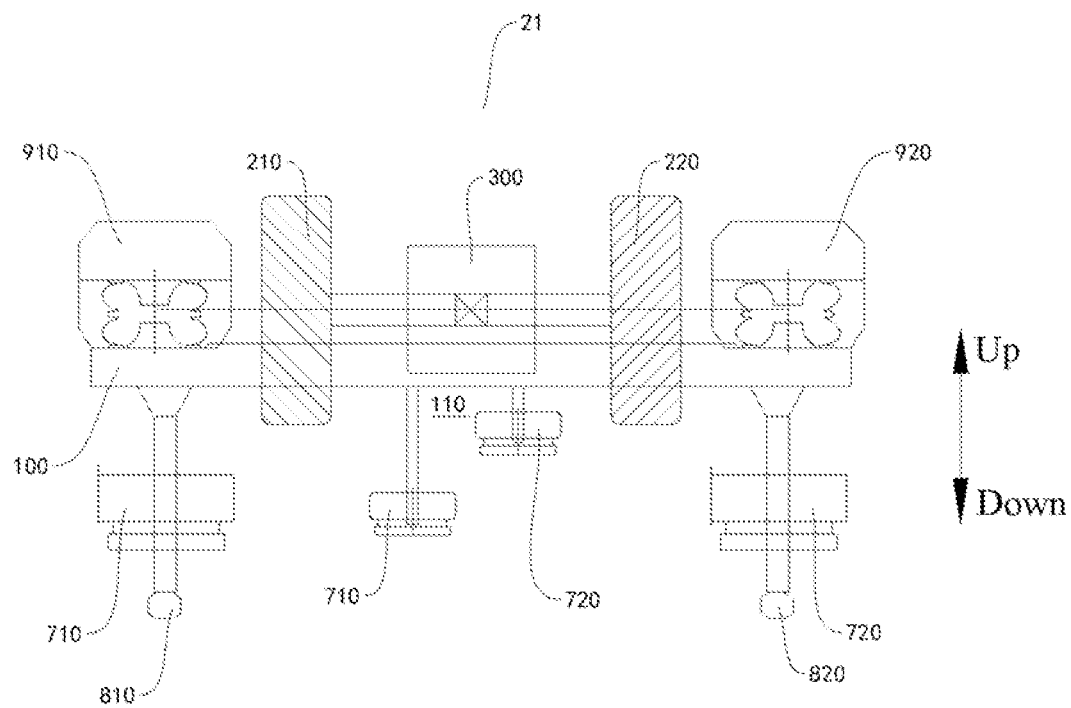
FIG. 33 is a sectional view of a bogie of a rail vehicle according to another embodiment of the present disclosure.

For example, the first horizontal wheel 710 may fit in on the outer side surface of the first rail beam 12 and the second horizontal wheel 720 may fit in on the outer side surface of the second rail beam 13 (as shown in FIG. 29). Alternatively, the first horizontal wheel 710 may fit in on the inner side surface of the first rail beam 12 and the second horizontal wheel 720 may fit in on the inner side surface of the second rail beam 13 (as shown in FIG. 30). A plurality of first horizontal wheels 710 may further fit in on the inner side surface and the outer side surface of the first rail beam 12 respectively and a plurality of second horizontal wheels 720 may further fit in on the inner side surface and the outer side surface of the second rail beam 13 respectively (as shown in FIG. 31 to FIG. 33). The first horizontal wheel 710 fitting in on the inner side surface of the first rail beam 12 and the second horizontal wheel 720 fitting in on the inner side surface of the second rail beam 13 are located at a same height or located at different heights.

Figure 34:
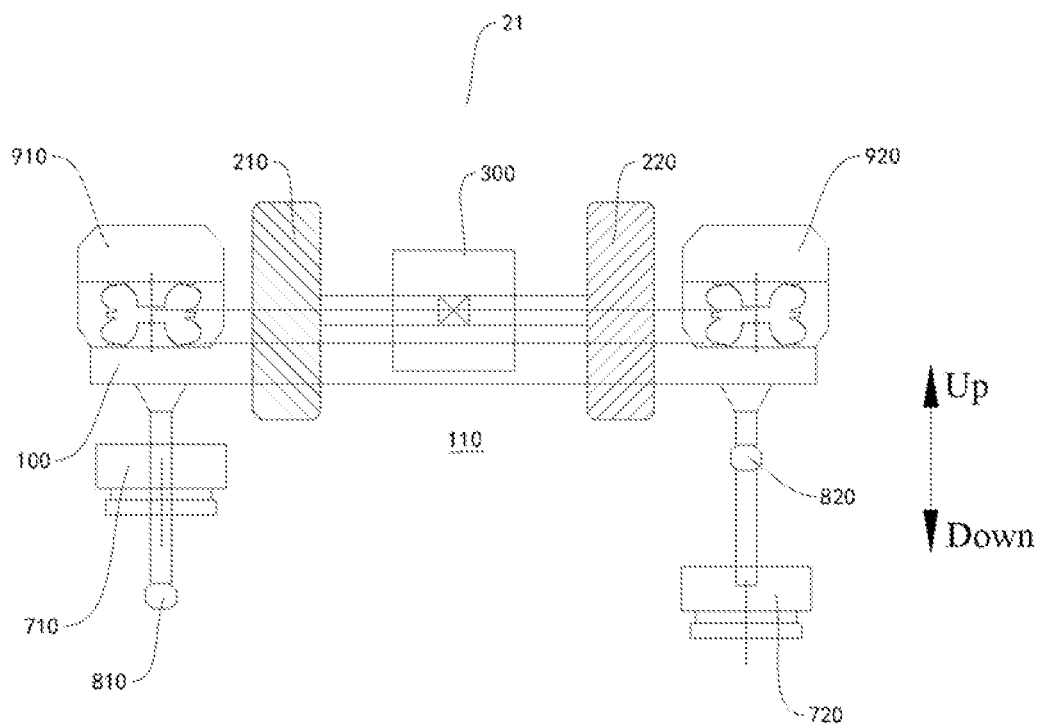
FIG. 34 is a sectional view of a bogie of a rail vehicle according to another embodiment of the present disclosure.
Figure 35:
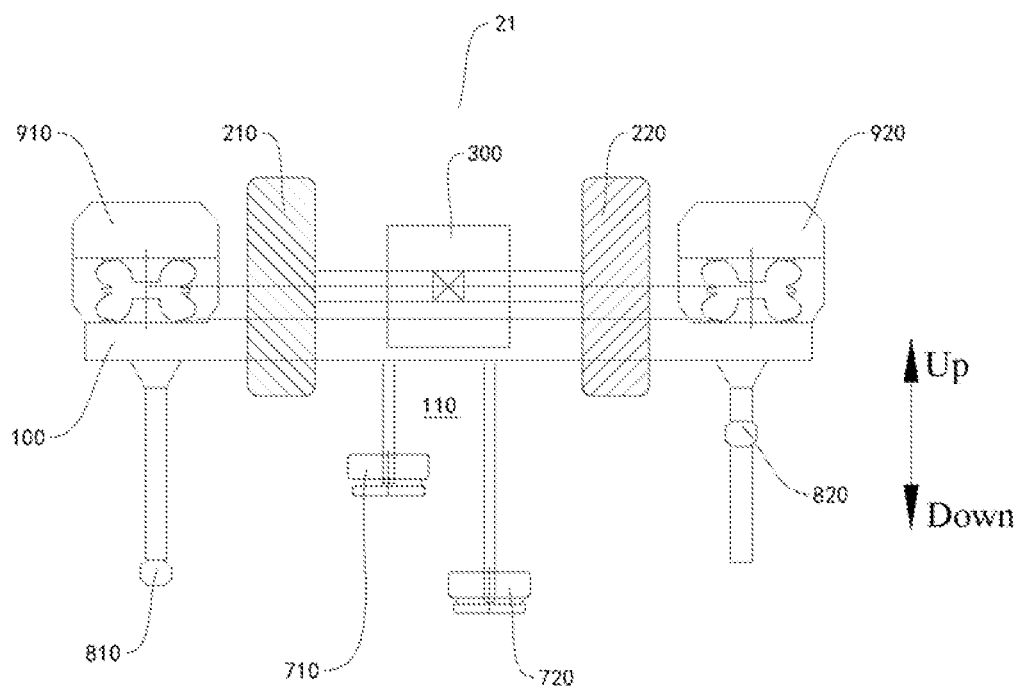
FIG. 35 is a sectional view of a bogie of a rail vehicle according to another embodiment of the present disclosure.
Figure 36:
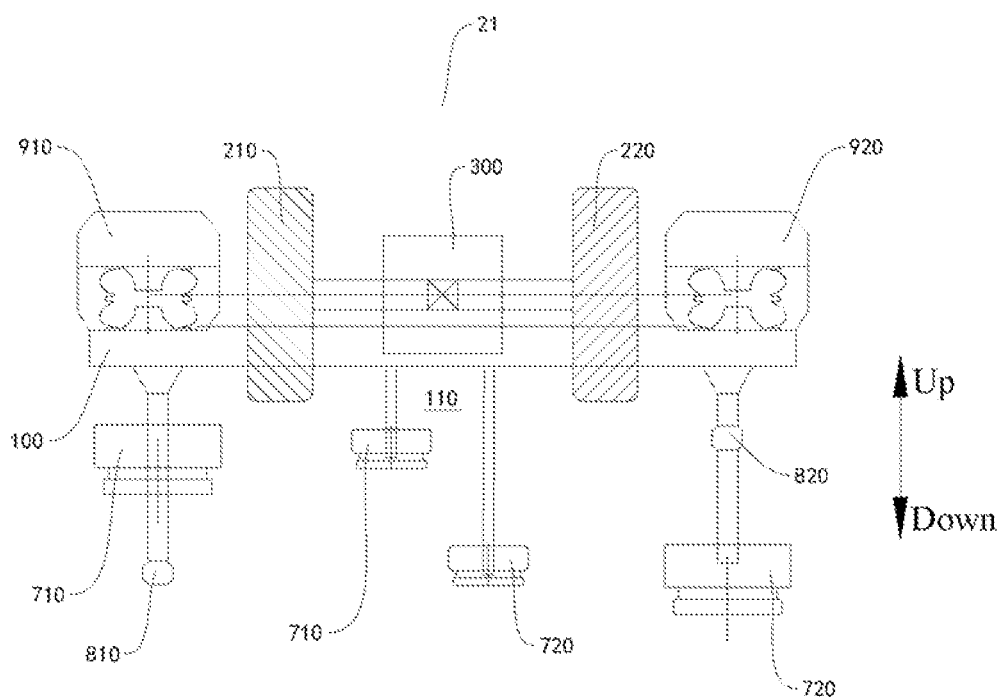
FIG. 36 is a sectional view of a bogie of a rail vehicle according to another embodiment of the present disclosure.

In some embodiments of the present disclosure, as shown in FIG. 34 to FIG. 36, a first collector shoe 810 is located below each first horizontal wheel 710, and a second collector shoe 820 is located above each second horizontal wheel 720. Therefore, collector shoes are arranged vertically according to different polarities of a collected current. For example, a collector shoe arranged above is connected to a positive electrode of the current, and a collector shoe arranged below is connected to a negative electrode of the current on an opposite side, so as to facilitate space distribution and improvement in safety of the collected current.

For example, the first horizontal wheel 710 may fit in on the outer side surface of the first rail beam 12 and the second horizontal wheel 720 may fit in on the outer side surface of the second rail beam 13 (as shown in FIG. 34). Alternatively, the first horizontal wheel 710 may fit in on the inner side surface of the first rail beam 12 and the second horizontal wheel 720 may fit in on the inner side surface of the second rail beam 13 (as shown in FIG. 35). A plurality of first horizontal wheels 710 may further fit in on the inner side surface and the outer side surface of the first rail beam 12 respectively and a plurality of second horizontal wheels 720 may further fit in on the inner side surface and the outer side surface of the second rail beam 13 respectively (as shown in FIG. 36). The first horizontal wheel 710 fitting in on the inner side surface of the first rail beam 12 and the second horizontal wheel 720 fitting in on the inner side surface of the second rail beam 13 are located at a same height or located at different heights.

In some embodiments of the present disclosure, as shown in FIG. 37 to FIG. 41, there is a plurality of first horizontal wheels 710 spaced apart along an up and down direction and the first collector shoe 810 is located between neighboring first horizontal wheels 710 in the up and down direction. There is a plurality of second horizontal wheels 720 spaced apart along the up and down direction and the second collector shoe 820 is located between neighboring second horizontal wheels 720 in the up and down direction. Therefore, space distribution and stabilization of the entire structure may be facilitated.

Figure 37:
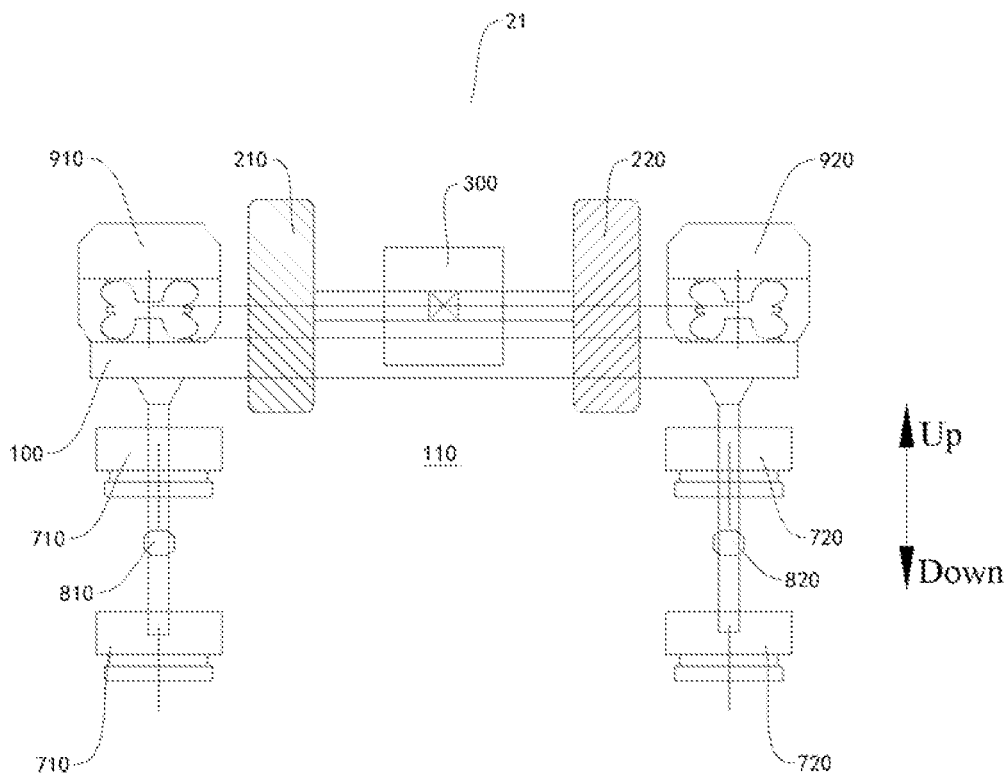
FIG. 37 is a sectional view of a bogie of a rail vehicle according to another embodiment of the present disclosure.
Figure 38:
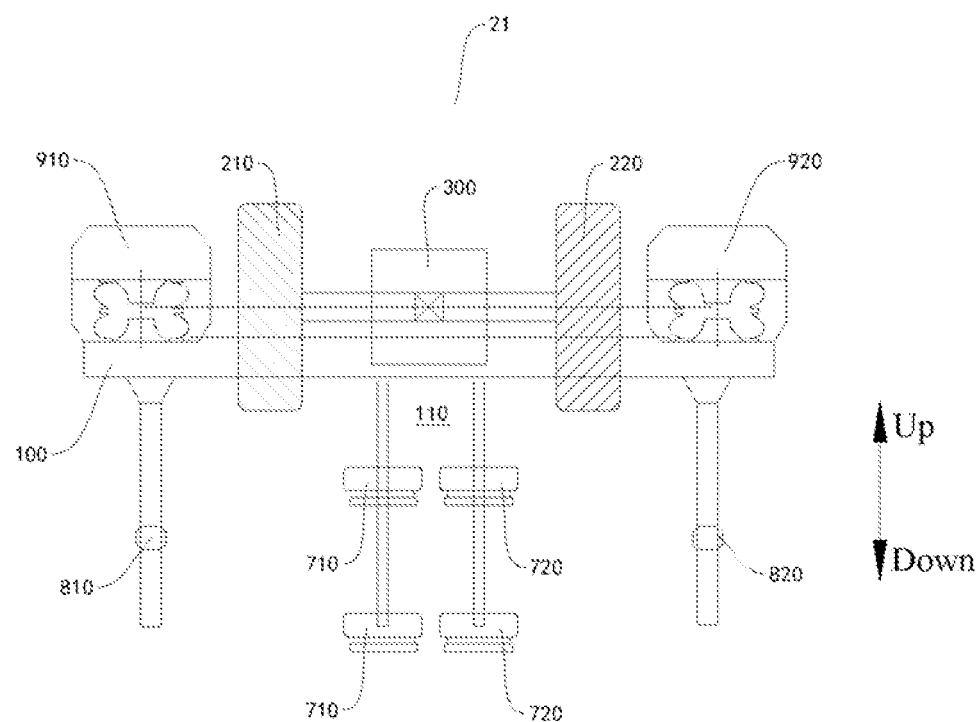
FIG. 38 is a sectional view of a bogie of a rail vehicle according to another embodiment of the present disclosure.
Figure 39:
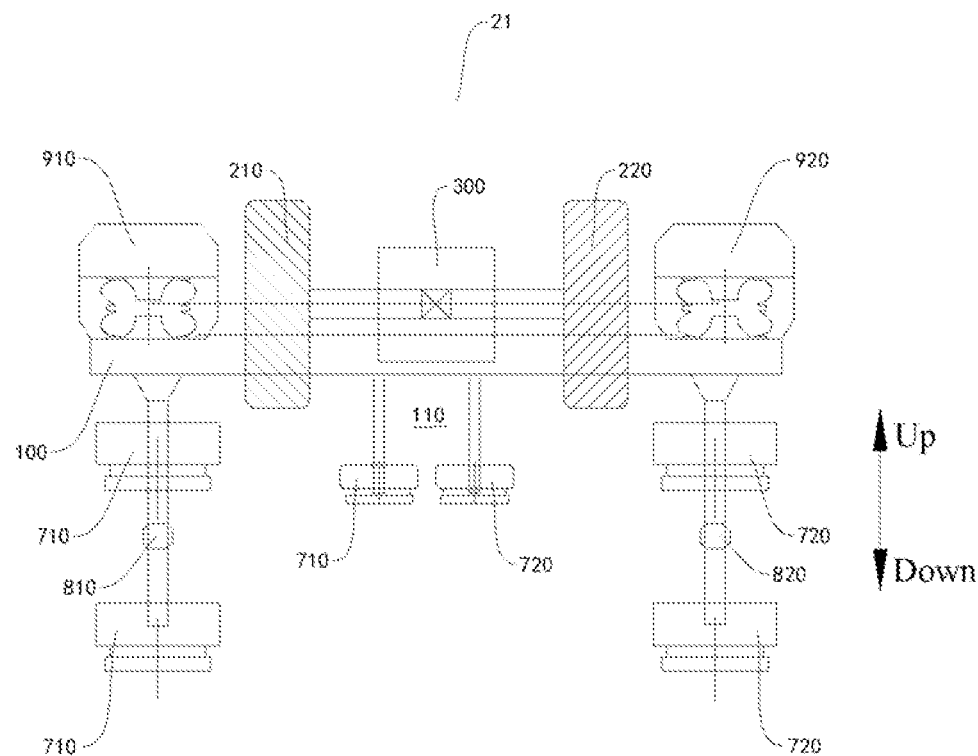
FIG. 39 is a sectional view of a bogie of a rail vehicle according to another embodiment of the present disclosure.
Figure 40:
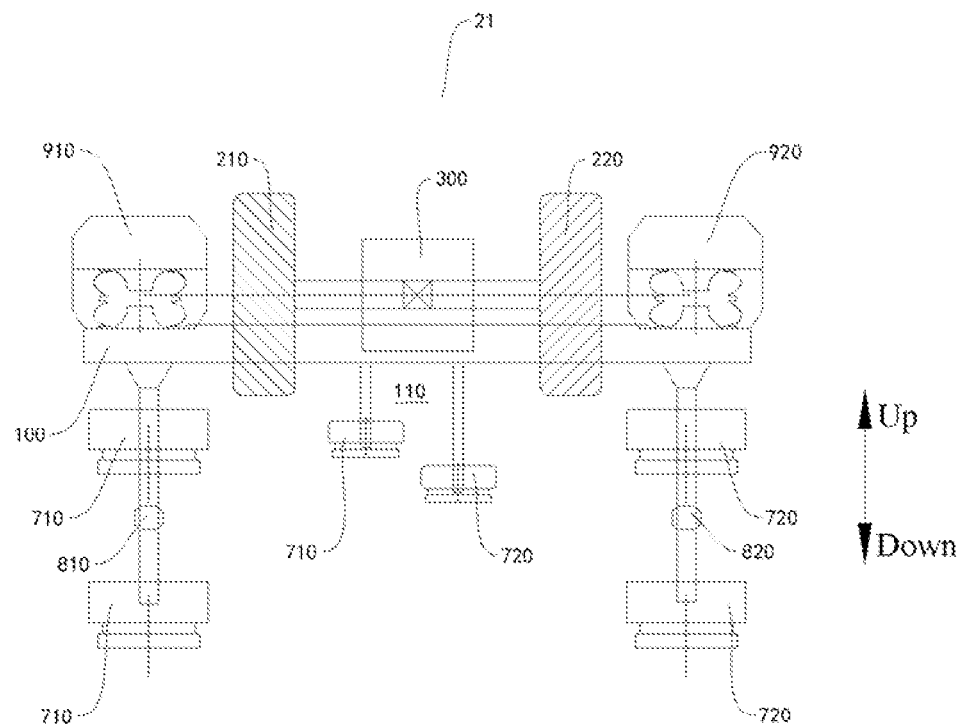
FIG. 40 is a sectional view of a bogie of a rail vehicle according to another embodiment of the present disclosure.
Figure 41:
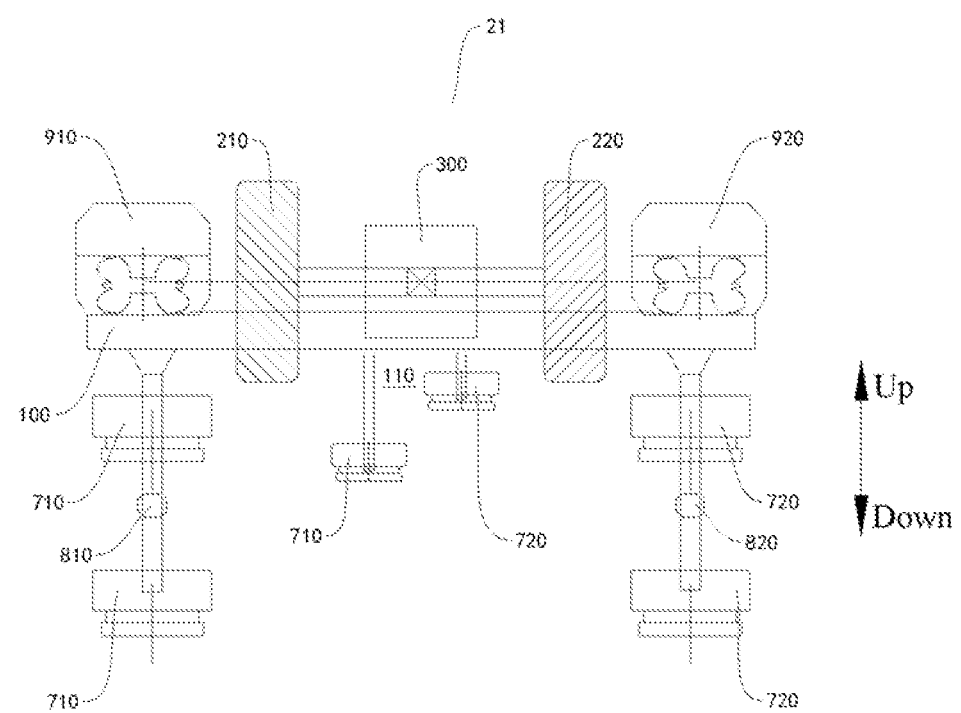
FIG. 41 is a sectional view of a bogie of a rail vehicle according to another embodiment of the present disclosure.

For example, a plurality of first horizontal wheels 710 may fit in on the outer side surface of the first rail beam 12 and a plurality of second horizontal wheels 720 may fit in on the outer side surface of the second rail beam 13 (as shown in FIG. 37). Alternatively, a plurality of first horizontal wheels 710 may fit in on the inner side surface of the first rail beam 12 and a plurality of second horizontal wheels 720 may fit in on the inner side surface of the second rail beam 13 (as shown in FIG. 38). A plurality of first horizontal wheels 710 may further fit in on the inner side surface and the outer side surface of the first rail beam 12 respectively and a plurality of second horizontal wheels 720 may further fit in on the inner side surface and the outer side surface of the second rail beam 13 respectively (as shown in FIG. 39 to FIG. 41). The first horizontal wheel 710 fitting in on the inner side surface of the first rail beam 12 and the second horizontal wheel 720 fitting in on the inner side surface of the second rail beam 13 are located at a same height or located at different heights. The first collector shoe 810 is located, in the up and down direction, between neighboring first horizontal wheels 710 fitting in on the outer side surface of the first rail beam 12, and the second collector shoe 820 is located, in the up and down direction, between neighboring second horizontal wheels 720 fitting in on the outer side surface of the second rail beam 13.

Figure 69:
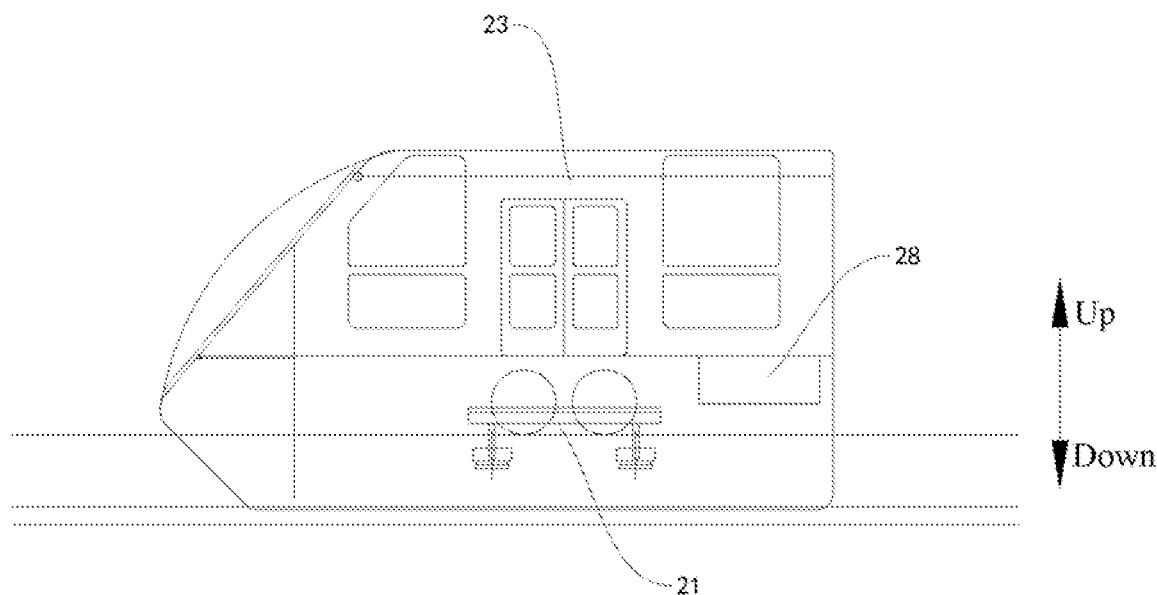
FIG. 69 is a partial schematic structural diagram of a rail transport system according to another embodiment of the present disclosure.

In another embodiment of the present disclosure, as shown in FIG. 69, the rail transport system 1 according to this embodiment of the present disclosure may be applied to transport connection between a main line and each living community. Therefore, the volume of the rail vehicle 20 is smaller than the volume of a rail vehicle on the main line, so that a conductive rail and a collector shoe may be removed, and a power battery 28 is used for power supply. The power battery 28 supplies power to travelling of the rail vehicle 20, and certainly may also supply power to other power utilization situations of the rail vehicle 20. This may simplify the structure and power supply lines, and reduce costs.

In an embodiment, the power battery 28 may be disposed on a position outside the bogie 21. For example, the power battery 28 may be mounted on the bottom of the compartment 23, or may be mounted inside the compartment 23. The power battery 28 can ensure operating at a normal needed speed, and is automatically charged when passenger traffic is relatively small.

In some embodiment of the present disclosure, as shown in FIG. 42, FIG. 43, and FIG. 58 to FIG. 63, the bogie 21 further includes a first support suspension device 910 and a second support suspension device 920.

The first support suspension device 910 and the second support suspension device 920 are respectively mounted onto the bogie frame 100 and respectively connected to the vehicle body 22. The first support suspension device 910 is suitable for supporting a first side of the vehicle body 22, and the second support suspension device 920 is suitable for supporting a second side of the vehicle body 22. The first support suspension device 910 and the second support suspension device 920 are spaced apart along the length direction of the rail 10 and are suitable for supporting the second side of the vehicle body 22. In the horizontal plane, the central axis of the first support suspension device 910 and the central axis of the second support suspension device 920 are located on the central axis of the bogie frame 100 and the central axis of the bogie frame 100 equally divides the bogie frame 100 in the width direction of the rail 10.

Alternatively, the first support suspension device 910 and the second support suspension device 920 are spaced apart along the width direction of the rail 10; and in the horizontal plane, the central axis of the first support suspension device 910 and the central axis of the second support suspension device 920 are located on the central axis of the bogie frame 100 and the central axis of the bogie frame 100 equally divides the bogie frame 100 in the length direction of the rail 10.

The first support suspension device 910 and the second support suspension device 920 are used to support the vehicle body 22 and play a role of shock absorption and buffering, and the first support suspension device 910 and the second support suspension device 920 are uniformly loaded and supported, thereby ensuring stability and comfort of the rail vehicle 20. Moreover, costs are relatively low.

Figure 42:
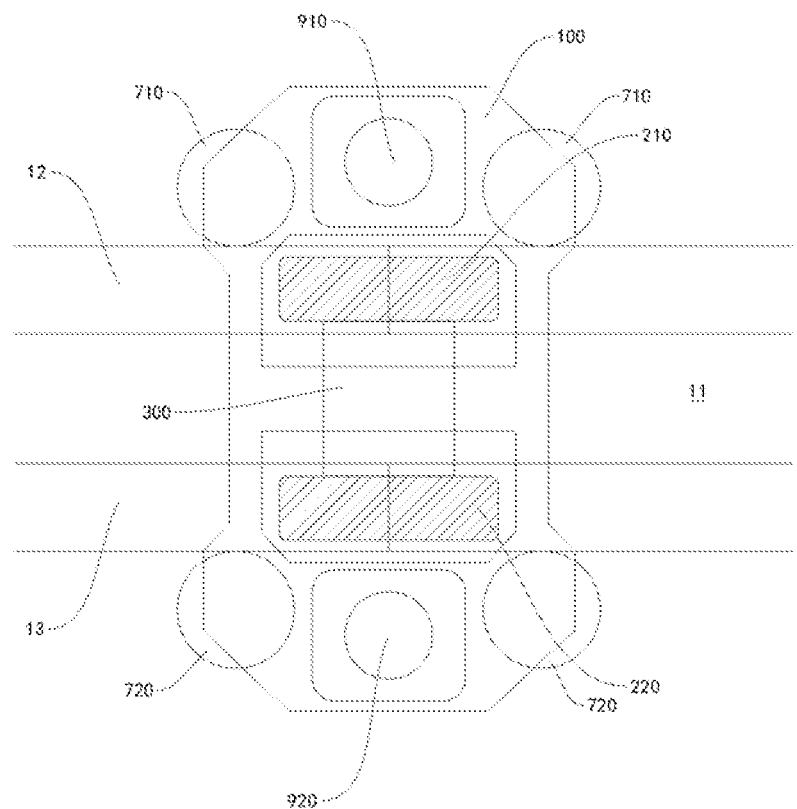
FIG. 42 is a schematic structural diagram of a bogie of a rail vehicle according to another embodiment of the present disclosure.
Figure 43:
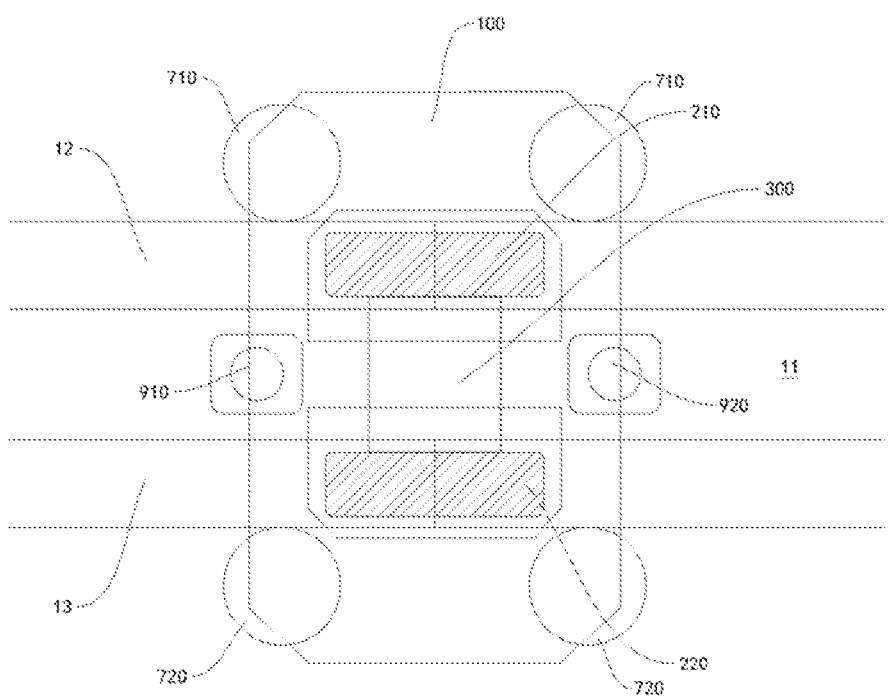
FIG. 43 is a schematic structural diagram of a bogie of a rail vehicle according to another embodiment of the present disclosure.

For example, FIG. 42 and FIG. 43 show the bogie 21 having two running wheels and two support suspension devices, and the first support suspension device 910 and the second support suspension device 920 may be spaced apart along the length direction of the rail 10 and located on the central axis equally dividing the bogie frame 100 in the width direction of the rail 10 (as shown in FIG. 43). Alternatively, the first support suspension device 910 and the second support suspension device 920 may be spaced apart along the width direction of the rail 10 and located on the central axis equally dividing the bogie frame 100 in the length direction of the rail 10 (as shown in FIG. 42).

Figure 58:
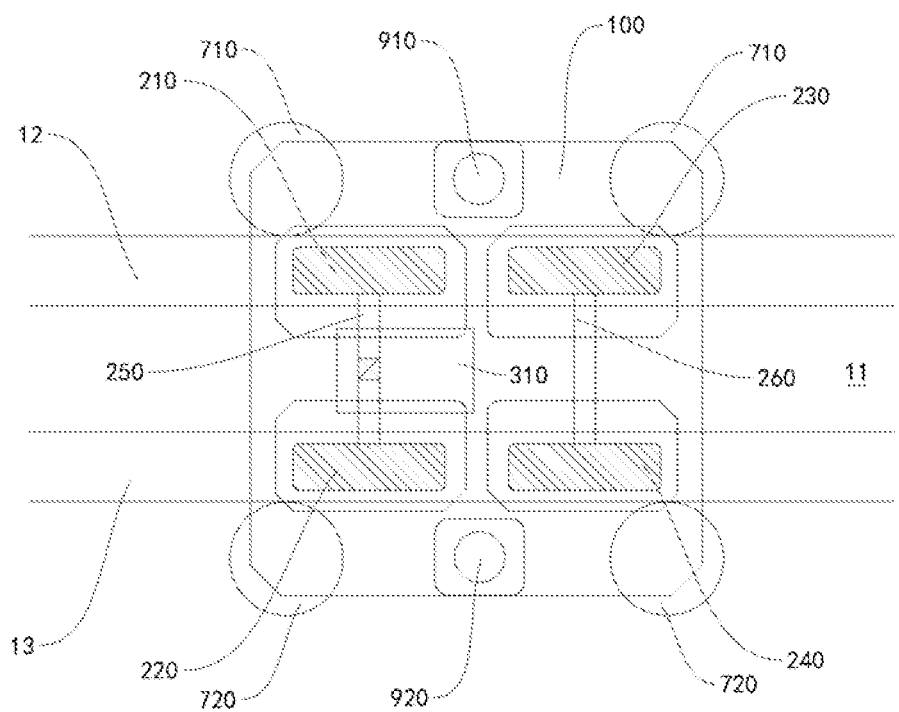
FIG. 58 is a schematic structural diagram of a bogie of a rail vehicle according to another embodiment of the present disclosure.
Figure 59:
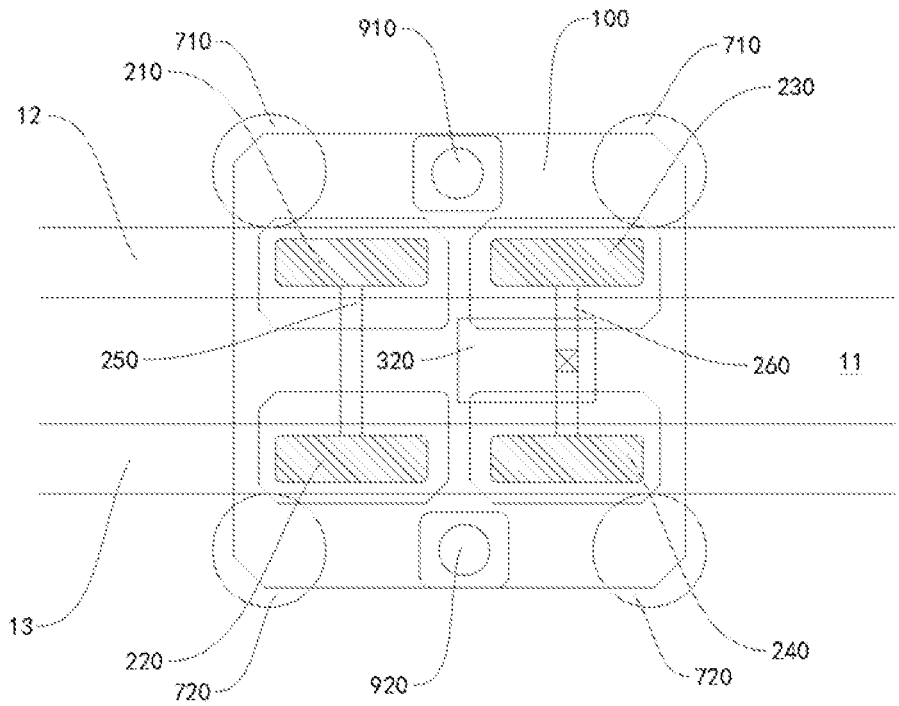
FIG. 59 is a schematic structural diagram of a bogie of a rail vehicle according to another embodiment of the present disclosure.
Figure 60:
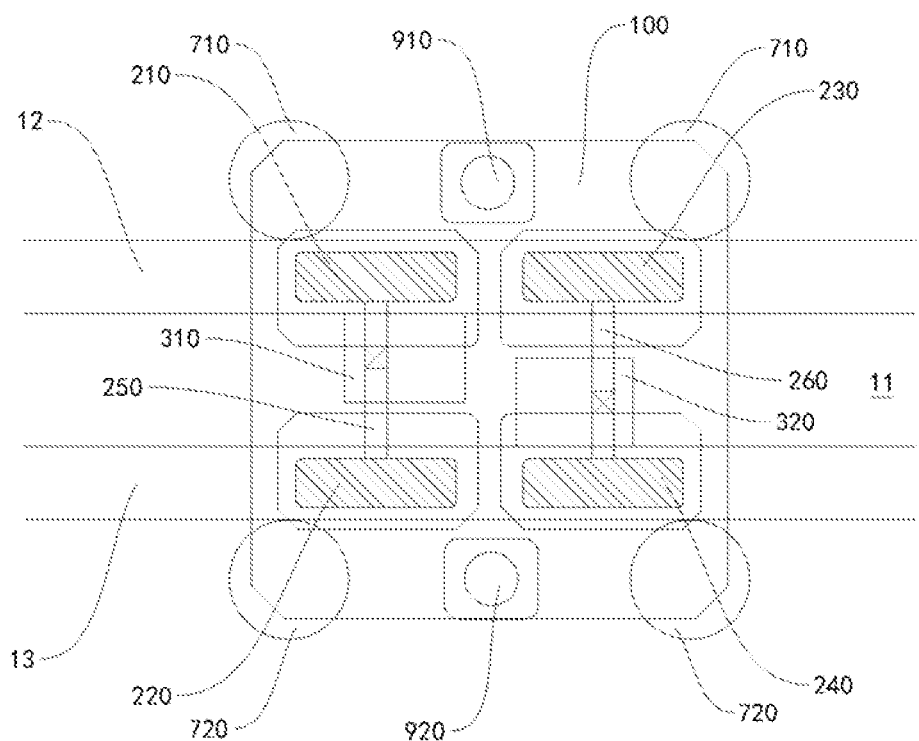
FIG. 60 is a schematic structural diagram of a bogie of a rail vehicle according to another embodiment of the present disclosure.
Figure 61:
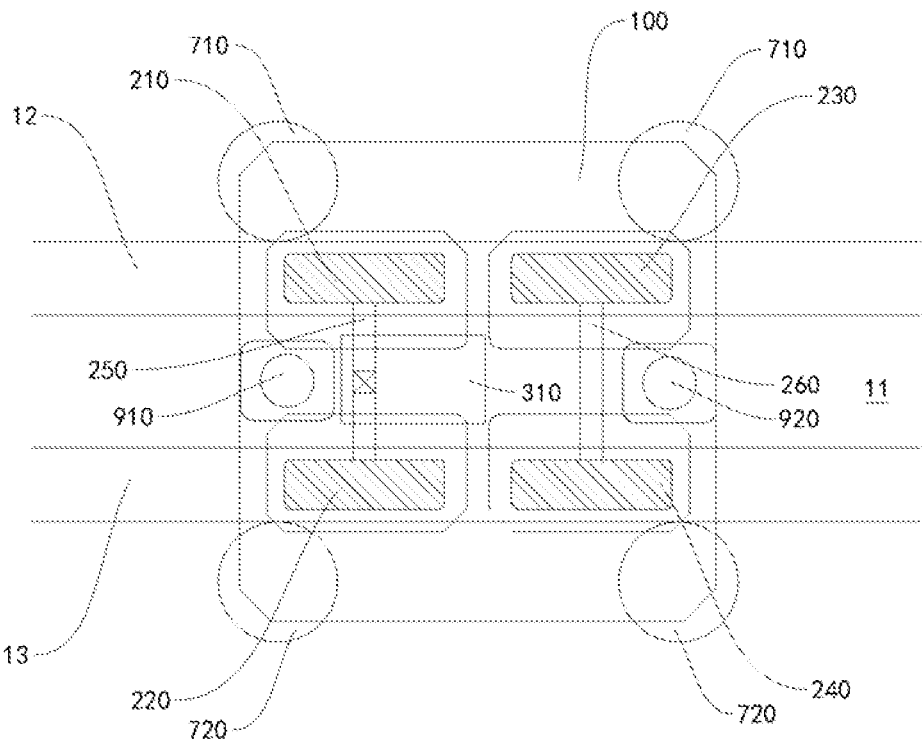
FIG. 61 is a schematic structural diagram of a bogie of a rail vehicle according to another embodiment of the present disclosure.
Figure 62:
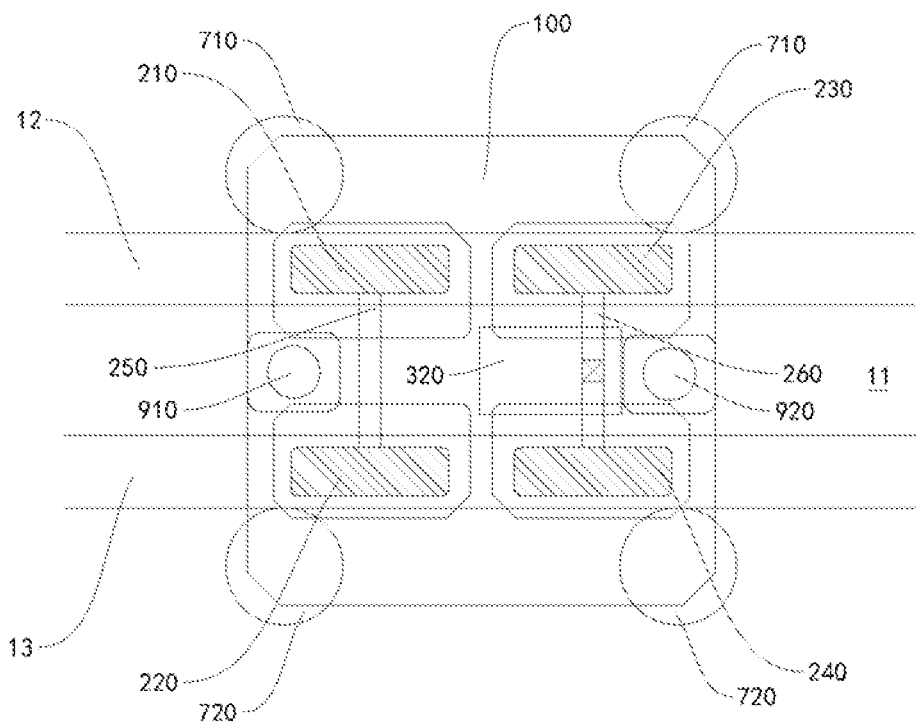
FIG. 62 is a schematic structural diagram of a bogie of a rail vehicle according to another embodiment of the present disclosure.
Figure 63:
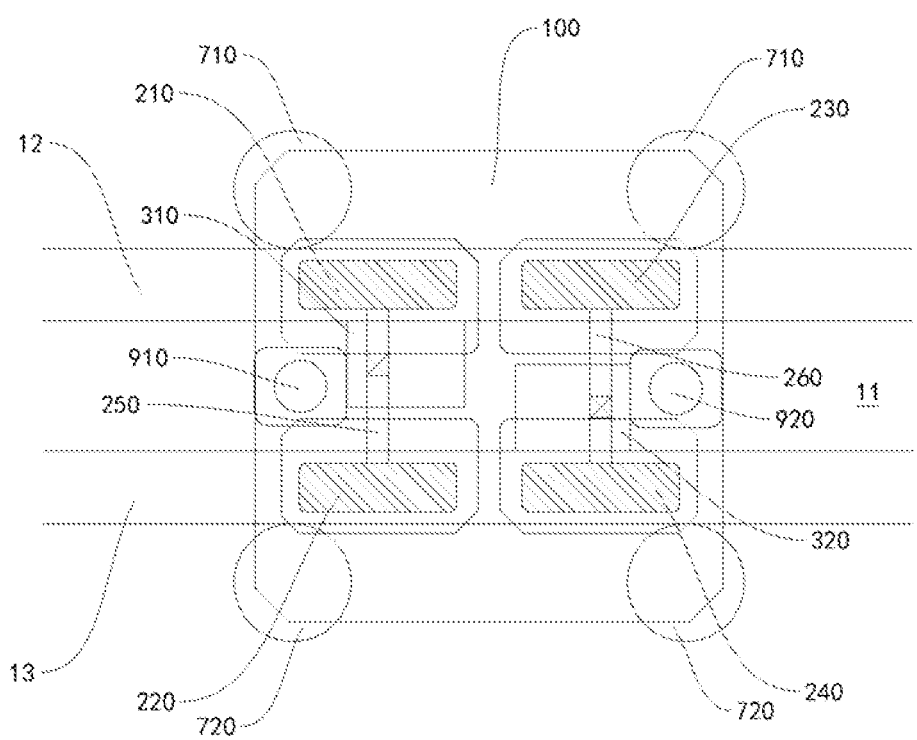
FIG. 63 is a schematic structural diagram of a bogie of a rail vehicle according to another embodiment of the present disclosure.

FIG. 58 to FIG. 63 show the bogie 21 having four running wheels and two support suspension devices, and the first support suspension device 910 and the second support suspension device 920 may be spaced apart along the length direction of the rail 10 and located on the central axis equally dividing the bogie frame 100 in the width direction of the rail 10 (as shown in FIG. 61 to FIG. 63). Alternatively, the first support suspension device 910 and the second support suspension device 920 may be spaced apart along the width direction of the rail 10 and located on the central axis equally dividing the bogie frame 100 in the length direction of the rail 10 (as shown in FIG. 58 to FIG. 60).

There may be one driving device defined as a first driving device 310, and the first driving device 310 is disposed between the first running wheel 210 and the second running wheel 220 (as shown in FIG. 58 and FIG. 61). There may be one driving device defined as a second driving device 320, and the second driving device 320 is disposed between the third running wheel 230 and the fourth running wheel 240 (as shown in FIG. 59 and FIG. 62). There may be two driving devices respectively defined as a first driving device 310 and a second driving device 320, the first driving device 310 is disposed between the first running wheel 210 and the second running wheel 220, the second driving device 320 is disposed between the third running wheel 230 and the fourth running wheel 240, the first driving device 310 is closer to the first running wheel 210 than the second running wheel 220, and the second driving device 320 is closer to the fourth running wheel 240 than the third running wheel 230 (as shown in FIG. 60 and FIG. 63).

In some other embodiments of the present disclosure, as shown in FIG. 44 and FIG. 64 to FIG. 66, the bogie 21 further includes a first support suspension device 910, a second support suspension device 920, a third support suspension device 930, and a fourth support suspension device 940.

The first support suspension device 910, the second support suspension device 920, the third support suspension device 930, and the fourth support suspension device 940 are respectively mounted onto the bogie frame 100 and respectively connected to the vehicle body 22. The first support suspension device 910, the second support suspension device 920, the third support suspension device 930, and the fourth support suspension device 940 are respectively located at four corners of a rectangle in the horizontal plane, and the rectangle is symmetrical about the center of the bogie frame 100, that is, the symmetrical center of the rectangle is the center of the bogie frame 100. In other words, in the horizontal plane, the rectangle is rotated by 180° around the center of the bogie frame 100, and a rectangle formed after rotation coincides with the rectangle before rotation. The first support suspension device 910, the second support suspension device 920, the third support suspension device 930 and the fourth support suspension device 940 are used to support the vehicle body 22 and play a role of shock absorption and buffering, and first support suspension device 910, the second support suspension device 920, the third support suspension device 930 and the fourth support suspension device 940 are uniformly loaded and supported, thereby improving stability and comfort of the rail vehicle 20.

Figure 44:
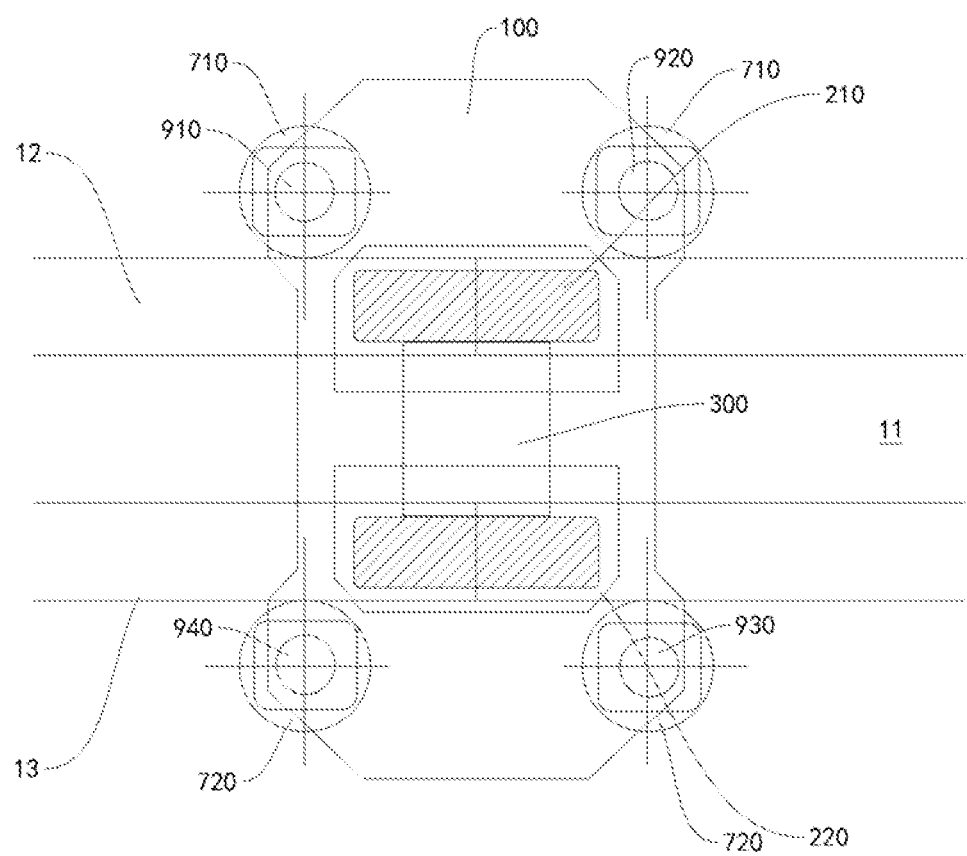
FIG. 44 is a schematic structural diagram of a bogie of a rail vehicle according to another embodiment of the present disclosure.

For example, FIG. 44 shows the bogie 21 having two running wheels and four support suspension devices, the first support suspension device 910, the second support suspension device 920, the third support suspension device 930, and the fourth support suspension device 940 are arranged at four corners of a rectangle, and the symmetrical center of the rectangle is the center of the bogie frame 100.

Figure 64:
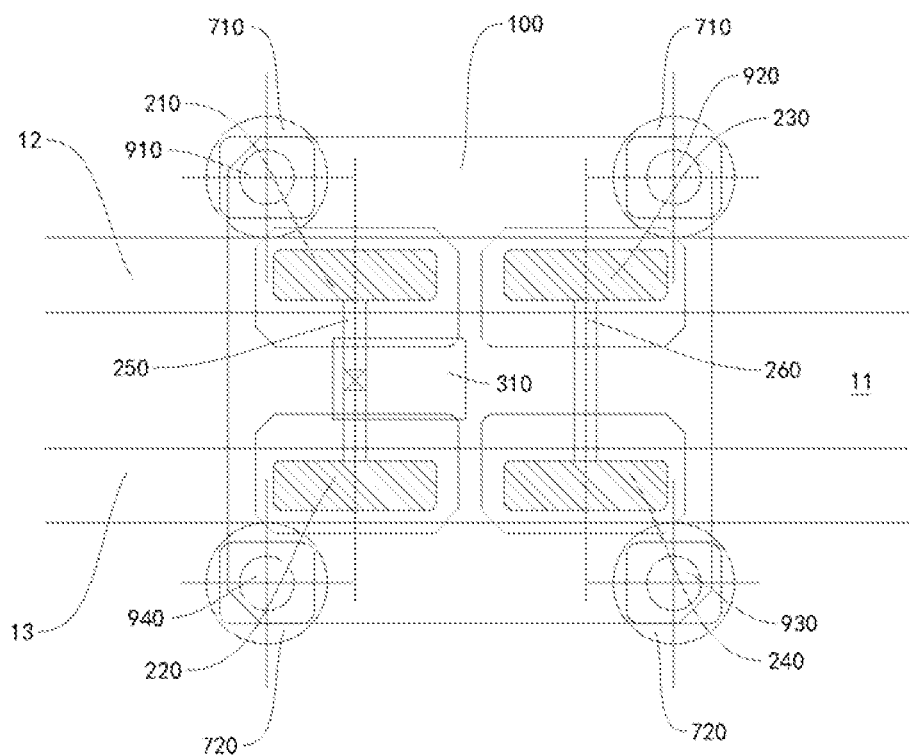
FIG. 64 is a schematic structural diagram of a bogie of a rail vehicle according to another embodiment of the present disclosure.
Figure 65:
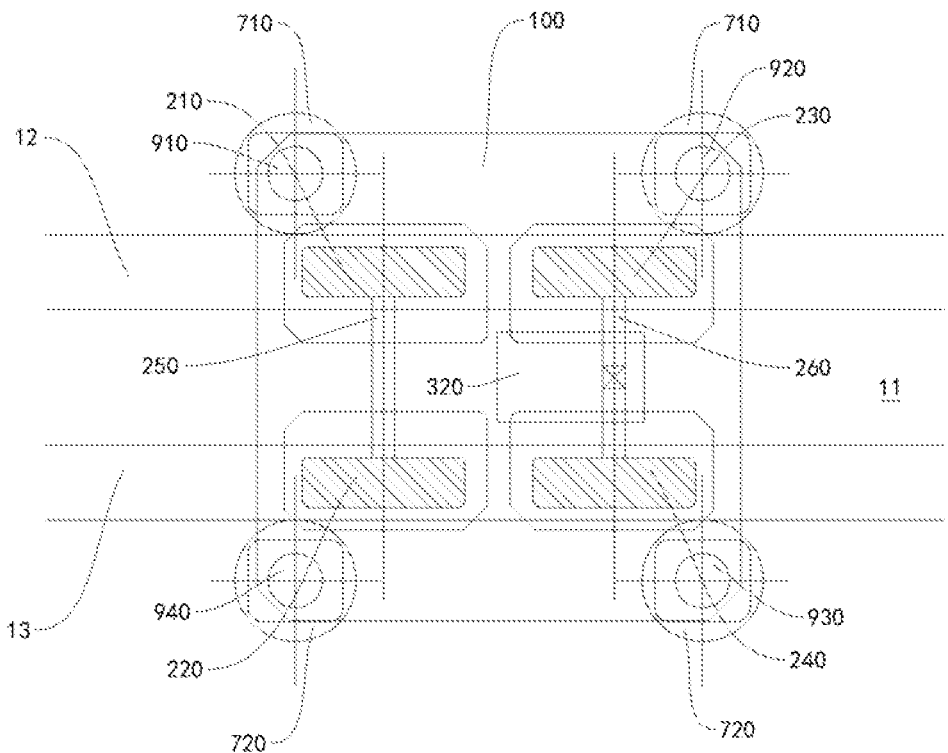
FIG. 65 is a schematic structural diagram of a bogie of a rail vehicle according to another embodiment of the present disclosure.

FIG. 64 and FIG. 65 show the bogie 21 having four running wheels and four support suspension devices, the first support suspension device 910, the second support suspension device 920, the third support suspension device 930, and the fourth support suspension device 940 are arranged at four corners of a rectangle, and the symmetrical center of the rectangle is the center of the bogie frame 100.

There may be one driving device defined as a first driving device 310, and the first driving device 310 is disposed between the first running wheel 210 and the second running wheel 220 (as shown in FIG. 64). There may be one driving device defined as a second driving device 320, and the second driving device 320 is disposed between the third running wheel 230 and the fourth running wheel 240 (as shown in FIG. 65). There may be two driving devices respectively defined as a first driving device 310 and a second driving device 320, the first driving device 310 is disposed between the first running wheel 210 and the second running wheel 220, the second driving device 320 is disposed between the third running wheel 230 and the fourth running wheel 240, the first driving device 310 is closer to the first running wheel 210 than the second running wheel 220, and the second driving device 320 is closer to the fourth running wheel 240 than the third running wheel 230 (as shown in FIG. 66).

In some embodiments of the present disclosure, as shown in FIG. 10, FIG. 42 to FIG. 44, FIG. 46 to FIG. 49, and FIG. 58 to FIG. 66, there are two first horizontal wheels 710 spaced apart along the length direction of the first rail beam 12, and There are two second horizontal wheels 720 spaced apart along the length direction of the second rail beam 13. The central axes of the two first horizontal wheels 710 and the central axes of the two second horizontal wheels 720 are respectively located at four corners of a rectangle in the horizontal plane, and the rectangle is symmetrical about the center of the bogie frame 100, that is, the symmetrical center of the rectangle is the center of the bogie frame 100. In other words, in the horizontal plane, the rectangle is rotated by 180° around the center of the bogie frame 100, and a rectangle formed after rotation coincides with the rectangle before rotation. Therefore, four horizontal wheels may be uniformly arranged in the horizontal plane, to ensure stability of the horizontal wheels to drive the rail vehicle 20 during steering and straight-line travelling.

It can be understood that, each of the foregoing rectangles is an assumed virtual rectangle, the rectangle is to clearly express an arrangement manner of the first support suspension device 910, the second support suspension device 920, the third support suspension device 930, and the fourth support suspension device 940 in the horizontal plane, and an arrangement manner of the two first horizontal wheels 710 and the two second horizontal wheels 720 in the horizontal plane.

In the example shown in FIG. 44 and FIG. 64 to FIG. 66, the central axes of the two first horizontal wheels 710 and the central axes of the two second horizontal wheels 720 may respectively coincide with the central axis of the first support suspension device 910, the central axis of the second support suspension device 920, the central axis of the third support suspension device 930, and the central axis of the fourth support suspension device 940.

In some embodiments of the present disclosure, as shown in FIG. 70, there are one first horizontal wheel 710 and one second horizontal wheel 720 respectively, the first horizontal wheel 710 and the second horizontal wheel 720 are spaced apart along the width direction of the rail 10, and the first horizontal wheel 710 and the second horizontal wheel 720 deviate from the center of the bogie frame 100 to a travelling direction of the rail vehicle 20 in the length direction of the rail 10 (an arrow in FIG. 70 shows the travelling direction of the rail vehicle 20). In other words, the first horizontal wheel 710 and the second horizontal wheel 720 deviates from the center of the bogie frame 100 in the length direction of the rail 10 and deviation directions of the first horizontal wheel 710 and the second horizontal wheel 720 are consistent with the travelling direction of the rail vehicle 20. For example, the first horizontal wheel 710 and the second horizontal wheel 720 are located on the front side of the bogie frame 100 toward a travelling direction of the rail vehicle 20 in the length direction of the rail 10. During a travelling process of the rail vehicle 20, a front horizontal wheel in the travelling direction plays a main guiding function, and during bending, a rear horizontal wheel in the travelling direction interferes with the bogie frame 100 to generate a side effect, so that for a one-way rail transport system 1 or a circular rail transport system 1, the rear horizontal wheel in the travelling direction is removed, thereby eliminating interference with the bogie frame 100 during bending, reducing the weight of the rail vehicle 20, and reducing costs of the rail vehicle 20.

Figure 45:
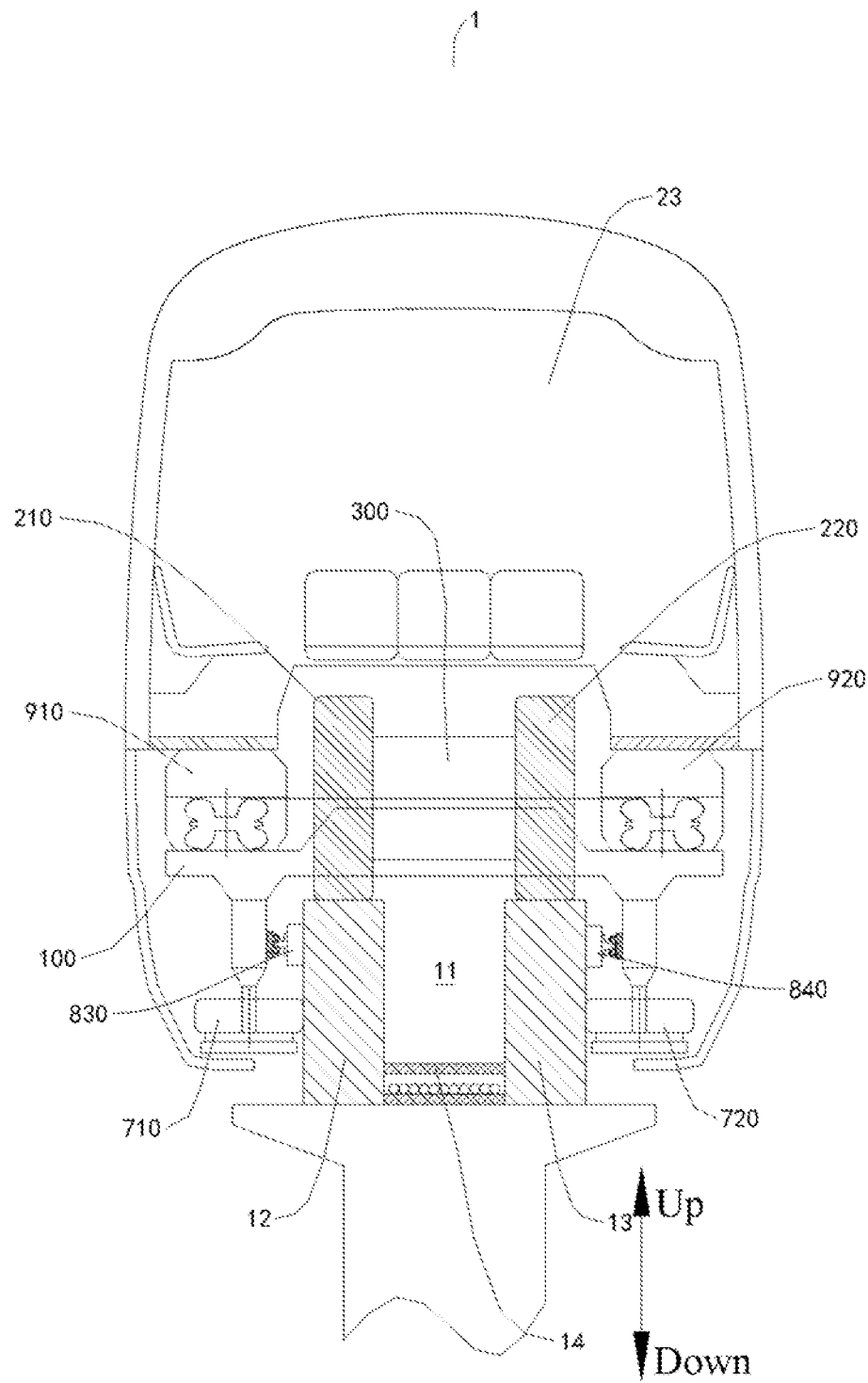
FIG. 45 is a sectional view of a rail transport system according to another embodiment of the present disclosure.

In some embodiment of the present disclosure, as shown in FIG. 45, for the bogie 21 having two running wheels, and the outer diameter of a first running wheel 210 and the outer diameter of a second running wheel 220 are the same and are 900 to 1100 millimeters. For the bogie 21 having four running wheels, and the outer diameter of a first running wheel 210, the outer diameter of a second running wheel 220, the outer diameter of a third running wheel 230, and the outer diameter of a fourth running wheel 240 are the same and are 900 to 1100 millimeters. Therefore, an effect of a running wheel on the space in the compartment 23 may be reduced as much as possible in a case of improving the weight bearing capability of the running wheel, thereby improving the passenger capacity.

Other configurations and operations of the rail transport system 1 according to the embodiments of the present disclosure are known to those of ordinary skill in the art and will not be described in detail herein.

Moreover, those skilled in the art can understand that the individual technical features in the above embodiments can be combined with each other without interference or contradiction.

In the description of the present disclosure, it should be understood that directions or location relationships indicated by terms "center", "longitudinal", "landscape", "length", "width", "thickness", "upper", "lower", "front", "rear", "left", "right", "vertical", "horizontal", "top", "bottom", "inner", "outer", "clockwise", and "counterclockwise" are directions or location relationships shown based on the accompanying drawings, are merely used for the convenience of describing the present disclosure and simplifying the description, but are not used to indicate or imply that a device or an element must have a particular direction or must be constructed and operated in a particular direction, and therefore, cannot be understood as a limitation to the present disclosure.

In addition, terms "first" and "second" are used only for description objectives, and shall not be construed as indicating or implying relative importance or implying a quantity of indicated technical features. Therefore, features modified by "first" and "second" may explicitly or implicitly include one or more features. In the description of the present disclosure, unless otherwise specifically limited, "multiple" means at least two, for example, two or three.

In the present disclosure, unless explicitly specified or limited otherwise, the terms "mounted", "connected", "connection", and "fixed" should be understood broadly, for example, which may be fixed connections, detachable connections or integral connections; may be mechanical connections or electrical connections; may be direct connections, indirectly connected with each other through an intermediate medium, or communications inside two elements or an interaction relationship of two elements. A person of ordinary skill in the art may understand specific meanings of the foregoing terms in this disclosure according to a specific situation.

In the descriptions of this specification, descriptions such as reference terms "an embodiment", "some embodiments", "example", "specific example", or "some examples" intend to indicate that specific features, structures, materials, or characteristics described with reference to embodiments or examples are included in at least one embodiment or example of this disclosure. In this specification, exemplary descriptions of the foregoing terms do not necessarily refer to a same embodiment or example. In addition, the described specific feature, structure, material, or characteristic may be combined in a proper manner in any one or more embodiments or examples. In addition, a person skilled in the art may combine different embodiments or examples described in this specification.

Although the embodiments of the present disclosure are shown and described above, it can be understood that the foregoing embodiments are exemplary, and should not be construed as limitations to the present disclosure. A person of ordinary skill in the art can make changes, modifications, replacements, and variations to the foregoing embodiments within the scope of the present disclosure.

What is claimed is:

1. A bogie, comprising:
    a bogie frame, wherein the bogie frame has a straddle recess for straddling a rail;
    a first running wheel and a second running wheel, wherein the first running wheel and the second running wheel are pivotably mounted onto the bogie frame respectively and are coaxially spaced apart;
    at least one driving device, wherein the at least one driving device is mounted onto the bogie frame and located between the first running wheel and the second running wheel to drive the first running wheel and the second running wheel;
    a first horizontal wheel, wherein the first horizontal wheel is pivotably mounted onto the bogie frame and is for fitting in on a first side of the rail;
    a second horizontal wheel, wherein the second horizontal wheel is pivotably mounted onto the bogie frame and is for fitting in on a second side of the rail; and
    a first horizontal safety wheel connected to the first horizontal wheel and moving in synchronization with the first horizontal wheel, and a second horizontal safety wheel connected to the second horizontal wheel and moving in synchronization with the second horizontal wheel, wherein an outer diameter of the first horizontal safety wheel is less than an outer diameter of the first horizontal wheel, and an outer diameter of the second horizontal safety wheel is less than an outer diameter of the second horizontal wheel.

2. The bogie according to claim 1, wherein the first horizontal wheel fits in on one inner side surface of the rail, and the second horizontal wheel fits in on the other inner side surface of the rail.

3. The bogie according to claim 2, wherein the first horizontal wheel fitting in on one inner side surface of the rail and the second horizontal wheel fitting in on the other inner side surface of the rail are located at a same height in a vertical direction.

4. The bogie according to claim 2, wherein the first motor shaft and the second motor shaft are coaxially disposed and are one integrally-formed piece.

5. The bogie according to claim 1, wherein:
    there are two first horizontal wheels spaced apart along a length direction of the rail, and there are two second horizontal wheels spaced apart along the length direction of the rail;
    central axes of the two first horizontal wheels and central axes of the two second horizontal wheels are respectively located at four corners of a rectangle shape of a horizontal plane, and the rectangle shape is symmetrical about a center of the bogie frame.

6. The bogie according to claim 1, wherein the driving device is a motor, the motor has a first motor shaft and a second motor shaft operating synchronously, the first motor shaft is in transmission connection to the first running wheel, and the second motor shaft is in transmission connection to the second running wheel.

7. The bogie according to claim 1, wherein the first running wheel and the second running wheel are connected by using a first connection shaft; and the at least one driving device is in transmission connection to the first connection shaft.

8. The bogie according to claim 1, wherein
    there are two first horizontal wheels spaced apart along the length direction of the rail,
    there are two second horizontal wheels spaced apart along the length direction of the rail,
    the central axes of the two first horizontal wheels and the central axes of the two second horizontal wheels are respectively located at four corners of a rectangle in the horizontal plane, and
    the rectangle is symmetrical about the center of the bogie frame.

9. The bogie according to claim 1, wherein there are one first horizontal wheel and one second horizontal wheel respectively, and the first horizontal wheel and the second horizontal wheel are located at a distance from the center of the bogie frame along a travelling direction of a vehicle body.

10. The bogie according to claim 1, further comprising:
    a first collector shoe, wherein the first collector shoe is disposed on the bogie frame and is for coupling with a conductive rail on the first side of the rail; and
    a second collector shoe, wherein the second collector shoe is disposed on the bogie frame and is for coupling with a conductive rail on the second side of the rail.

11. The bogie according to claim 1, further comprising:
    a first support suspension device, wherein the first support suspension device is mounted onto the bogie frame and is for supporting a first side of the vehicle body; and
    a second support suspension device, wherein the second support suspension device is mounted onto the bogie frame and is for supporting a second side of the vehicle body.

12. A rail transport system, comprising: a rail; and a rail vehicle according to claim 11.

13. The bogie according to claim 1, wherein the outer diameter of the first running wheel, the outer diameter of the second running wheel, the outer diameter of the third running wheel, and the outer diameter of the fourth running wheel are approximately the same.

14. A rail vehicle, comprising:
- a vehicle body; and
- a bogie mounted on bottom of the vehicle body, the bogie comprising:
  - a bogie frame, wherein the bogie frame has a straddle recess for straddling a rail;
  - a first running wheel and a second running wheel, wherein the first running wheel and the second running wheel are pivotably mounted onto the bogie frame respectively and are coaxially spaced apart;
  - at least one driving device, wherein the at least one driving device is mounted onto the bogie frame and located between the first running wheel and the second running wheel to drive the first running wheel and the second running wheel;
  - a first horizontal wheel, wherein the first horizontal wheel is pivotably mounted onto the bogie frame and is for fitting in on a first side of the rail;
  - a second horizontal wheel, wherein the second horizontal wheel is pivotably mounted onto the bogie frame and is for fitting in on a second side of the rail; and
  - a first horizontal safety wheel connected to the first horizontal wheel and moving in synchronization with the first horizontal wheel, and a second horizontal safety wheel connected to the second horizontal wheel and moving in synchronization with the second horizontal wheel, wherein an outer diameter of the first horizontal safety wheel is less than an outer diameter of the first horizontal wheel, and an outer diameter of the second horizontal safety wheel is less than an outer diameter of the second horizontal wheel.

* * * * *